(12) United States Patent
Nishikawa

(10) Patent No.: US 6,404,555 B1
(45) Date of Patent: Jun. 11, 2002

(54) MICRO LENS ARRAY, METHOD OF FABRICATING THE SAME AND DISPLAY

(75) Inventor: Takao Nishikawa, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/371,679

(22) Filed: Aug. 10, 1999

Related U.S. Application Data

(63) Continuation-in-part of application No. 09/349,888, filed on Jul. 8, 1999, now abandoned.

(30) Foreign Application Priority Data

| Jul. 9, 1998 | (JP) | .......................................... 10-210452 |
| Aug. 11, 1998 | (JP) | .......................................... 10-239495 |
| Jul. 9, 1999 | (JP) | .......................................... 11-196014 |

(51) Int. Cl.⁷ .............................................. G02B 27/10
(52) U.S. Cl. ...................................... 359/619; 359/455
(58) Field of Search ................................. 359/619, 620, 359/621, 623, 624, 622, 455, 456, 542, 541; 264/1.1, 1.7, 2.5

(56) References Cited

U.S. PATENT DOCUMENTS

| 5,512,219 A | * | 4/1996 | Rowland et al. ............. 264/1.6 |
| 5,543,942 A | * | 8/1996 | Mizuguchi et al. ........... 359/40 |
| 5,734,190 A | * | 3/1998 | Hawkins ..................... 257/432 |
| 5,770,120 A | * | 6/1998 | Kamihara et al. ......... 264/1.27 |
| 5,871,653 A | * | 2/1999 | Ling ............................. 216/2 |
| 5,969,867 A | * | 10/1999 | Fukushima et al. ......... 359/581 |
| 5,981,630 A | * | 11/1999 | Rabarot et al. ............. 438/455 |
| 6,069,740 A | * | 5/2000 | Hamanaka ................... 359/620 |
| 6,113,801 A | * | 9/2000 | Savant et al. .................. 252/1 |
| 6,129,866 A | * | 10/2000 | Hamanaka et al. .......... 264/1.7 |
| 6,297,911 B1 | * | 10/2001 | Nishikawa et al. ......... 359/619 |
| 6,304,387 B1 | * | 10/2001 | Nishikawa .................. 359/619 |

FOREIGN PATENT DOCUMENTS

JP          3-198003          8/1991

* cited by examiner

*Primary Examiner*—Georgia Epps
*Assistant Examiner*—Saeed Seyrafi
(74) *Attorney, Agent, or Firm*—Harness, Dickey & Pierce, P.L.C.

(57) ABSTRACT

A method of manufacturing a micro lens array comprising a first step of forming a thin film on a base, a second step of forming a light-transmitting layer having a plurality of lenses on the thin film, and a third step of removing the thin film together with the light transmitting layer from the base.

25 Claims, 40 Drawing Sheets

MICRO LENS ARRAY, METHOD OF FABRICATING THE SAME AND DISPLAY

This is a continuation-in-part of U.S. patent application Ser. No. 09/349,888, filed Jul. 8, 1999 which is now abandoned.

BACKGROUND OF THE INVENTION

1. Field of the Invention

The present invention relates to a micro lens array provided with a thin film, a method of manufacturing the same, and a display device.

2. Description of Related Art

A micro lens array formed by lining up plural micro-sized lenses have been applied to liquid crystal panels and the like. Each lens of the micro lens array converges incident light upon each pixel to illuminate a display screen.

As a method of manufacturing a micro lens array, a method using dry etching or wet etching has been known. However, such a method requires a step of lithography for an individual micro lens array, thereby increasing production costs.

Because of this, a method of manufacturing a micro lens array which comprises dripping a liquid resin onto a master mold having spherical surfaces corresponding to lenses formed thereon, solidifying and removing the resin has been developed as disclosed in Japanese Patent Application Laid-Open No. 3-198003.

In this method, lithography for each product is not needed since a micro lens array is formed by utilizing the master mold. Since the master mold can be repeatedly used as long as durability permits, the percentage of the cost of the master mold in one product decreases as the durability of the master mold increases, leading to a reduced product cost.

A micro lens array for a liquid crystal panel is then provided with a thin film. An ITO (Indium Tin Oxide) film, which is an example of the thin film, is manufactured by forming a film under vacuum by a method such as sputtering or vapor deposition and then annealing the film. The annealing temperature is usually 200 to 300° C., and higher temperature is preferable to reduce resistance and to form a high quality electrode film.

However, such high-temperature annealing not only adversely affects the micro lens array but also limits the materials available for the micro lens array. A micro lens array for a liquid panel is provided with an alignment layer. The alignment layer aligns liquid crystal molecules and has to be flat. The alignment layer is formed by, for example, applying a polyimide resin and baking the resin. However, heat used for baking not only adversely affects the micro lens array but also limits the materials forming the micro lens array. As described above, conventional methods have various problems in manufacturing the thin film.

SUMMARY OF THE INVENTION

The present invention has been achieved to solve the above problems. An objective of the present invention is to provide a method of manufacturing a micro lens array having a thin film at low cost, a micro lens array produced by this process, and a display device using the micro lens array.

(1) A method of manufacturing a micro lens array according to the present invention comprises a first step of forming a thin film on a base, a second step of forming a light-transmitting layer having a plurality of lenses on the thin film, and a third step of removing the thin film together with the light transmitting layer from the base.

According to the present invention, the thin film is formed and then annealed. After that the light-transmitting layer is formed on the thin film. Since the light-transmitting layer has not yet been formed when the thin film is annealed, the light-transmitting layer is not affected by high temperature annealing. In addition, since the materials for the light-transmitting layer are not limited to the materials which can withstand high temperature annealing, the range of choice for materials is widened.

(2) In the method of manufacturing a micro lens array, the thin film may be a transparent electrode film.

In this method, the transparent electrode film is formed and then annealed. After that the light-transmitting layer is formed on the transparent electrode film. Since the light-transmitting layer has not yet been formed when the transparent electrode film is annealed, the light-transmitting layer is not affected by high temperature annealing. In addition, since the materials for the light-transmitting layer are not limited to the materials which can withstand high temperature annealing, the range of choice for materials is widened.

(3) The method of manufacturing a micro lens array may further comprise a step of forming the light-transmitting layer separately from the thin film before the second step, and the light-transmitting Layer may be adhered to the thin film in the second step.

This method is general-purpose since it is possible to utilize a light-transmitting layer having lenses prepared in advance.

(4) In the method of manufacturing a micro lens array, the light-transmitting layer may be adhered to the thin film while forming the light-transmitting layer from a light-transmitting layer precursor on the base in the second step.

This method can reduce the total number of steps since the thin film and the light-transmitting layer are continuously formed.

(5) In the method of manufacturing a micro lens array, the base may have radiation transmissivity, and the thin film may be exposed to radiation through the base to reduce the bonding force at the interface between the thin film and the base in the third step.

The thin film can be easily removed from the base by reducing the bonding force at the interface between the thin film and the base.

(6) In the method of manufacturing a micro lens array, a separation layer may be previously formed on the base and the thin film may be formed on the separation layer in the first step. The base may have radiation transmissivity, and the separation layer may be exposed to radiation through the base to reduce the bonding force at the interface between the base and the separation layer in the third step.

In this manner, the bonding force at the interface between the base and the separation layer is reduced, whereby the separation layer can be removed from the base.

(7) In the method of manufacturing a micro lens array, a separation layer may be previously formed on the base and the thin film may be formed on the separation layer in the first step. The base may have radiation transmissivity, and the separation layer may be exposed to radiation through the base to reduce the bonding force at the interface between the thin film and the separation layer in the third step.

The bonding force at the interface between the thin film and the separation layer is thus reduced, whereby the thin film can be removed from the separation layer.

(8) In the method of manufacturing a micro lens array, a separation layer may be previously formed on the base and the thin film may be formed on the separation layer in the first step. The base may have radiation transmissivity, and the separation layer may be exposed to radiation through the base to reduce the bonding force in the separation layer in the third step.

Reduction of the bonding force in the separation layer causes removal (or cohesion failure) in the separation layer. In this case, part of the separation layer adheres to the micro lens array and the remainder adheres to the base.

(9) The method of manufacturing a micro lens array may further comprise a step of washing the surface of the thin film after the third step.

Part of the thin film which deteriorates upon exposure to radiation can be removed in this step.

(10) The method of manufacturing a micro lens array may further comprise a step of removing the separation layer adhered to the surface of the thin film after the third step.

The separation layer or its residue adhered to the micro lens array can be removed in this step.

(11) The method of manufacturing a micro lens array may further comprise a step of forming shading layers which partition the thin film into predetermined areas before the second step, and the light-transmitting layer may be formed on the thin film and the shading layers in the second step.

The shading layers function as a black matrix when a micro lens array thus manufactured is incorporated into a color display device.

(12) In the method of manufacturing a micro lens array, recesses which partition the light-transmitting layer into predetermined areas may be formed on a surface of the light-transmitting layer opposite to the surface on which the lenses are formed, the recesses being filled with a shading material.

The shading material functions as a black matrix when a micro lens array thus manufactured is incorporated into a color display device.

(13) In the method of manufacturing a micro lens array, the thin film may be an alignment layer.

(14) In the method of manufacturing a micro lens array, at least one recess may be formed in the surface of the base, the recess in the base may be filled with material for the alignment layer to form a projection integrally with the alignment layer in the first step, and the projection may function as a supporting material (spacer) for maintaining a fixed space (cell gap) for sealing a liquid crystal of a liquid crystal panel (liquid crystal cell).

According to this method, the supporting material and the alignment layer can be formed at the same time, and also the location of the supporting material can be easily adjusted.

(15) The recess may be formed in an area facing an area between the lenses on the base, and the recess in the base may be placed in the area between the lenses in the second step.

This method can prevent the supporting material from being formed on the lens, thus yields can be improved and the manufacturing steps can be simplified.

(16) In the method of manufacturing a micro lens array, protrusions having shapes corresponding to alignment grooves which are to be formed on the alignment layer may be formed in a predetermined area of the surface of the base, and the alignment grooves may be formed in a predetermined area of the alignment layer in the first step.

This method can reduce the total number of steps, since the alignment grooves can be also formed on the alignment layer in the step of forming the alignment layer. The alignment grooves mean grooves that align liquid crystal molecules in a predetermined direction.

(17) In the method of manufacturing a micro lens array, the process may further comprise a step of forming a transparent electrode film on one of the alignment layer and the light-transmitting layer. The alignment layer may be provided with the light-transmitting layer through the transparent electrode film in the second step.

A micro lens array comprising the transparent electrode film can be thus easily produced.

(18) In the method of manufacturing a micro lens array, the transparent electrode film may be formed on the alignment layer.

In this manner, the transparent electrode film can be annealed separately from the light-transmitting layer, so that the light-transmitting layer is not affected by heat.

(19) A micro lens array according to the present invention is manufactured by the above-described method.

(20) A display device according to the present invention comprises the above-described micro lens array and a light source which emits light toward the micro lens array.

DETAILED DESCRIPTION OF THE PREFERRED EMBODIMENT

A preferred embodiment of the present invention will be described with reference to the drawings.

First Embodiment

FIGS. 1A to 6B are illustrations for describing a first embodiment of the present invention.

Step of Forming Master Mold

Figure 1A:
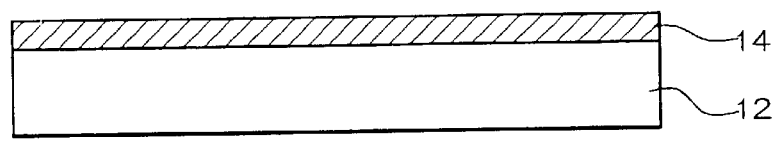
FIGS. 1A to 1E illustrate the steps of forming a master mold in a first embodiment.

FIGS. 1A to 1E illustrate the steps of forming a master mold in the first embodiment. As shown in FIG. 1A, a resist layer 14 is formed on a substrate 12. The substrate 12 becomes a master mold 10 (see FIG. 1E) by etching the surface thereof. Although there are no specific limitations to the materials used for the substrate 12 insofar the materials can be etched, silicon or quartz is preferable since curved surfaces 19 (see FIG. 1E) can be formed by etching with high precision.

As a material for forming the resist layer 14, for example, a commercially available positive resist which is normally used in the manufacture of a semiconductor device, and is obtained by compounding a diazonaphthoquinone derivative as a photosensitive agent with a cresol/novolak resin can be used. When the positive resist is exposed to radiation through a mask with a given pattern, the areas exposed to the radiation can be selectively removed by a developer.

As a method of forming the resist layer 14, a spin coating method, dipping method, spray coating method, roll coating method, bar coating method, or the like can be used.

Figure 1B:
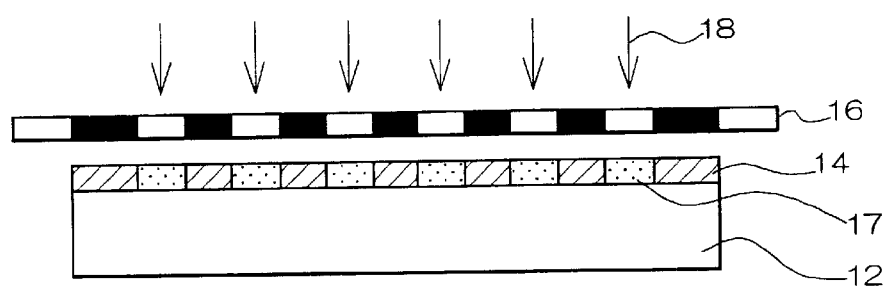

As shown in FIG. 1B, a mask 16 is disposed above the resist layer 14 and given areas of the resist layer 14 are exposed to radiation 18 through the mask 16.

Figure 1C:
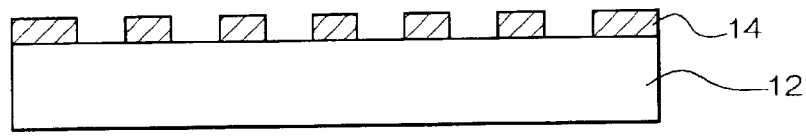
Figure 1D:
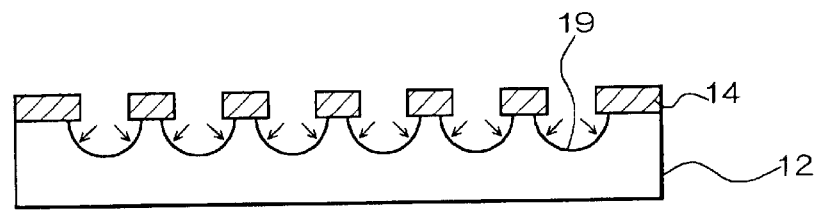
Figure 1E:
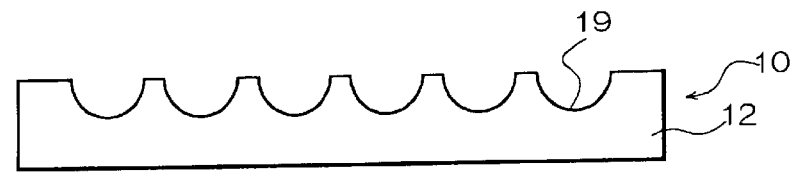

The mask 16 is patterned so that only the areas required for forming the curved surfaces 19 shown in FIG. 1E are exposed to the radiation 18.

As the radiation, light having a wavelength from 200 nm to 500 nm is preferable. The use of light having this wavelength range makes it possible to utilize photolithographic technology established in the formation of liquid crystal panels and facilities for this technology, thereby reducing production costs.

The resist layer 14 is developed under given conditions after exposure to the radiation 18. As a result, as shown in FIG. 1C, only the areas 17 of the resist layer 14 exposed to the radiation 18 are selectively removed to expose part of the surface of the substrate 12 and the remainder remains being covered with the resist layer 14.

After the resist layer 14 is thus patterned, the substrate 12 is etched to a given depth using the residual resist layer 14 as a mask, as shown in FIG. 1D. In more detail, isotropic etching in which etching proceeds in all directions is performed on the areas of the substrate 12 not covered by the resist layer 14. For example, wet etching is applied by dipping the substrate 12 in a chemical solution (etchant) to perform the isotropic etching. When quartz is used as the substrate, an aqueous solution (buffered hydrofluoric acid) made by mixing hydrofluoric acid with ammonium fluoride is used as an etchant. The curved surfaces 19 each having a concave shape are formed on the substrate 12 by performing the isotropic etching. Each curved surface 19 has an inverted curvature of each lens 42 (see FIG. 4C) in a light-transmitting layer 40 which is finally formed.

The resist layer 14 is removed after the etching, whereby the master mold 10 having the curved surfaces 19 in the substrate 12 is formed as shown in FIG. 1E.

In this embodiment, the master mold 10 can be used repeatedly as long as durability permits, which is economical. Consequently, the step of forming the master mold 10 can be omitted in the formation of second or subsequent micro lens array, thereby reducing the number of steps and production costs.

In this embodiment, a positive resist is used for forming the curved surfaces 19 on the substrate 12. Alternatively, a negative resist may be used. When the negative resist is exposed to radiation through a mask with a given pattern, the areas exposed to the radiation are insolubilized in a developer, and the areas not exposed to the radiation can be selectively removed by a developer. In this case, a mask with a pattern which is the inverse of the pattern of the mask 16 is used. Alternatively, a resist may be directly exposed to laser beams or electron beams for patterning without using a mask.

Step of Forming Intermediate Mold

Figure 2A:
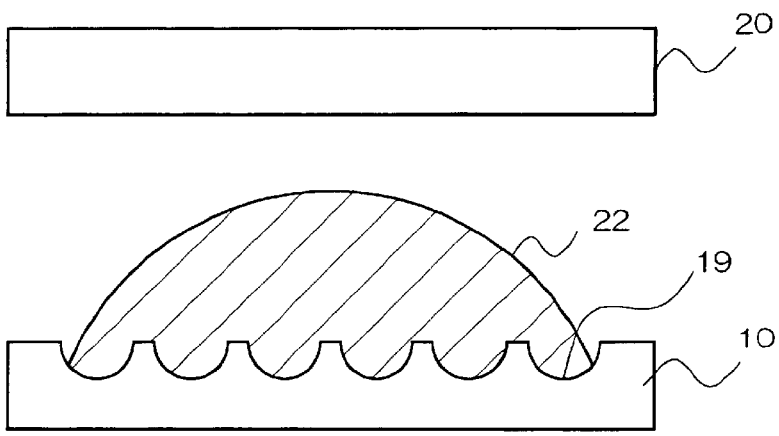
FIGS. 2A to 2C illustrate the steps of forming an intermediate mold from the master mold in the first embodiment.
Figure 2B:
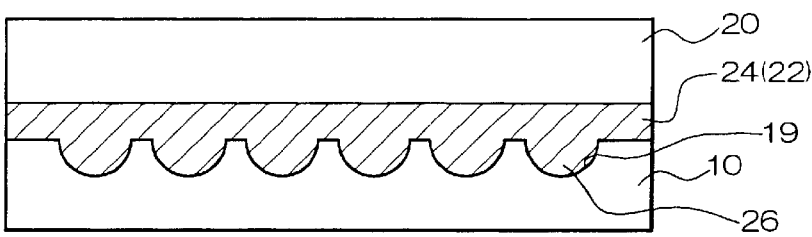
Figure 2C:
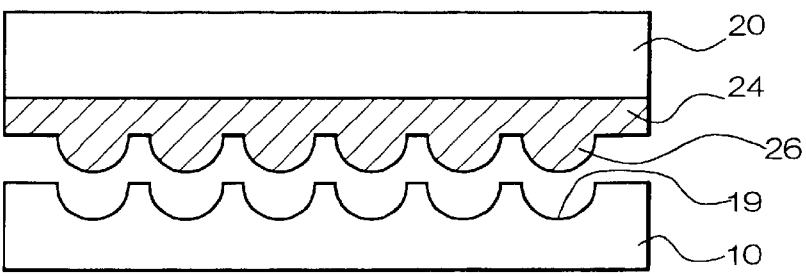

FIGS. 2A to 2C illustrate the steps of forming an intermediate mold. As shown in FIG. 2A, an intermediate mold precursor 22 is placed on the surface of the master mold 10 on which the curved surfaces 19 are formed. A reinforcing plate 20 is then attached to the master mold 10 through the intermediate mold precursor 22, and the intermediate mold precursor 22 is spread to a given area to form a layer between the master mold 10 and the reinforcing plate 20, as shown in FIG. 2B.

Although the intermediate mold precursor 22 is placed on the master mold 10 in this case, it may be placed on the reinforcing plate 20 or on both the master mold 10 and the reinforcing plate 20. Alternatively, the intermediate mold precursor 22 may be spread to a predetermined area in advance on one or both of the master mold 10 and the reinforcing plate 20 using a spin coating method, spray coating method, roll coating method, bar coating method, dipping method, or the like.

The reinforcing plate 20 is used to reinforce the intermediate mold 24. There are no specific limitations to the materials for the reinforcing plate 20 insofar as the materials possess processing durability in the steps of forming the intermediate mold 24 and a duplicate mold 30 from the intermediate mold 24. For example, a substrate made of quartz, glass, resins, metals, or ceramic can be used. If the intermediate mold 24 can solely fulfill the above processing durability, the reinforcing plate 20 is not required.

There are no specific limitations to the material for the intermediate mold precursor 22 insofar as the material has superior releasability from the master mold, and superior capability of transferring the shape of the curved surfaces 19 from the master mold 10, and also, insofar as the material has the processing durability and superior capability of transferring the shape of curved surfaces 26 from the intermediate mold 24 to the duplicate mold 30 when forming the duplicate mold 30 from the intermediate mold 24. However, the intermediate mold precursor 22 is preferably a liquid material or a liquefiable material. Use of such a liquid material as the intermediate mold precursor makes it easy to fill the intermediate mold precursor 22 into the curved surfaces 19 of the master mold 10. Materials which are curable by applying energy can be used as the liquid material, and plastic materials can be used as the liquefiable material.

When a resin is selected as the material for the intermediate mold precursor 22, those having energy-curability or plasticity are preferable.

It is preferable that these energy-curable resins can be cured by applying at least one of light and heat. When using light or heat, a common exposing device or a heater such as a baking furnace or a hot plate can be used, thereby reducing the cost of facilities.

As examples of such energy-curable resins, acrylic resins, epoxy resins, melamine resins, polyimide resins, and the like can be used. In particular, acrylic resins are preferable because acrylic resins can be cured in a short period of time by light, and commercially available precursors and photosensitizers (photopolymerization initiators) can be utilized for that.

Specific examples of a main composition of photocurable acrylic resins include prepolymers, oligomers, monomers, and photopolymerization initiators.

Examples of prepolymers or oligomers include acrylates such as epoxy acrylates, urethane acrylates, polyester acrylates, polyether acrylates, spiroacetal acrylates, methacrylates such as epoxy methacrylates, urethane methacrylates, polyester methacrylates and polyether methacrylates, and the like.

Examples of monomers include monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl acrylate, isobornyl acrylate, dicyclopentenyl acrylate, and 1,3-butanediol acrylate, bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate, and polyfunctional monomers such as trimethylolpropane triacrylate, trimethylolpropane trimethacrylate, pentaerythritol triacrylate, and dipentaerythritol hexaacrylate.

Examples of photopolymerization initiator include radical-generating compounds such as acetophenones such as 2,2-dimethoxy-2-phenylacetophenone, butylphenones such as α-hydroxyisobutylphenone and p-isopropyl-α-hydroxyisobutylphenone, acetophenone halides such as p-tert-butyldichloroacetophenone, p-tertbutyltrichloroacetophenone and α, α-dichloro-4-phenoxyacetophenone, benzophenones such as benzophenone and N,N-tetraethyl-4,4-diaminobenzophenone, benzyls such as benzyl and benzyl dimethyl ketal, benzoins such as benzoin and benzoin alkyl ether, oximes such as 1-phenyl-1,2-propanedione-2-(o-ethoxycarbonyl)oxime, xanthones such as 2-methylthioxanthone and 2-chlorothioxanthone, Michler's ketone and benzyl methyl ketal.

As required, compounds such as amines may be added for preventing oxygen from inhibiting curing, and a solvent may be added for making application easy. As examples of such a solvent, various organic solvents such as propylene glycol monomethyl ether acetate, methoxymethyl propionate, ethoxyethyl propionate, ethyl lactate, ethyl pyruvinate, and methyl amyl ketone can be used without specific limitations.

As the plastic resin, for example, thermoplastic resins such as polycarbonate resins, polymethylmethacrylate resins or amorphous polyolefin resins can be used. Such a resin is plasticized and liquefied by raising the temperature higher than the softening point. Then the plasticized resin is interposed between the master mold 10 and the reinforcing plate 20 as shown in FIG. 2B. The plasticized resin is then cooled and solidified to become the intermediate mold 24.

These materials are preferable because the intermediate mold 24 made from these materials has high releasability from silicon or quartz which is superior as a material for the master mold inasmuch as it enables highly accurate etching.

The intermediate mold precursor 22 as described is placed between the master mold 10 and the reinforcing plate 20 to have a shape corresponding to the curved surfaces 19 of the master mold 10. As required, pressure may be applied through either the master mold 10 or the reinforcing plate 20 in this time. The application of pressure makes it possible to shorten the time required for deforming the intermediate mold precursor 22 into a shape corresponding to the curved surfaces 19 of the master mold 10. This improves the working efficiency and ensures filling into the curved surfaces 19.

A solidifying treatment appropriate to the intermediate mold precursor 22 is then performed. For example, when a photocurable resin is used, the resin is exposed to light under a given condition. The intermediate mold precursor 22 is solidified by this treatment to become the intermediate mold 24 as shown in FIG. 2B.

As shown in FIG. 2C, the intermediate mold 24 and the reinforcing plate 20 are then separated from the master mold 10. The intermediate mold 24 is provided with curved surfaces 26 each having a convex form corresponding to each of the concave curved surfaces 19 of the master mold 10.

Step of Forming Duplicate Mold

Figure 3A:
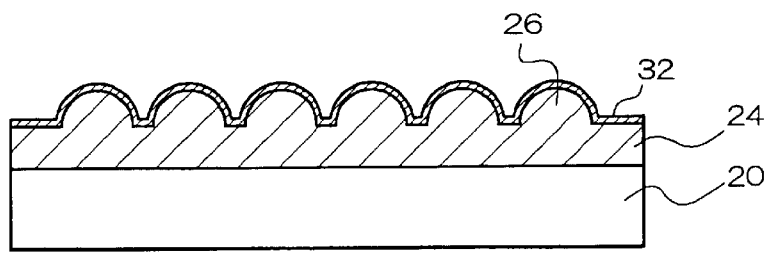
FIGS. 3A to 3C illustrate the steps of forming a duplicate mold from the intermediate mold in the first embodiment.
Figure 3B:
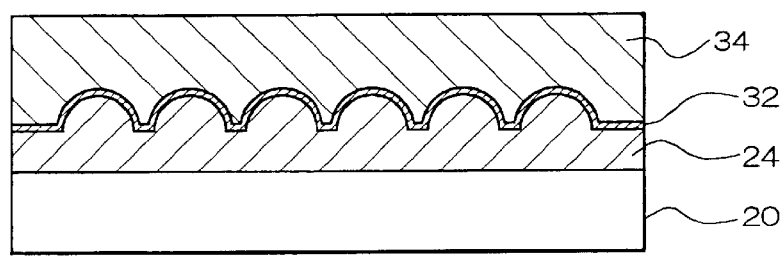
Figure 3C:
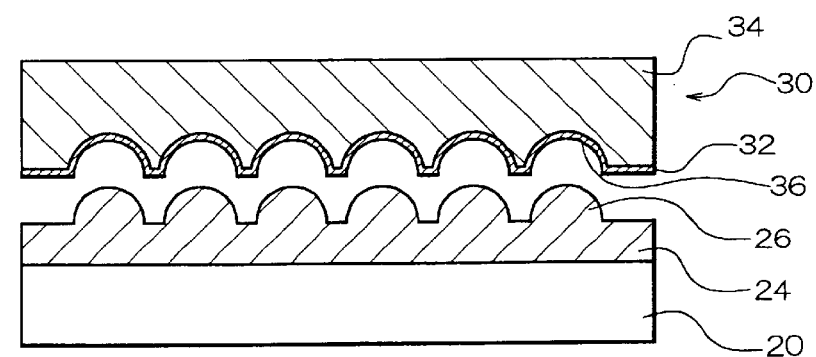

FIGS. 3A to 3C show the steps of forming a duplicate mold from the intermediate mold. As shown in FIG. 3A, a metal film 32 is formed on the surface of the intermediate mold 24 on which the curved surfaces 26 are formed to make the intermediate mold 24 electroconductive. The metal film 32 may be formed, for example, by using nickel (Ni) with a thickness of 500 to 1000 angstroms ($10^{-10}$ m). The metal film 32 can be formed by various methods such as sputtering, CVD, vapor deposition, or electroless plating. Note that this electro-conduction treatment is not required in the case where the surface of the intermediate mold 24 has the electroconductivity required for forming a metal layer in the subsequent step using the electroforming method.

Using the metal film 32 as a negative electrode and a nickel chip or nickel ball as a positive electrode, Ni is electrodeposited by the electroforming method to form a thick metal layer 34 as shown in FIG. 3B. An example of an electroplating solution is as follows.

Nickel sulfamate: 550 g/l
Boric acid: 35 g/l
Nickel chloride: 5 g/l
Leveling agent: 20 mg/l As shown in FIG. 3C, the metal film 32 and the metal layer 34 are removed from the intermediate mold 24, followed by washing as required to obtain the duplicate mold 30. Curved surfaces 36 each having a concave shape corresponding to the convexly curved surfaces 26 of the intermediate mold 24 are formed on the duplicate mold 30. The shape of the curved surfaces 36 is the inverse of the shape of the lenses 42 shown in FIG. 4C in order to form the lenses 42 by transferring.

The metal film 32 may be removed from the duplicate mold 30 by a removal treatment as required.

Step of Forming Light-transmitting Layer

Figure 4A:
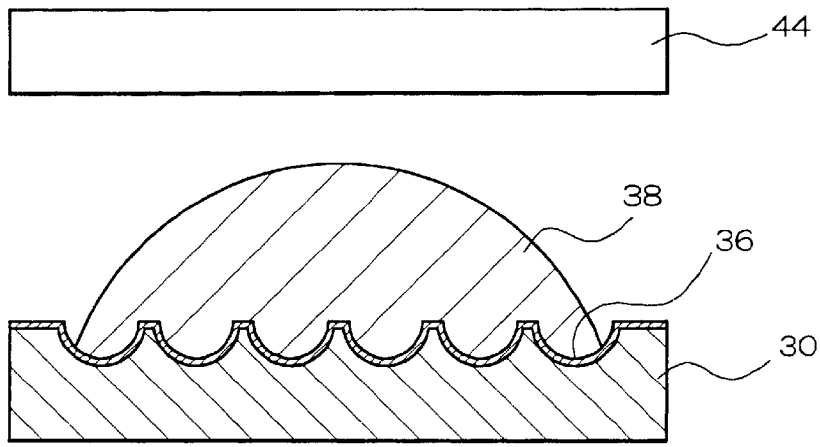
FIGS. 4A to 4C illustrate the steps of forming a micro lens array according to the first embodiment.
Figure 4B:
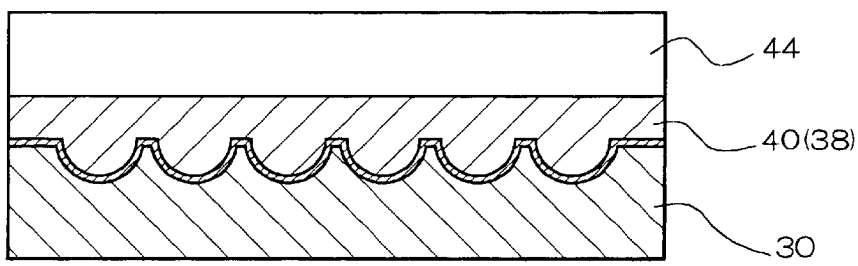
Figure 4C:
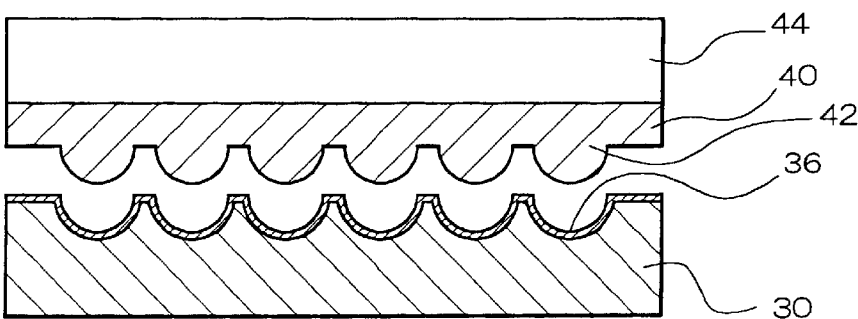

FIGS. 4A to 4C show a step of forming a light-transmitting layer having plural lenses.

As shown in FIGS. 4A and 4B, the reinforcing plate 44 is attached to the duplicate mold 30 through a light-transmitting layer precursor 38. This step is the same as that shown in FIGS. 2A and 2B and a material of the light-transmitting layer precursor 38 may be selected from the materials which can be used for the intermediate mold precursor 22 shown in FIG. 2A, provided that it is light-transmissible. Acrylic resins are preferable since acrylic resins can be cured in a short period of time by light, and commercially available precursors and photosensitizers (photopolymerization initiators) can be utilized, whereby a light-transmitting layer 40 having excellent optical properties can be formed.

No particular limitation is imposed on the material of the reinforcing plate 44 insofar as it has the optical properties such as light-transmissibility and characteristics such as mechanical strength which are required for a micro lens array. For example, quartz, glass, or substrates or films made of plastics such as a polycarbonate, polyacrylate, polyethersulfone, polyethyleneterephthalate, polymethyl methacrylate and amorphous polyolefin can be utilized. If the light-transmitting layer 40 has the characteristics such as mechanical strength required for a micro lens array, the reinforcing plate 44 is not required.

After the light-transmitting layer 40 is formed on the duplicate mold 30 in this manner, the light-transmitting layer 40 and the reinforcing plate 44 are removed together from the duplicate mold 30 as shown in FIG. 4C. Since the light-transmitting layer 40 has the plural lenses 42 made by transferring the shapes of the curved surfaces 36, a structure including the light-transmitting layer 40 and the reinforcing plate 44 is called a "micro lens array" in general. In the present invention, however, a structure further including a thin film 52 is defined as a "micro lens array". The lens 42 is a convex lens.

In the above-described steps, the intermediate mold 24 is formed from the master mold 10 having the curved surfaces 19, the duplicate mold 30 is formed from the intermediate mold 24, and then the light-transmitting layer 40 reinforced by the reinforcing plate 44 (this structure is generally called a micro lens array) is formed by using the duplicate mold 30 for each product. Since the expensive master mold 10 is used only when the intermediate mold 24 is formed, deterioration of the master mold 10 progresses at a slow pace, so that it is not necessary to frequently make the master mold 10, leading to the reduced production cost for the general micro lens array. Moreover, since the duplicate mold 30 is not removed directly from the master mold 10, a range of choice for the materials used for the two is widened and hence the shapes of the curved surfaces 26 and 36 can be transferred with high precision. This makes it possible to use various methods of forming the duplicate mold 30. This also makes it easy to improve the durability of the master mold 10 and the duplicate mold 30.

Step of Forming Thin Film

Figure 5A:
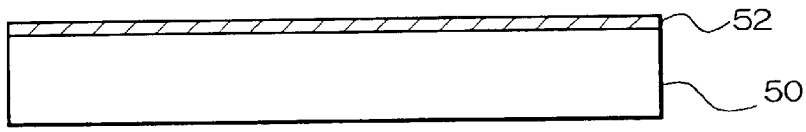
FIGS. 5A to 5C illustrate the steps of forming a micro lens array according to the first embodiment.
Figure 5B:
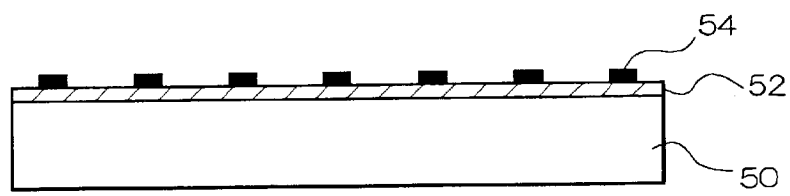

FIGS. 5A and 5B illustrate the step of forming a thin film.

As shown in FIG. 5A, a thin film 52 is formed on a base 50. The steps of forming the thin film are conducted in a different place from the place for the steps shown in FIGS. 1A to 4C, but there is no problem whether these steps are conducted in the same time or in separate times. The base 50 serves as a substrate for supporting the thin film 52 until the thin film 52 is transferred onto the light-transmitting layer 40 reinforced by the reinforcing plate 44 (this structure is a micro lens array in the general sense). A radiation-transmitting material is used for the base 50 as required in the subsequent steps. Given as examples of the thin film 52 are an electrode film or conductive film which are members of a display device to be produced, an insulated layer, various thin films forming a switching element of a TFT and the like, and an alignment layer used for a liquid crystal display device which will be described in a sixth embodiment of the present invention. The thin film 52 may have a light-transmissibility. A transparent electrode film as one example of the thin film 52 is, for example, an ITO (Indium Tin Oxide) film, which is formed by a vacuum filming method such as sputtering or vapor deposition, followed by annealing. The annealing temperature is generally in a range between 200 and 300° C. Higher temperatures are preferable to decrease the resistance, thereby producing a high quality electrode film. The base 50 must withstand high temperature annealing.

Shading layers 54 are then formed on the thin film 52 on the base 50, as shown in FIG. 5B. The shading layers 54 function as a black matrix for pixels of a display device, and partition the thin film into given areas according to the arrangement of the pixels.

Step of Attaching Thin Film

Figure 5C:
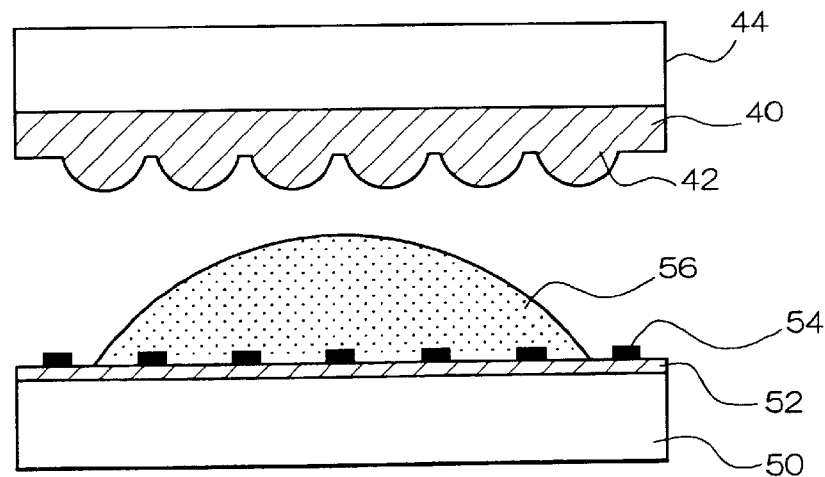

As shown in FIG. 5C, the surface of the base 50 on which the thin film 52 and the shading layers 54 are formed is attached to the surface of the light-transmitting layer 40 on which the lenses 42 are formed through an adhesive layer precursor 56. In more detail, the adhesive layer precursor 56 is dripped onto or applied to at least one of the base 50 and the light-transmitting layer 40 to attach the two together. The adhesive layer precursor 56 adheres the two to each other by the weight of the reinforcing plate 44 and the light-transmitting layer 40 (or the weight of the base 50 in the case where the base 50 is arranged on the upper side), or by applying pressure through the light-transmitting layer 40 or the base 50.

There are no specific limitations to the adhesive layer precursor 56 inasmuch as it has light-transmissibility and adhesion. For example, materials which can be cured by applying energy and plastic materials may also be used for the adhesive layer precursor 56. For example, the material of the adhesive layer precursor 56 may be selected from the materials which can be used for the light-transmitting precursor 38 shown in FIG. 4A.

Figure 6A:
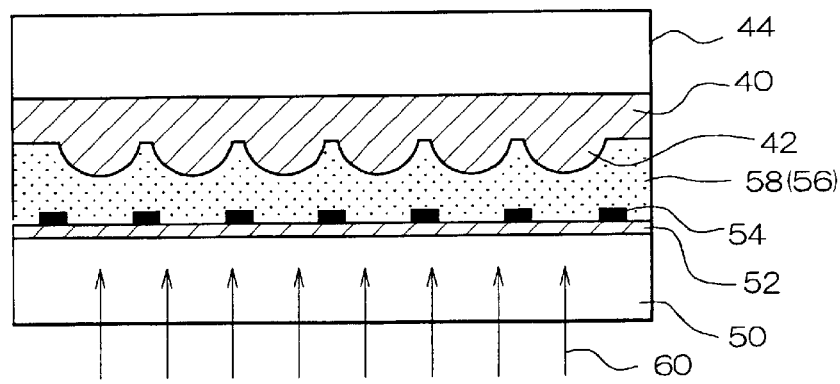
FIGS. 6A and 6B illustrate the steps of forming a micro lens array according to the first embodiment.

In this manner, the light-transmitting layer 40 reinforced by the reinforcing plate 44 is adhered to the base 50 on which the thin film 52 and the shading layers 54 are formed by the adhesive layer 58, as shown in FIG. 6A.

Step of Removing the Base

The base 50 is then removed. Depending upon the combination of materials forming the base 50 and the thin film 52, there is the case where the strong adhesion between the two makes it difficult to remove the thin film 52 from the base 50, giving rise to the problem of an increase in the percentage of defective items such as a lack of the thin film 52 or occurrence of cracks, the problem of reduction in productivity caused by the increased time required for removal, the problem of reduced durability of the base 50, and so on.

Figure 6B:
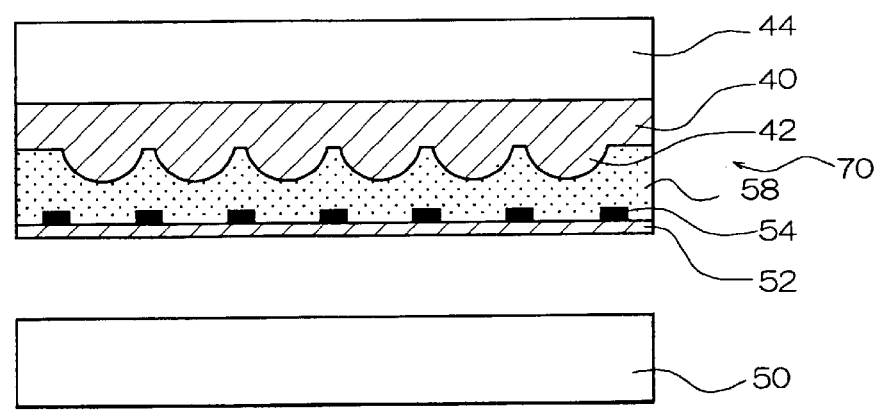

Because of this, as shown in FIG. 6A, radiation 60 is applied to the interface between the thin film 52 and the base 50 through the base 50. This reduces or removes the adhesion between the thin film 52 and the base 50, which makes it possible to remove the thin film 52 satisfactorily from the base 50, as shown in FIG. 6B.

In more detail, various bonding forces between atoms or molecules are reduced or eliminated at the interface between the base 50 and the thin film 52 to cause phenomena such as abrasion, resulting in interface delamination. Alternatively, there is the case where a component contained in the thin film 52 is vaporized and released by the radiation 60, whereby a separating effect is developed which contributes to the interface delamination.

In order to cause the interface delamination by irradiating the radiation 60, it is necessary that the base 50 be formed of a material through which the radiation 60 can be transmitted and the thin film 52 be formed of a material capable of absorbing the energy of the radiation 60.

The transmittance of the radiation 60 through the base 50 is 10% or more, and preferably 50% or more. It is preferable that the transmittance of the radiation 60 through the base 50 be higher to reduce the attenuation of the applied radiation 60, thereby causing phenomena such as abrasion by low energy. Given as an example of the material for the base 50 is quartz glass, which has high transmittance for light in a shorter wavelength range and exhibits superior mechanical strength and heat resistance.

As an example of the radiation 60, deep UV-light is given. An excimer laser has been put to practical use as a light source which outputs high energy in a short wavelength range. The excimer laser causes abrasion only in the vicinity of the interface over an extremely short time period and hence has almost no temperature impact on the base 50 and the thin film 52.

It is preferable to provide a washing treatment on the surface of the thin film 52 removed from the base 50 to remove the section which has been deteriorated by the radiation 60. It is noted that if the base 50 and the thin film 52 are easily removed from each other, the irradiation of the radiation 60 may be omitted.

A micro lens array 70 with a thin film can be thus obtained. According to this embodiment, the thin film 52 is formed in advance on the base 50 and hence the light-transmitting layer 40 reinforced by the reinforcing plate 44 (this structure is a micro lens array in a usual sense) is not damaged by the annealing treatment. Since the light-transmitting layer 40 is not exposed to a high temperature caused by the annealing treatment, a range of choice for materials is widened.

Second Embodiment

FIGS. 7A to 11 are illustrations for describing a second embodiment of the present invention.

Figure 7A:
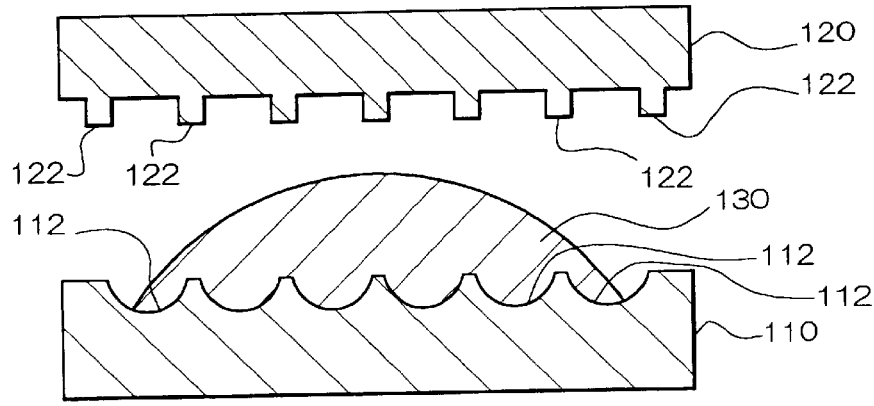
FIGS. 7A to 7C illustrate a method of manufacturing a micro lens array according to a second embodiment.

As shown in FIG. 7A, a first master mold 110 and a second master mold 120 are prepared. On the first master mold 110, plural curved surfaces 112 are formed, each curved surface 112 having a concave shape that is an inverse of the shape of a convex lens. On the other hand, on the second master mold 120, plural projections 122 are formed. The plural projections 122 are in the form of a black matrix when seen from a plan view.

The first and second master molds 110, 120 are arranged so that the respective curved surface 112 and projection 122 face each other and each projection 122 is formed not to be positioned above the center of the curved surface 112.

Then the master mold 110 is attached to the master mold 120 through a first light-transmitting layer precursor 130. The first light-transmitting layer precursor 130 is a material for a first light-transmitting layer 132 shown in FIG. 7C. Although the master mold 110 is disposed on the lower side in FIG. 7A, the master mold 120 may be disposed on the lower side instead.

A material used for the light-transmitting layer precursor 130 may be selected from the materials which can be used for the light-transmitting layer precursor 38 in the first embodiment.

Figure 7B:
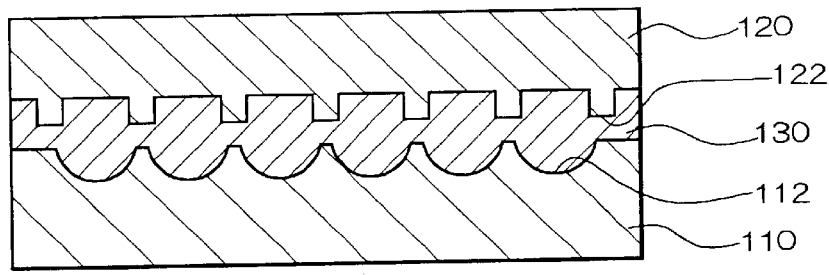
Figure 7C:
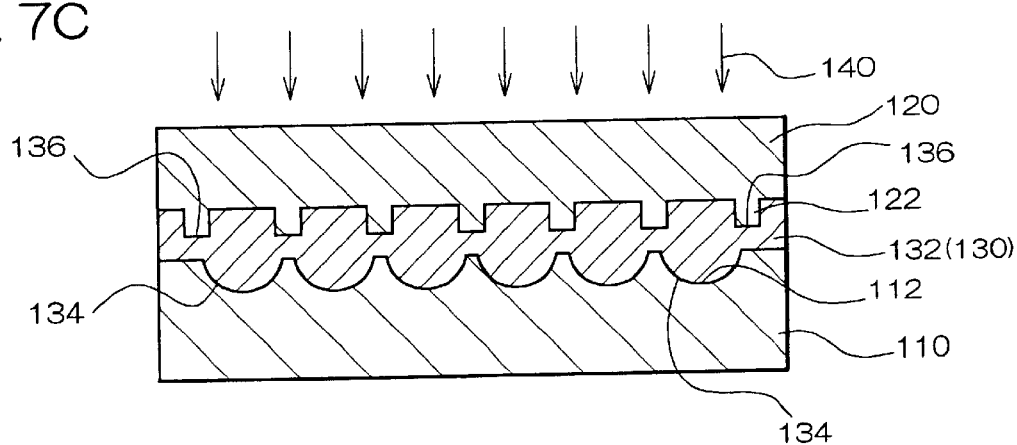

As shown in FIG. 7B, the light-transmitting layer precursor 130 is spread to a given area. A given pressure may be applied to at least one of the master molds 110, 120 as required. Although the light-transmitting layer precursor 130 is dripped onto the master mold 110, it may be dripped onto the master mold 120 or on both the master molds 110, 120. Alternatively, the light-transmitting layer precursor 130 may be applied to at least either one of the master molds 110, 120 or to both by a method such as a spin coating, dipping, spray coating, roll coating, or bar coating.

Moreover, if the light-transmitting layer precursor 130 is formed of, for example, a UV-curable resin, UV-light 140 is applied in a given amount to the light-transmitting layer precursor 130 through at least one of the master molds 110, 120 to cure the light-transmitting layer precursor 130. In this case, the master mold through which the UV-light is applied must have UV-ray transmissibility.

The light-transmitting layer 132 is formed between the master molds 110, 120 in this manner. Plural lenses 134 made by transferring the shapes of the plural curved surfaces 112 are on one surface of the light-transmitting layer 132. In general, this structure is called a micro lens array. Plural recesses 136 made by transferring the shapes of the plural projections 122 are on the other surface of the light-transmitting layer 132. The plural recesses 136 have the form of a black matrix when seen from a plan view though not shown. Each recess 136 is formed not to be positioned above the center of the lens 134.

Figure 8A:
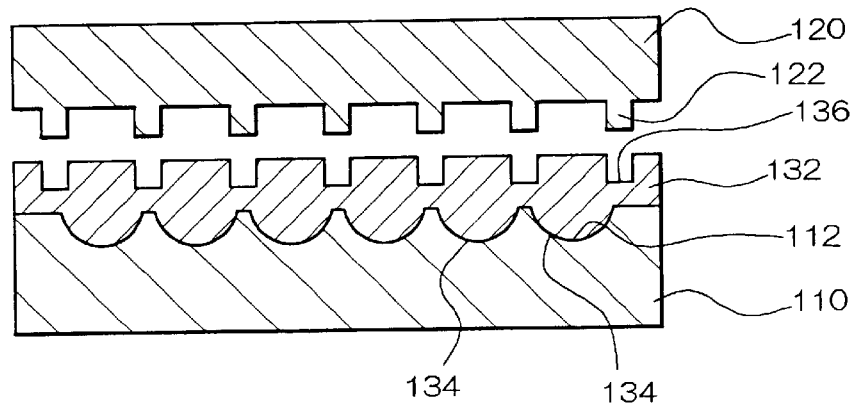
FIGS. 8A and 8B illustrate the method of manufacturing a micro lens array according to the second embodiment.

As shown in FIG. 8A, the master mold 120 is removed from the light-transmitting layer 132 to open the recesses 136 made by transferring the shapes of the projections 122.

Figure 8B:
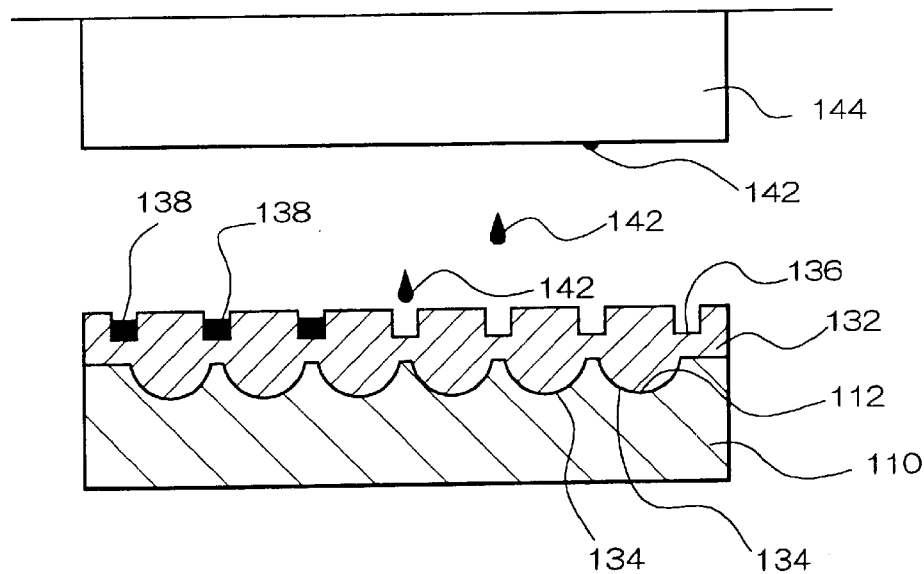

As shown in FIG. 8B, each recess 136 of the light-transmitting layer 132 is filled with a shading material 142 to form a shading layer 138. The shading layers 138 form a black matrix.

As the shading material 142, various materials which have durability but no light-transmissibility can be used. For example, a material obtained by dissolving a black dye or a black pigment together with a binder resin in a solvent can be used as the shading material 142. Although there are no specific limitations to the type of solvent, water or various organic solvents can be used. As the organic solvent, one of the following organic solvents and a mixed solution of plural solvents selected from these solvents may be used. Examples of these organic solvents include propylene glycol monomethyl ether acetate, propylene glycol monopropyl ether, methoxymethyl propionate, ethoxyethyl propionate, ethyl cellosolve, ethyl cellosolve acetate, ethyl lactate, ethyl pyruvinate, methyl amyl ketone, cyclohexanone, xylene, toluene and butyl acetate.

Although there are no specific limitations to a method for filling the recesses 136 with the shading material 142, the ink jet method is preferable. The ink jet method makes it possible to use ink economically at high speed without any waste by making use of the techniques which have been put to practical use for ink jet printers.

FIG. 8B shows the process of filling the recesses 136 with the shading material 142 by an ink jet head 144. Specifically, the ink jet head 144 is disposed so as to face the recesses 136 to jet the shading material 142 into each recess 136.

Various types of ink jet heads that have been put to practical use for ink jet printers can be used as the ink jet head 144, such as a piezo jet type which applies pressure to ink by utilizing volumetric variation of a piezoelectric element to jet ink, or a type which uses an electrothermal energy conversion member as an energy-generating element to expand the volume of ink or to vaporize ink for jetting ink by the pressure. In these types, an injecting area and an injecting pattern can be optionally set.

In this embodiment, the shading material 142 is jetted from the ink jet head 144. Consequently, it is necessary to ensure the fluidity of the shading material 142 to enable jetting from the ink jet head 144.

In order to fill the recesses 136 in the light-transmitting layer 132 equally with the shading material 142, the filling position is adjusted by some operations such as moving the ink jet head 144. When the recesses are uniformly filled with the shading material 142, the filling process is completed. When a solvent component is contained in the shading material 142, the solvent component is removed from the shading material 142 by heat treatment. Note that the shading material 142 shrinks by the removal of the solvent component. It is therefore necessary to provide a sufficient amount of the shading material 142 to keep the thickness for ensuring a required shading property after the shrinkage.

Figure 9A:
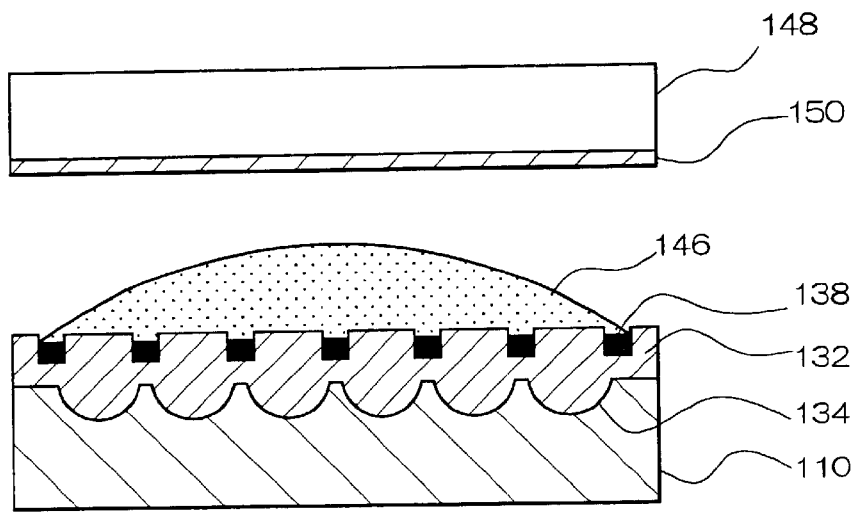
FIGS. 9A to 9C illustrate the method of manufacturing a micro lens array according to the second embodiment.
Figure 9B:
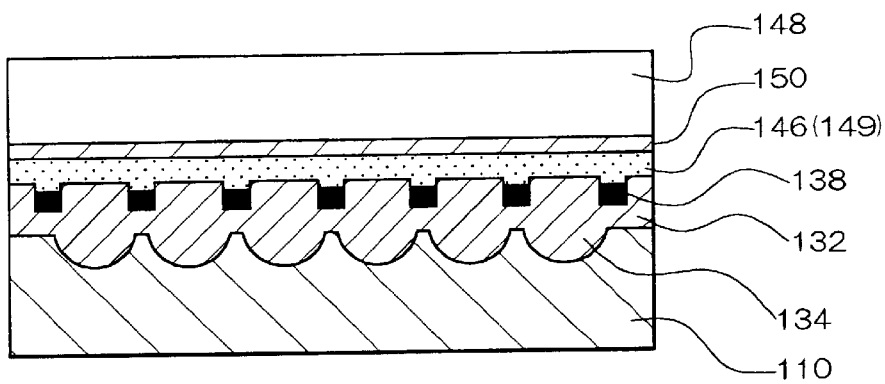

After the above steps, an adhesive layer precursor 146 is dripped onto the light-transmitting layer 132, as shown in FIG. 9A. A material for the adhesive layer precursor 146 can be selected from the materials which can be used for the adhesive layer precursor 56 of the first embodiment. Then a base 148 that is provided with a thin film 150 in advance is attached to the adhesive layer precursor 146 to spread out the adhesive layer precursor 146. The thin film 150 is formed by the same process as in the formation of the thin film 52 in the first embodiment. A material for the base 148 may be selected from the materials which can be used for the base 50 in the first embodiment.

The adhesive layer precursor 146 may be spread on the light-transmitting layer 132 or on the base 148 by a method such as a spin coating or roll coating prior to the attachment of the base 148.

The adhesive layer precursor 146 is made into an adhesive layer 149 which bonds the thin film 150 formed on the base 148 to the surface of the light-transmitting layer 132 on which the shading layers 138 are formed.

Figure 9C:
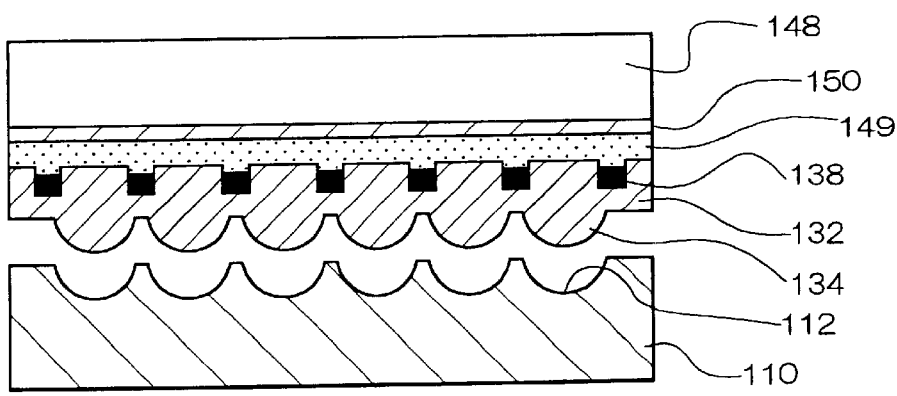

After that, the master mold 110 is removed from the light-transmitting layer 132, as shown in FIG. 9C. Since the light-transmitting layer 132 has the lenses 134 formed by the curved surfaces 112 of the master mold 110, this structure is called a "micro lens array" in general. In the present invention, however, a structure further including the thin film is defined as a "micro lens array".

Figure 10A:
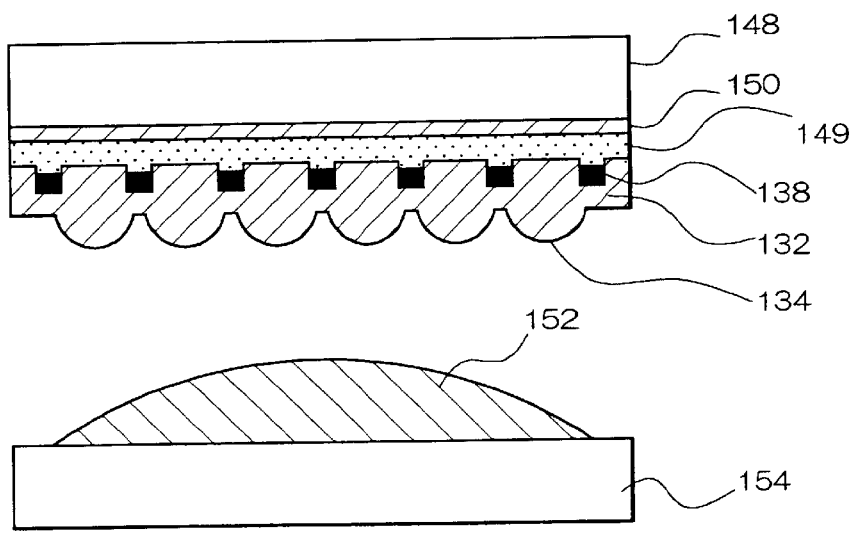
FIGS. 10A and 10B illustrate the method of manufacturing a micro lens array according to the second embodiment.
Figure 10B:
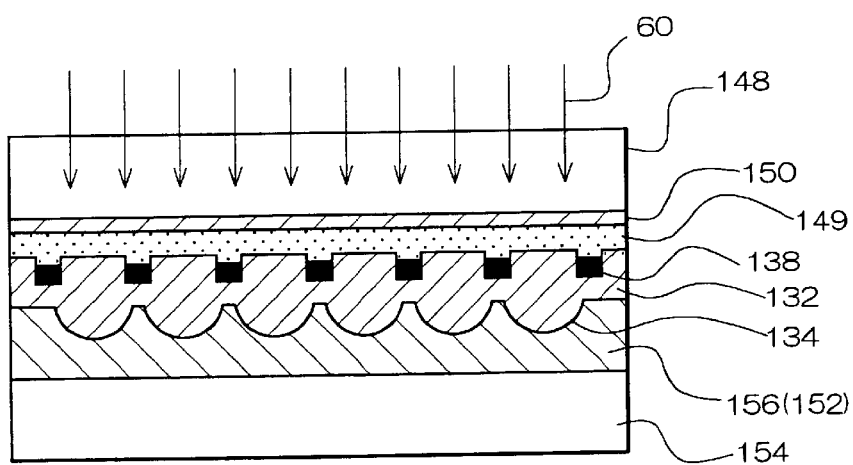

As shown in FIG. 10A, the surface of the light-transmitting layer 132 on which the lenses 134 are formed is attached to a reinforcing plate 154 through a second light-transmitting layer precursor 152. The second light-transmitting layer precursor 152 is a material for a second light-transmitting layer 156 shown in FIG. 10B. The attaching process is the same as the step shown in FIG. 9A. A material for the second light-transmitting layer precursor 152 may be selected from the materials which can be used for the first light-transmitting layer precursor 130.

The reinforcing plate 154 is used to reinforce a micro lens array. If the micro lens array itself has the processing durability required in the manufacturing steps and the characteristics such as mechanical strength required for a micro lens array, the reinforcing plate 154 is not necessary.

Figure 11:
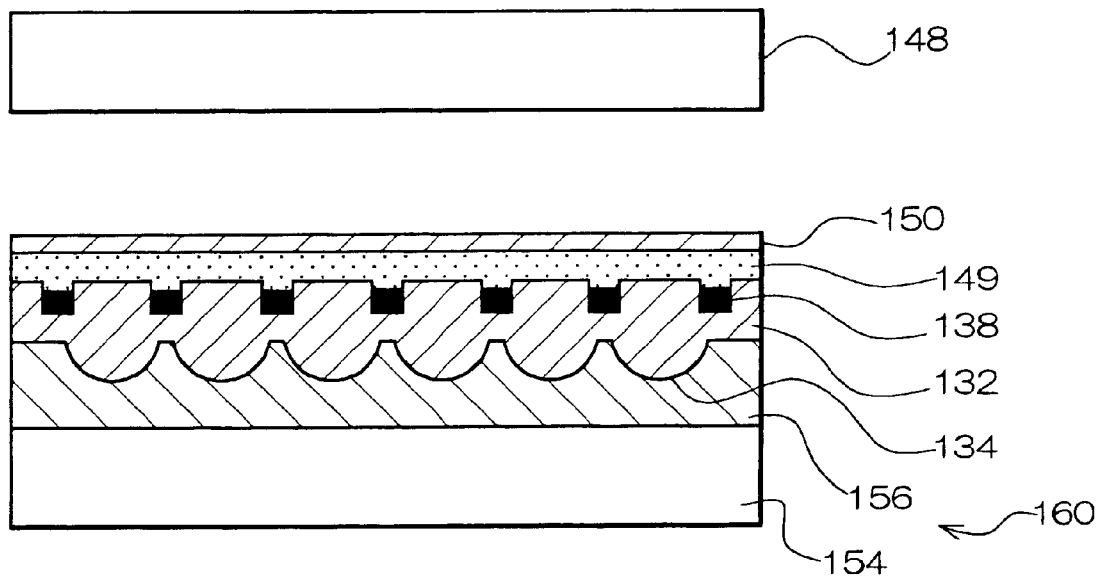
FIG. 11 illustrates the method of manufacturing a micro lens array according to the second embodiment.

The interface between the thin film 150 and the base 148 is exposed to the radiation 60 through the base 148 in the same process as shown in FIG. 6A according to the first embodiment to remove the base 148 as shown in FIG. 11. If the base 148 and the thin film 150 can be easily separated from each other, the irradiation of the radiation 60 can be omitted.

A micro lens array 160 having the thin film 150 as shown in FIG. 11 is thus obtained.

In this embodiment, the first master mold 110 is attached to the second master mold 120 through the first light-transmitting layer precursor 130, and the lenses 134 are made by transferring the shapes of the curved surfaces 112 of the first master mold 110. Thus, the light-transmitting layer 132 having the plural lenses 134 can be simply formed. In this method, materials are used with high efficiency and the number of steps can be reduced, leading to cost reduction. The first and second master molds 110, 120 can be used repeatedly as long as the durability permits. So the step of forming these master molds can be omitted in the steps of forming the second and subsequent micro lens arrays, resulting in reduction in the number of steps and in cost.

Moreover, on the light-transmitting layer 132, the recesses 136 are formed by transferring the shapes of the projections 122 of the second master mold 120. The recesses 136 are filled with the shading material 142. The shading layers 138 formed of the shading material 142 function as the black matrix, improving the contrast between pixels.

According to this embodiment, a micro lens array that has no damage to the light-transmitting layer 132 caused by the annealing treatment in the formation of the thin film and has an improved contrast can be simply manufactured by transferring.

Third Embodiment

FIGS. 12A to 13C are views for describing a third embodiment of the present invention.

In the aforementioned first embodiment, a micro lens array having convex lenses is formed. In the case where a micro lens array has concave lenses, each curved surface 19 of the master mold 10 must have a concave shape.

In the first embodiment, the duplicate mold 30 is formed by the intermediate mold 24 that is formed based on the master mold 10. However, the duplicate mold may be formed directly from the master mold. In this case, in order to manufacture a micro lens array having convex lenses as in the first embodiment, a master mold having convexly curved surfaces must be prepared to form a duplicate mold with concavely curved surfaces from this master mold.

So this embodiment relates to a method of forming a master mold having convexly curved surfaces.

Figure 12A:
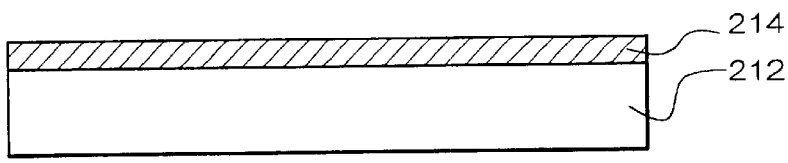
FIGS. 12A to 12E illustrate a method of manufacturing a master mold according to a third embodiment.

At first, a resist layer 214 is formed on a substrate 212 as shown in FIG. 12A. The process and the materials for the substrate 212 and the resist layer 214 are the same as those in the first embodiment (see FIG. 1A).

Figure 12B:
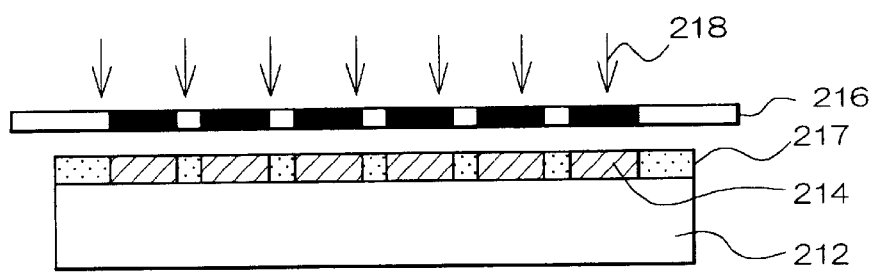

As shown in FIG. 12B, a mask 216 is disposed above the resist 214 and only predetermined areas of the resist layer 214 are exposed to radiation 218 through the mask 216. The mask 216 has a pattern not to allow the areas required for the formation of curved surfaces 219 shown in FIG. 13C to be exposed to the radiation 218.

Figure 12C:
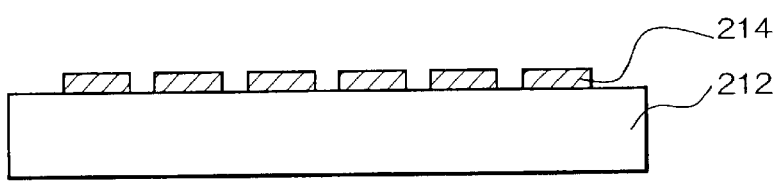

When a developing treatment is carried out under given conditions after the resist layer 214 is exposed to the radiation 218, only areas 217 exposed to the radiation 218 in the resist layer 214 are selectively removed, and part of the surface of the substrate 212 is exposed, as shown in FIG. 12C. The other part of the substrate is kept to be covered by the residual resist layer 214.

Figure 12D:
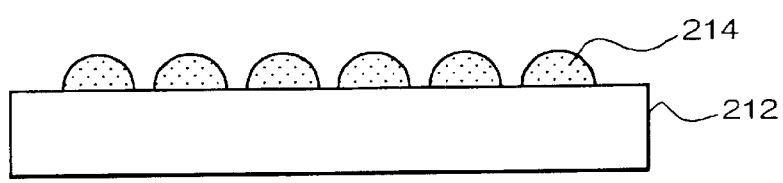

After the patterning of the resist layer 214 is completed in this manner, the remaining portions of the resist layer 214 are heated in a reflow step. Each portion of the resist layer 214 is fused to have a curved surface due to surface tension, as shown in FIG. 12D.

Figure 12E:
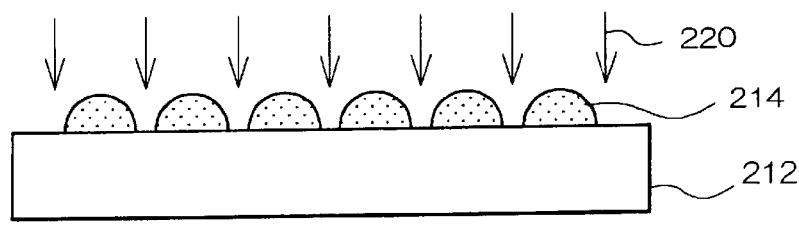

As shown in FIG. 12E, using the remaining resist layer 214 as a mask, the substrate 212 is etched to a given depth by an etchant 220. In more detail, dry etching such as anisotropic etching, e.g., reactive ion etching (RIE) is performed.

Figure 13A:
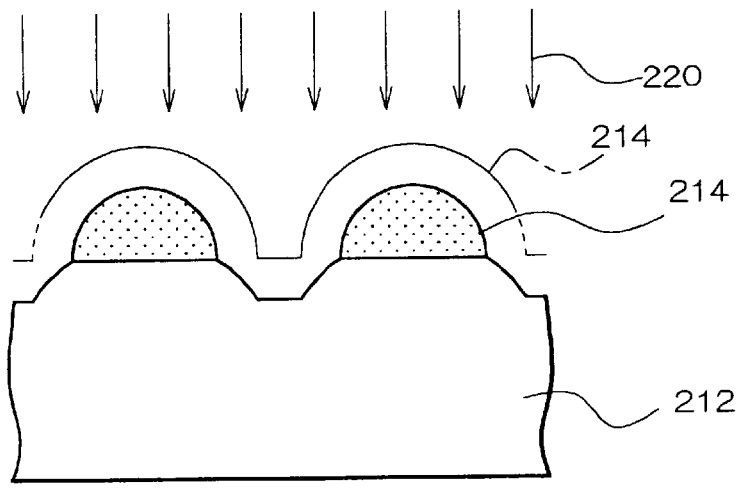
FIGS. 13A to 13C illustrate a process for etching in the third embodiment.
Figure 13B:
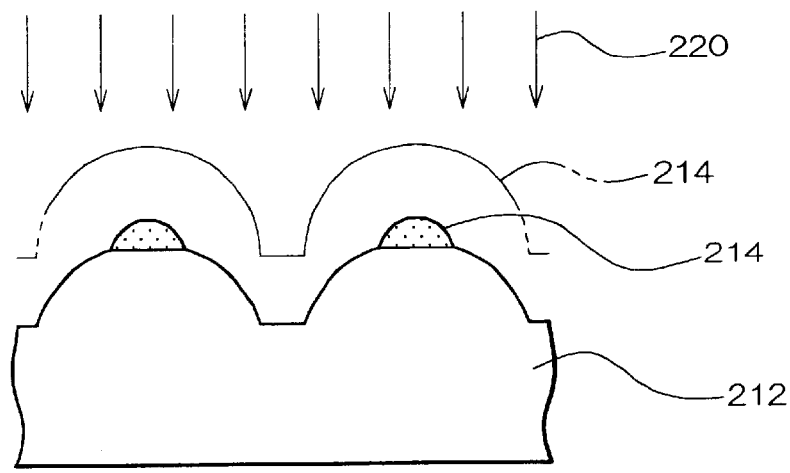
Figure 13C:
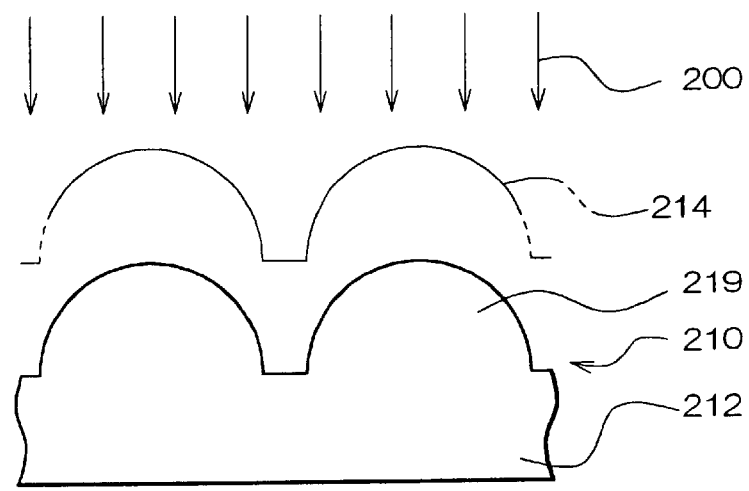

FIGS. 13A to 13C illustrate a process in which the substrate is etched. The substrate 212 is partially covered by the remaining portions of the resist layer 214 each having a curved surface. The substrate 212 is first etched in the area which is not covered by the resist layer 214. Then each of the remaining portions of the resist layer 214 is etched by the etchant 220 and is gradually reduced in size from the area shown by the dot-dot-dash line to the area shown by the solid line as shown in FIGS. 13A and 13B. As each portion of the resist layer 214 is reduced in size, the substrate 212 is gradually exposed and the exposed area is continuously and gradually etched since each portion of the resist layer 214 has a curved surface. Because the substrate 212 is continuously and gradually etched, the surface of the substrate 212 after being etched is curved. The convexly curved surfaces 219 are thus formed on the substrate 212 and a master mold 210 is obtained, as shown in FIG. 13C.

This master mold 210, once it is formed, can also be used repeatedly as long as its durability permits, that is economical. Moreover, the step of forming the master mold 210 can be omitted in the steps of forming the second and subsequent micro lens arrays, resulting in reduction in the number of steps and in cost.

Fourth Embodiment

Figure 14:
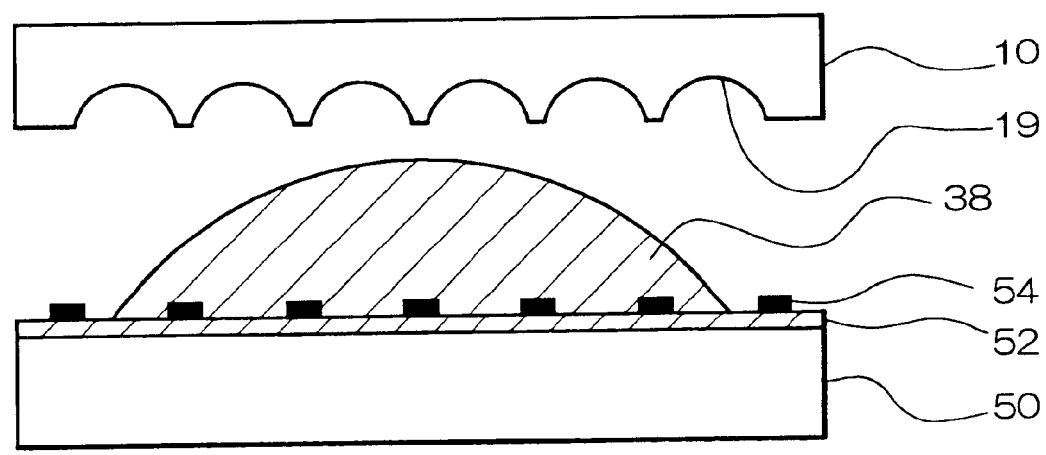
FIG. 14 illustrates a method of manufacturing a micro lens array according to a fourth embodiment.
Figure 15A:
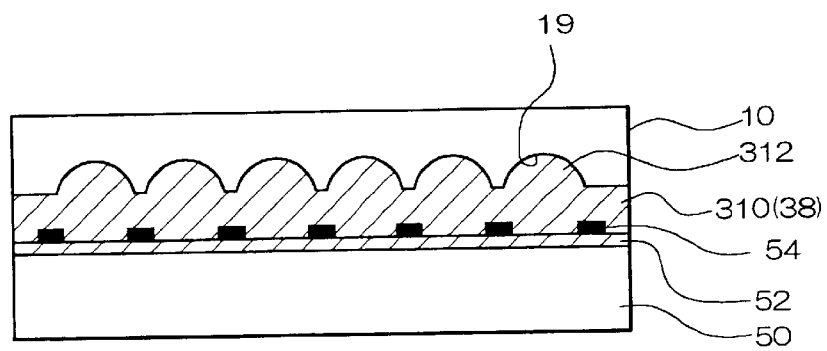
FIGS. 15A and 15B illustrate the method of manufacturing a micro lens array according to the fourth embodiment.
Figure 15B:
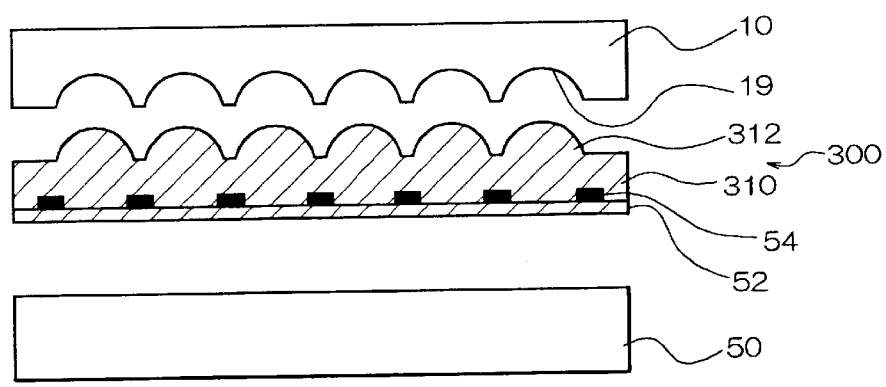

FIGS. 14 and 15B are views for describing a fourth embodiment of the present invention. In this embodiment, as shown in FIG. 14, the master mold 10, the base 50 having the shading layers 54 and the thin film 52 and the light-transmitting layer precursor 38, which are used in the first embodiment are used. The surface of the master mold 10 on which the curved surfaces 19 are formed is arranged to face the surface of the base 50 on which the shading layers 54 and the thin film 52 are formed, and the two are attached to each other through the light-transmitting layer precursor 38.

As shown in FIG. 15A, a light-transmitting layer 310 is formed between the base 50 and the master mold 10 in this manner. In the light-transmitting layer 310, a plurality of convex lenses 312 are formed by transferring the shapes of the curved surfaces 19 of the master mold 10.

Then, as shown in FIG. 15B, the master mold 10 is removed from the light-transmitting layer 310 and the base 50 is removed from the thin film 52 to obtain a micro lens array 300 having the thin film 52. The removal step is the same as in the first embodiment.

In this embodiment, the light-transmitting layer 310 is attached to the thin film 52 on the base 50 during the step of forming the light-transmitting layer 310 from the light-transmitting layer precursor 38. Therefore, the total number of steps can be reduced. Also, as in the first embodiment, any damage to the light-transmitting layer 310 due to the annealing treatment can be prevented in this embodiment.

Fifth Embodiment

Figure 16:
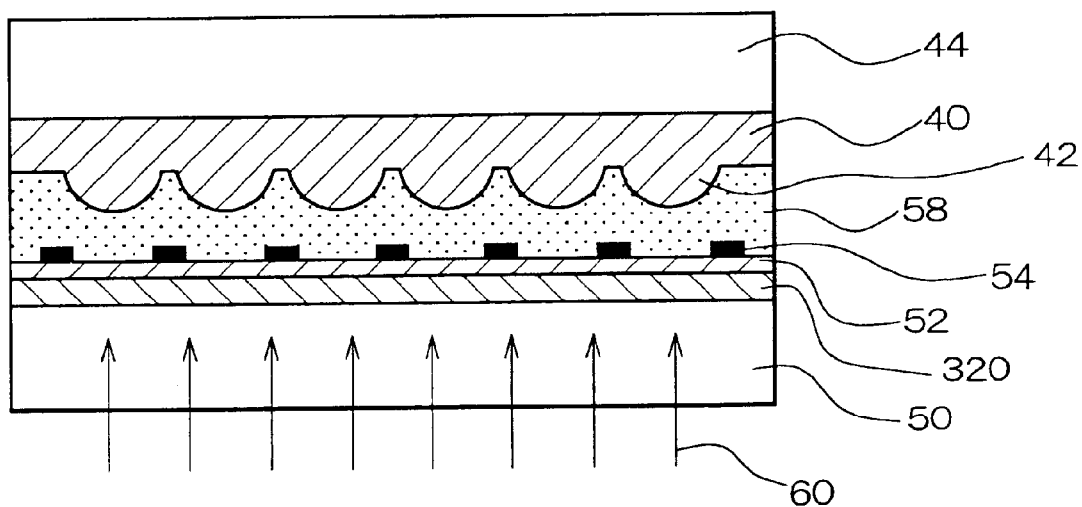
FIG. 16 illustrates a method of manufacturing a micro lens array according to a fifth embodiment.
Figure 17A:
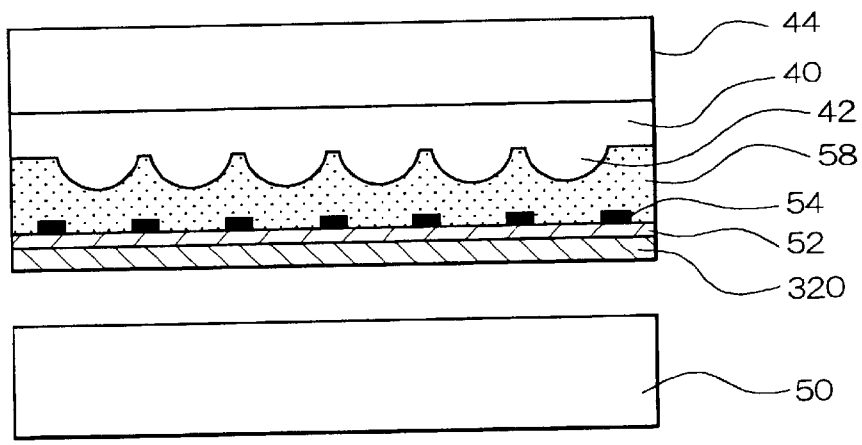
FIGS. 17A to 17C illustrate the method of manufacturing a micro lens array according to the fifth embodiment.
Figure 17B:
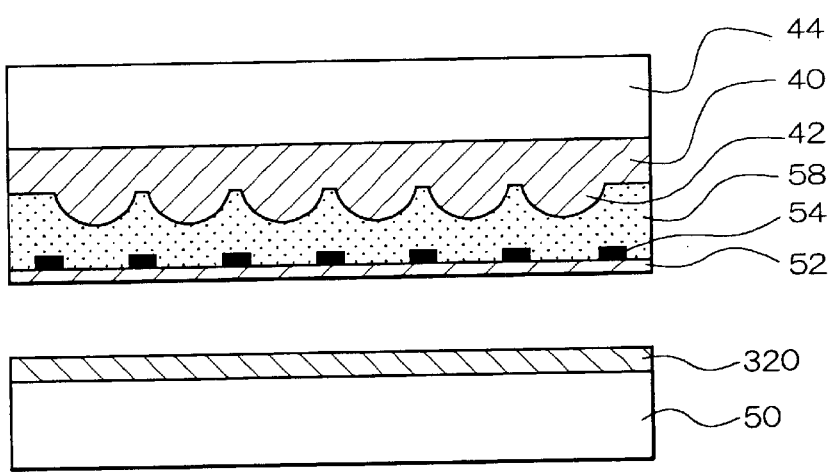
Figure 17C:
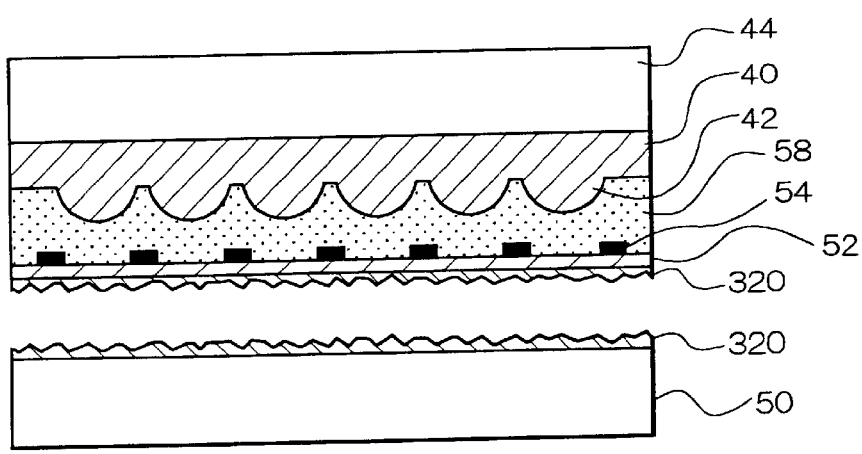

FIGS. 16 to 17C are views for describing a fifth embodiment of the present invention. This embodiment is a modification of the first embodiment. As shown in FIG. 16, a separation layer 320 is formed between the base 50 and the thin film 52. Specifically, the separation layer 320 is first formed and the thin film 52 is then formed on the separation layer 320. Other structures are the same as in the first embodiment.

The base 50 is easily removed from the thin 52 by exposing the separation layer 320 to the radiation 60 through the base 50.

Examples of materials used for the separation layer 320 include various oxides ceramics such as amorphous silicon, silicon oxide, silicic acid compounds, titanium oxide, titanic acid compounds, zirconium oxide, zirconic oxides, lanthanum oxides, and lanthanic acid compounds; dielectrics (or ferroelectrics) or semiconductor; nitride ceramics such as silicon nitride, aluminum nitride and titanium nitride; organic polymer materials such as acrylic resins, epoxy resins, polyamides and polyimides; and one substance or alloys of two or more substances selected from the group consisting of Al, Li, Ti, Mn, In, Sn, Y, La, Ce, Nd, Pr, Gd and Sm. Suitable material is selected from these according to the process conditions and the materials used for the base 50 and the thin film 52.

There are no specific limitations to the method of forming the separation layer 320, and the method is selected according to the composition and the film thickness to be formed. For example, vapor deposition methods such as CVD, vapor deposition, sputtering or ion plating, electroplating, electroless plating, a Langmuir-Blodgett (LB) method, spin coating method, dipping method, spray coating method, roll coating method, and bar coating method can be used.

When the thickness of the separation layer 320 is insufficient, damage to the thin film 52 is increased. On the other hand, when the thickness is too great, the amount of the radiation 46 for ensuring high releasability of the separation layer 320 must be increased. Therefore, the thickness of the separation layer 320 is preferably about 1 nm to 20 $\mu$m, more preferably about 10 nm to 10 $\mu$m, and most preferably about 40 nm to 1 $\mu$m, depending on the objective of removal and composition. It is preferable that the film thickness of the separation layer 320 is as uniform as possible.

The separation layer 320 can be removed from the base 50 upon exposure to the radiation 60 as shown in FIG. 16. Three types of separation are shown in FIGS. 17A to 17C.

FIG. 17A illustrates an example in which the bonding force between the base 50 and the separation layer 320 is reduced, causing the two to separate. In this case, it is preferable to perform a releasing (washing) treatment to remove the separation layer 320 from the thin film 52.

FIG. 17B illustrates an example in which the bonding force between the thin film 52 and the separation layer 320 is reduced, causing the two to separate. In this case, it is preferable to perform a washing treatment on the surface of the thin film 52 since there is the case where a part of the separation layer 320 adheres to the thin film 52.

FIG. 17C illustrates an example in which the bonding force between molecules or atoms in the separation layer 320 is reduced, causing separation. In this case, performing a washing treatment to remove residual separation layer 320 from the thin film 52 is also preferable.

Figure 18:
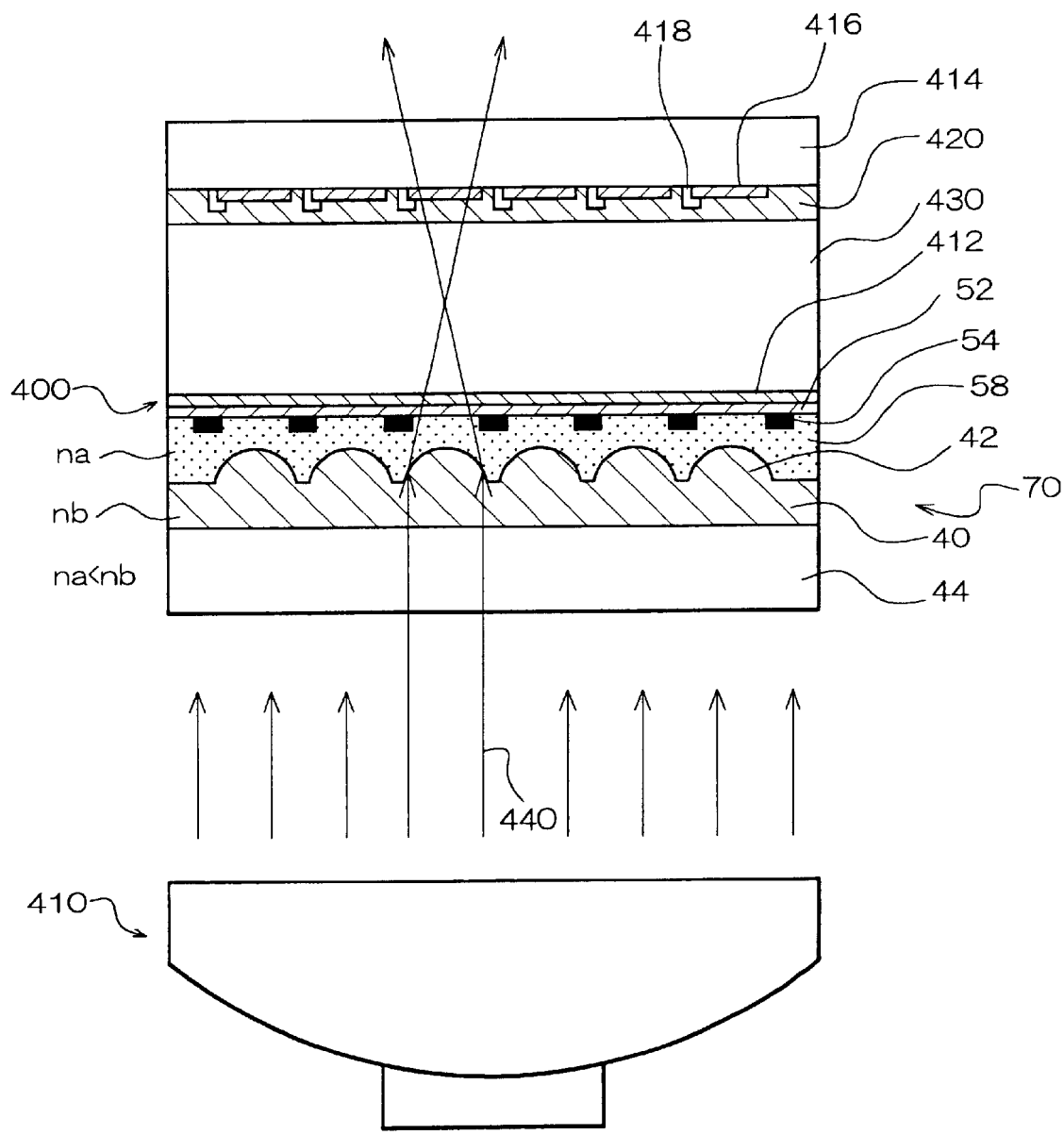
FIG. 18 illustrates an electronic device provided with a micro lens array according to the present invention.

FIG. 18 illustrates part of a liquid crystal projector to which the micro lens array according to the present invention is applied. This liquid crystal projector comprises a light valve 400 into which the micro lens array 70 manufactured by the method according to the aforementioned first embodiment is incorporated and a lamp 410 as a light source.

The micro lens array 70 is disposed in a manner so that the lenses 42 face in the direction opposite to the lamp 410. An alignment layer 412 is formed on the thin film 52. A TFT substrate 414 is disposed such that there is a gap between the TFT substrate 414 and the alignment layer 412. On the TFT substrate 414, transparent individual electrodes 416 and thin film transistors 418 are formed, and an alignment layer 420 is formed on these materials. The TFT substrate 414 is disposed in a manner so that the alignment layer 420 faces the alignment layer 412.

A liquid crystal 430 is sealed between these alignment layers 412, 420 and is driven by applying voltage controlled by the thin film transistor 418.

This liquid crystal projector can display a clear image since light 440 emitted from the lamp 410 is converged on each pixel by each lens 42.

This is based on the premise that the following relation must be established between light refractive index na of the adhesive layer 58 and light refractive index nb of the light-transmitting layer 40:

$$na < nb$$

Satisfying this condition makes it possible to pass the light from a medium having a higher refractive index to a medium having a lower refractive index. Specifically, the light 440 is refracted and converged to a direction away from the normal line of the interface between the two media to obtain a clear image.

Figure 19:
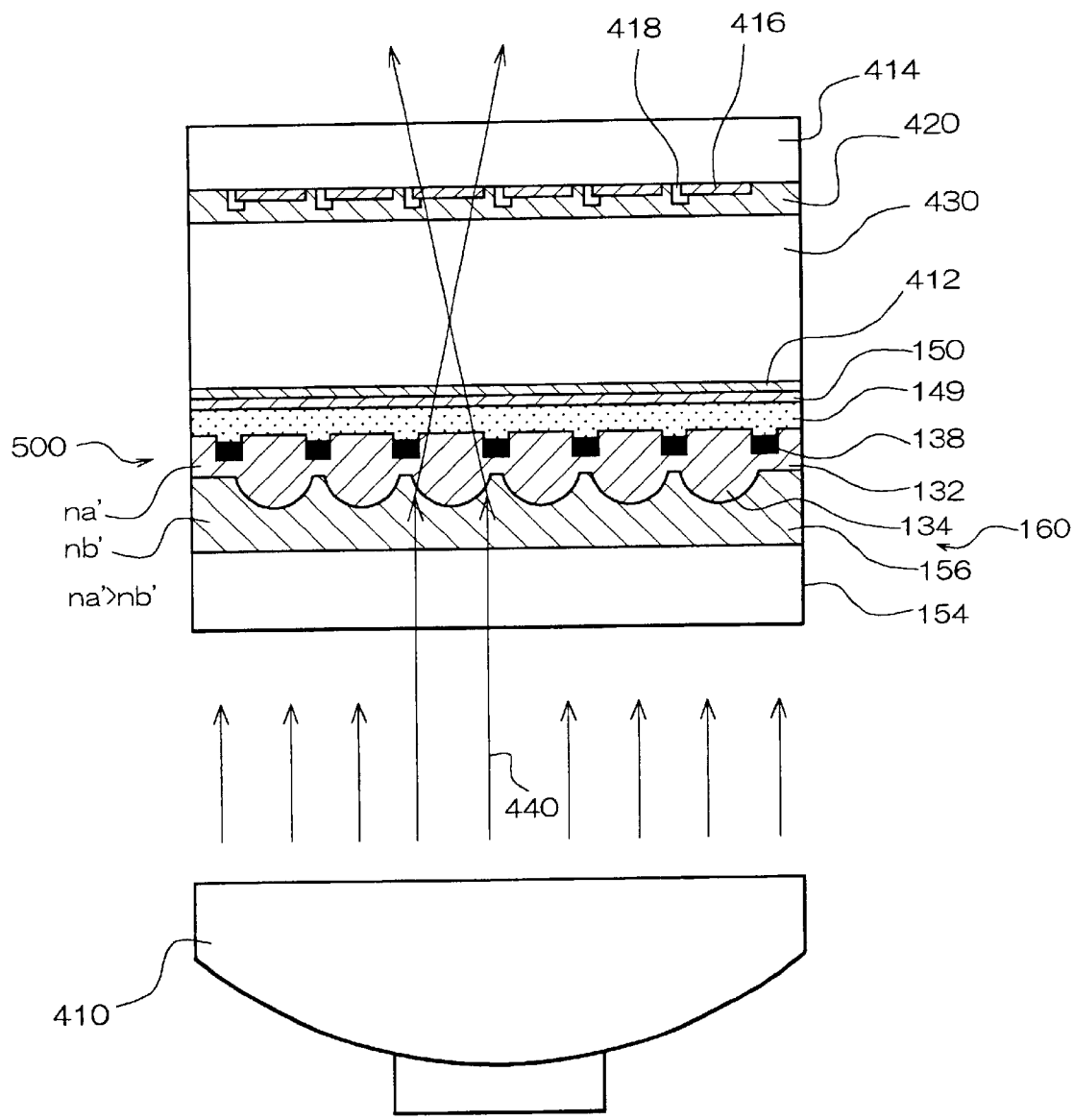
FIG. 19 illustrates an electronic device provided with a micro lens array according to the present invention.

FIG. 19 is a view showing a part of a liquid crystal projector to which a micro lens array according to the present invention is applied. This liquid crystal projector comprises a light valve 500 into which the micro lens array 160 manufactured by the method according to the aforementioned second embodiment is incorporated, and a lamp 410 as a light source.

The micro lens array 160 is disposed in a manner so that the lenses 134 face in a direction of the lamp 410. An alignment layer 412 is formed on the thin film 150. A TFT substrate 414 is disposed such that there is a gap between the TFT substrate 414 and the alignment layer 412. On the TFT substrate 414, transparent individual electrodes 416 and thin film transistors 418 are formed, and an alignment layer 420 is formed on these materials. The TFT substrate 414 is disposed in a manner so that the alignment layer 420 faces the alignment layer 412.

A liquid crystal 430 is sealed between these alignment layers 410, 420 and is driven by applying voltage controlled by the thin film transistor 418.

This liquid crystal projector can display a clear image since light 440 emitted from the lamp 410 is converged on each pixel by each lens 134.

This is based on the premise that the following relation must be established between light refractive index na' of the first light-transmitting layer 132 and light refractive index nb' of the second light-transmitting layer 156:

$$na' > nb'$$

Satisfying this condition makes it possible to pass the light from a medium having a lower refractive index to a medium having a higher refractive index. Specifically, the light 440 is refracted and converged to a direction approaching the normal line of the interface between the two media to obtain a clear image.

Sixth Embodiment

FIGS. 20A to 25C are views for illustrating a sixth embodiment of the present invention.

Step of Forming Master Mold

FIGS. 20A to 20E illustrate the steps of forming a master mold in the sixth embodiment.

Figure 20A:
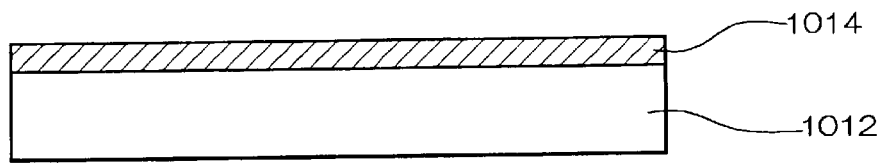
FIGS. 20A to 20E illustrate the steps of forming a master mold according to the sixth embodiment.

As shown in FIG. 20A, a resist layer 1014 is formed on a substrate 1012. The substrate 1012 becomes a master mold 1010 (see FIG. 20E) by etching the surface thereof. Although there are no specific limitations to the materials used for the substrate 1012 insofar the materials can be etched, silicon or quartz is preferable since curved surfaces 1019 (see FIG. 20E) can be formed by etching with high precision.

As a material for forming the resist layer 1014, for example, a commercially available positive resist which is normally used in the manufacture of a semiconductor device, and is obtained by compounding a diazonaphthoquinone derivative as a photosensitive agent with a cresol/novolak resin can be used. When the positive resist is exposed to radiation through a mask with a given pattern, the areas exposed to the radiation can be selectively removed by a developer.

As a method of forming the resist layer 1014, a spin coating method, dipping method, spray coating method, roll coating method, bar coating method, or the like can be used.

Figure 20B:
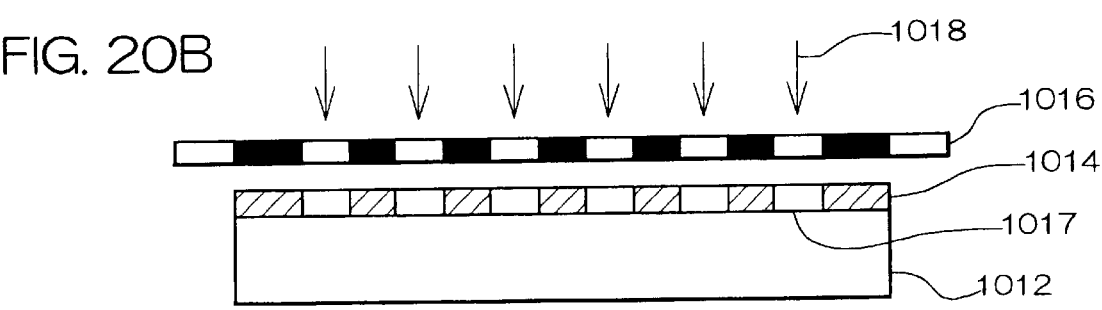

As shown in FIG. 20B, a mask 1016 is disposed above the resist layer 1014 and given areas of the resist layer 1014 are exposed to radiation 1018 through the mask 1016.

Figure 20C:
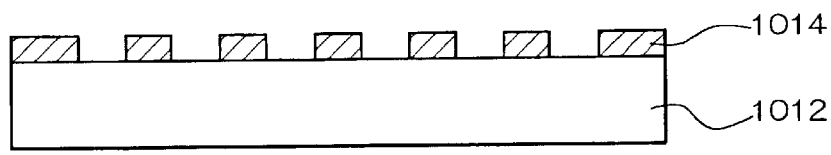
Figure 20D:
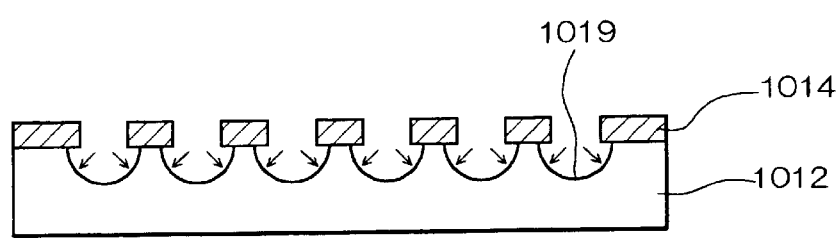
Figure 20E:
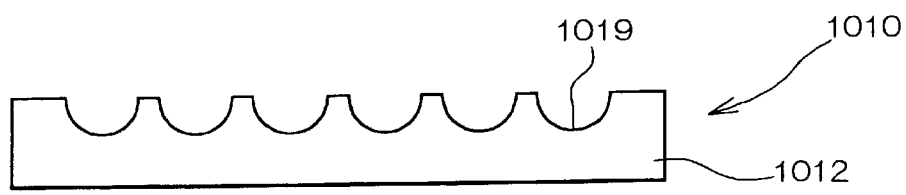

The mask 1016 is patterned so that only the areas required for forming the curved surfaces 1019 shown in FIG. 20E are exposed to the radiation 1018.

As the radiation, light having a wavelength from 200 nm to 500 nm is preferable. The use of light having this wavelength range makes it possible to utilize photolithographic technology established in the formation of liquid crystal panels and facilities for this technology, thereby reducing production costs.

The resist layer 1014 is developed under given conditions after exposure to the radiation 1018. As a result, as shown in FIG. 20C, only the areas 1017 of the resist layer 1014 exposed to the radiation 1018 are selectively removed to expose part of the surface of the substrate 1012 and the remainder remains being covered with the resist layer 1014.

After the resist layer 1014 is thus patterned, the substrate 1012 is etched to a given depth using the residual resist layer 1014 as a mask, as shown in FIG. 20D. In more detail, isotropic etching in which etching proceeds in all directions is performed on the areas of the substrate 1012 not covered by the resist layer 1014. For example, wet etching is applied by dipping the substrate 1012 in a chemical solution (etchant) to perform the isotropic etching. When quartz is used as the substrate 1012, an aqueous solution (buffered hydrofluoric acid) made by mixing hydrofluoric acid with ammonium fluoride is used as an etchant. The curved surfaces 1019 each having a concave shape are formed on the substrate 1012 by performing the isotropic etching. Each curved surface 1019 has an inverted curvature of each lens 1042 (see FIG. 23C) in a light-transmitting layer 1040 which is finally formed.

The resist layer 1014 is removed after the etching, whereby the master mold 1010 having the curved surfaces 1019 in the substrate 1012 is formed as shown in FIG. 20E.

In this embodiment, the master mold 1010 can be used repeatedly as long as durability permits, which is economical. Consequently, the step of forming the master mold 1010 can be omitted in the formation of second or subsequent micro lens array, thereby reducing the number of steps and production costs.

In this embodiment, a positive resist is used for forming the curved surfaces 1019 on the substrate 1012. Alternatively, a negative resist may be used. When the negative resist is exposed to radiation through a mask with a given pattern, the areas exposed to the radiation are insolubilized in a developer, and the areas not exposed to the radiation can be selectively removed by a developer. In this case, a mask with a pattern which is the inverse of the pattern of the mask 1016 is used. Alternatively, a resist may be directly exposed to laser beams or electron beams for patterning without using a mask.

Step of Forming Intermediate Mold

Figure 21A:
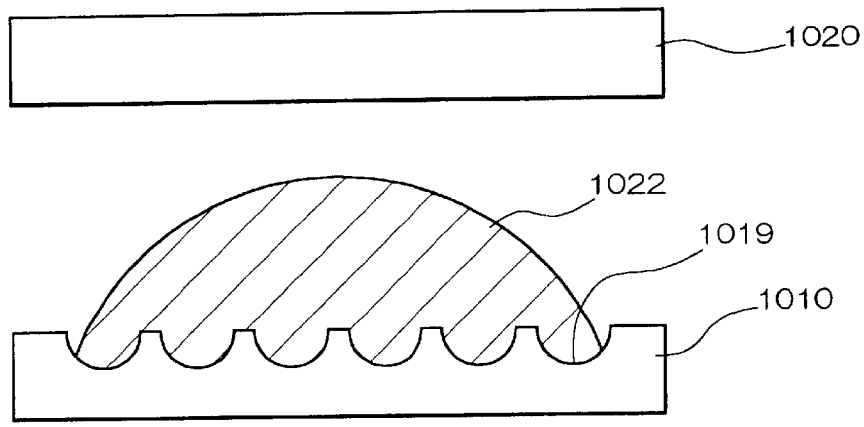
FIGS. 21A to 21C illustrate the steps of forming an intermediate mold from a master mold according to the sixth embodiment.
Figure 21B:
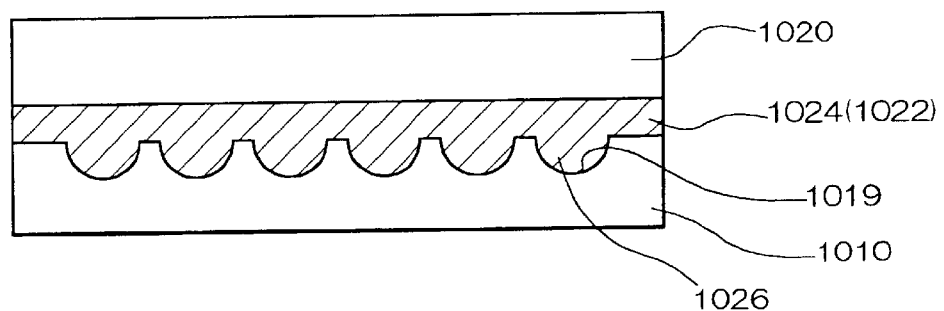
Figure 21C:
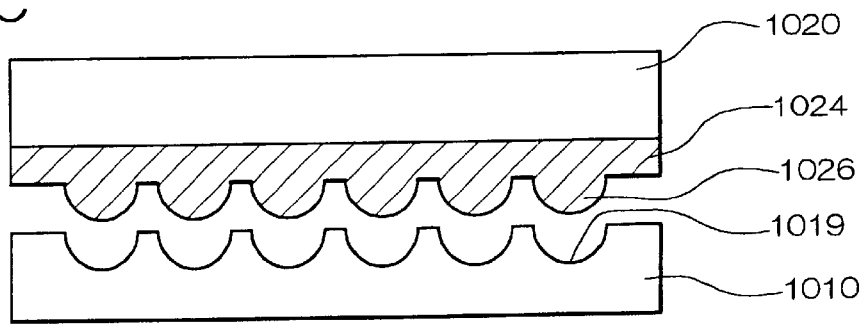

FIGS. 21A to 21C illustrate the steps of forming an intermediate mold. As shown in FIG. 21A, an intermediate mold precursor 1022 is placed on the surface of the master mold 1010 on which the curved surfaces 1019 are formed. A reinforcing plate 1020 is then attached to the master mold 1010 through the intermediate mold precursor 1022, and the intermediate mold precursor 1022 is spread to a given area to form a layer between the master mold 1010 and the reinforcing plate 1020, as shown in FIG. 21B.

Although the intermediate mold precursor 1022 is placed on the master mold 1010 in this case, it may be placed on the reinforcing plate 1020 or on both the master mold 1010 and the reinforcing plate 1020. Alternatively, the intermediate mold precursor 1022 may be spread to a predetermined area in advance on one or both of the master mold 1010 and the reinforcing plate 1020 using a spin coating method, spray coating method, roll coating method, bar coating method, dipping method, or the like.

The reinforcing plate 1020 is used to reinforce the intermediate mold 1024. There are no specific limitations to the materials for the reinforcing plate 1020 insofar as the materials possess processing durability in the steps of forming the intermediate mold 1024 and a duplicate mold 1030 from the intermediate mold 1024. For example, a substrate made of quartz, glass, resins, metals, or ceramic can be used. If the intermediate mold 1024 can solely fulfill the above processing durability, the reinforcing plate 1020 is not required.

There are no specific limitations to the material for the intermediate mold precursor 1022 insofar as the material has superior releasability from the master mold, and superior capability of transferring the shape of the curved surfaces 1019 from the master mold 1010, and also, insofar as the material has the processing durability and superior capability of transferring the shape of curved surfaces 1026 from the intermediate mold 1024 to the duplicate mold 1030 when forming the duplicate mold 1030 from the intermediate mold 1024. However, the intermediate mold precursor 1022 is preferably a liquid material or a liquefiable material. Use of such a liquid material as the intermediate mold precursor makes it easy to fill the intermediate mold precursor 1022 into the curved surfaces 1019 of the master mold 1010. Materials which are curable by applying energy can be used as the liquid material, and plastic materials can be used as the liquefiable material.

When a resin is selected as the material for the intermediate mold precursor 1022, those having energy-curability or plasticity are preferable. Specifically, resins which can be used as the intermediate mold precursor 22 in the first embodiment can be used.

These materials are preferable because the intermediate mold 1024 made from these materials has high releasability from silicon or quartz which is superior as a material for the master mold inasmuch as it enables highly accurate etching.

As the plastic resin, for example, thermoplastic resins such as polycarbonate resins, polymethylmethacrylate resins or amorphous polyolefin resins can be used. Such a resin is plasticized and liquefied by raising the temperature higher than the softening point. Then the plasticized resin is interposed between the master mold 1010 and the reinforcing plate 1020 as shown in FIG. 21B. The plasticized resin is then cooled and solidified to become the intermediate mold 1024.

The intermediate mold precursor 1022 as described is placed between the master mold 1010 and the reinforcing plate 1020 to have a shape corresponding to the curved surfaces 1019 of the master mold 1010. As required, pressure may be applied through either the master mold 1010 or the reinforcing plate 1020 in this time. The application of pressure makes it possible to shorten the time required for spreading the intermediate mold precursor 1022 to a given area. This improves the working efficiency and ensures filling into the curved surfaces 1019.

A solidifying treatment appropriate to the intermediate mold precursor 1022 is then performed. For example, when a photocurable resin is used, the resin is exposed to light under a given condition. The intermediate mold precursor 1022 is solidified by this treatment to become the intermediate mold 1024 as shown in FIG. 21B.

As shown in FIG. 21C, the intermediate mold 1024 and the reinforcing plate 1020 are then separated from the master mold 1010. The intermediate mold 1024 is provided with curved surfaces 1026 each having a convex form corresponding to each of the concave curved surfaces 1019 of the master mold 1010.

Step of Forming Duplicate Mold

Figure 22A:
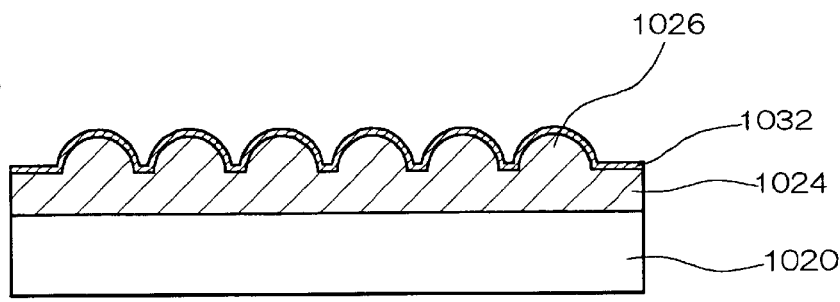
FIGS. 22A to 22C illustrate the steps of forming a duplicate mold from an intermediate mold according to the sixth embodiment.
Figure 22B:
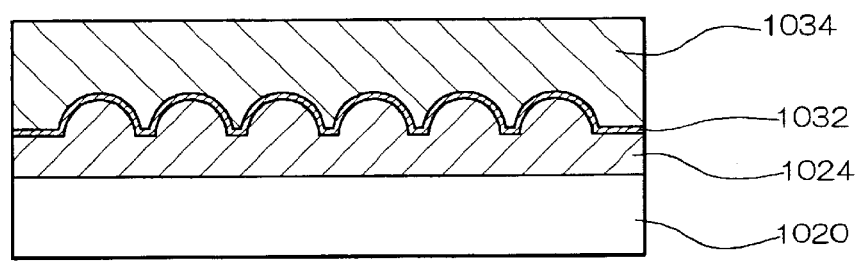
Figure 22C:
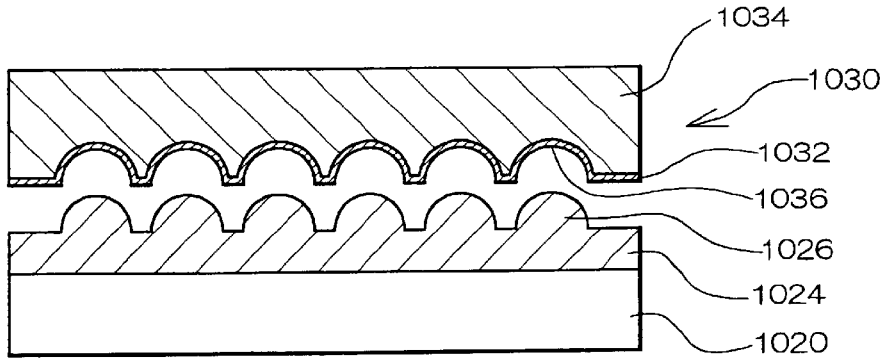

FIGS. 22A to 22C show the steps of forming a duplicate mold from the intermediate mold. As shown in FIG. 22A, a metal film 1032 is formed on the surface of the intermediate mold 1024 on which the curved surfaces 1026 are formed to make the intermediate mold 1024 electroconductive. The metal film 1032 maybe formed, for example, by using nickel (Ni) with a thickness of 500 to 1000 angstroms ($10^{-10}$ m). The metal film 1032 can be formed by various methods such as sputtering, CVD, vapor deposition, or electroless plating. Note that this electro-conduction treatment is not required in the case where the surface of the intermediate mold 1024 has the electroconductivity required for forming a metal layer in the subsequent step using the electroforming method.

Using the metal film 1032 as a negative electrode and a nickel chip or nickel ball as a positive electrode, Ni is electrodeposited by the electroforming method to form a thick metal layer 1034 as shown in FIG. 22B. An example of an electroplating solution is as follows.

Nickel sulfamate: 550 g/l
Boric acid: 35 g/l
Nickel chloride: 5 g/l
Leveling agent: 20 mg/l As shown in FIG. 22C, the metal film 1032 and the metal layer 1034 are removed from the intermediate mold 1024, followed by washing as required to obtain the duplicate mold 1030. Curved surfaces 1036 each having a concave shape corresponding to the convexly curved surfaces 1026 of the intermediate mold 1024 are formed on the duplicate mold 1030. The shape of the curved surfaces 1036 is the inverse of the shape of the lenses 1042 shown in FIG. 23C in order to form the lenses 1042 by transferring.

The metal filr 1032 may be removed from the duplicate mold 1030 by a removal treatment as required.

Step of Forming Light-transmitting Layer

Figure 23A:
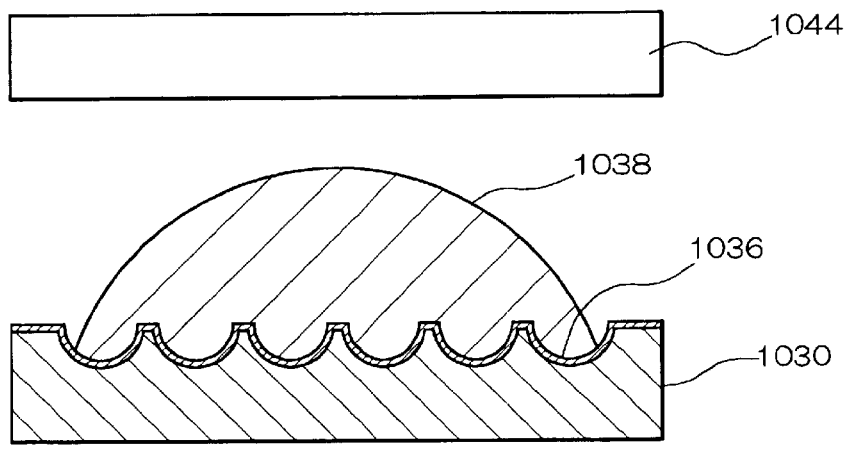
FIGS. 23A to 23C illustrate the steps of forming a micro lens array according to the sixth embodiment.
Figure 23B:
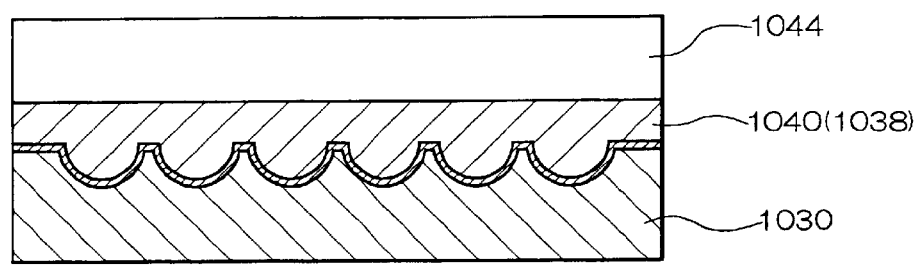
Figure 23C:
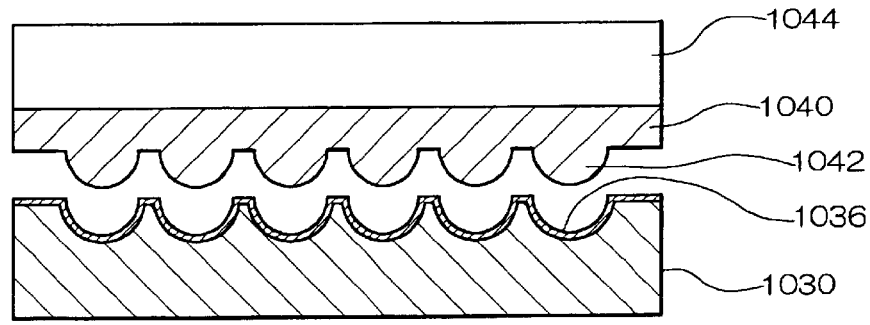

FIGS. 23A to 23C show a step of forming a light-transmitting layer having plural lenses.

As shown in FIGS. 23A and 23B, the reinforcing plate 1044 is attached to the duplicate mold 1030 through a light-transmitting layer precursor 1038. This step is the same as that shown in FIGS. 21A and 21B and a material of the light-transmitting layer precursor 1038 may be selected from the materials which can be used for the intermediate mold precursor 1022 shown in FIG. 21A, provided that it is light-transmissible. Acrylic resins are preferable since acrylic resins can be cured in a short period of time by light, and commercially available precursors and photosensitizers (photopolymerization initiators) can be utilized, whereby a light-transmitting layer 1040 having excellent optical properties can be formed.

No particular limitation is imposed on the material of the reinforcing plate 1044 insofar as it has the optical properties such as light-transmissibility and characteristics such as mechanical strength which are required for a micro lens array. For example, quartz, glass, or substrates or films made of plastics such as a polycarbonate, polyacrylate, polyethersulfone, polyethyleneterephthalate, polymethyl methacrylate and amorphous polyolefin can be utilized. If the light-transmitting layer 1040 has the characteristics such as mechanical strength required for a micro lens array, the reinforcing plate 1044 is not required.

After the light-transmitting layer 1040 is formed on the duplicate mold 1030 in this manner, the light-transmitting layer 1040 and the reinforcing plate 1044 are removed together from the duplicate mold 1030 as shown in FIG. 23C. Since the light-transmitting layer 1040 has the plural lenses 1042 made by transferring the shapes of the curved surfaces 1036, a structure including the light-transmitting layer 1040 and the reinforcing plate 1044 is called a "micro lens array" in general. In the present invention, however, a structure further including an alignment layer 1051 (see FIG. 25C) is defined as a "micro lens array".

In the above-described steps, the intermediate mold 1024 is formed from the master mold 1010 having the curved surfaces 1019, the duplicate mold 1030 is formed from the intermediate mold 1024, and then the light-transmitting layer 1040 reinforced by the reinforcing plate 1044 (this structure is generally called a micro lens array) is formed by using the duplicate mold 1030 for each product. Since the expensive master mold 1010 is used only when the intermediate mold 1024 is formed, deterioration of the master mold 1010 progresses at a slow pace, so that it is not necessary to frequently make the master mold 1010, leading to the reduced production cost for the general micro lens array. Moreover, since the duplicate mold 1030 is not removed directly from the master mold 1010, a range of choice for the materials used for the two is widened and hence various methods of forming the duplicate mold 1030 can be used. This makes it possible to transfer the shapes of the curved surfaces 1026 and 1036 with high precision. This also makes it easy to improve the durability of the master mold 1010 and the duplicate mold 1030.

Step of Forming Alignment Layer

Figure 24A:
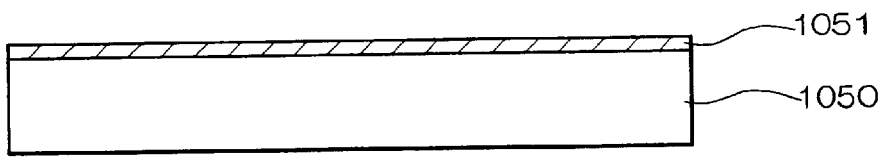
FIGS. 24A to 24C illustrate the steps of forming a micro lens array according to the sixth embodiment.
Figure 24B:
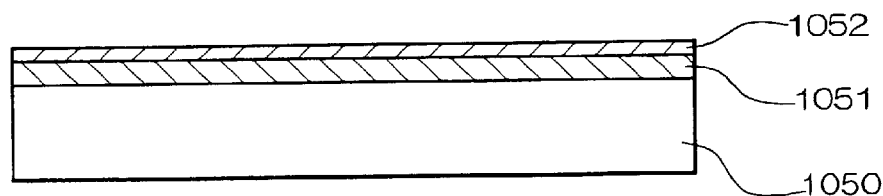

FIGS. 24A and 24B illustrate the steps of forming an alignment layer, which is a thin film, on a base. In FIG. 24A, an alignment layer 1051 is formed by applying a polyimide resin or a precursor thereof on a base 1050 and baking the material at 100° C. to 350° C. As the application method, a spin coating method, roll coating method, flexography method, or the like can be used. The baking temperature is appropriately specified depending on the material to be used. The step of forming the alignment layer 1051 is conducted in a different place from the place for the steps shown in FIGS. 20A to 23C, but there is no problem whether these steps are conducted in the same time or in separate times.

A transparent electrode film 1052, which is another thin film, is then formed on the alignment layer 1051 formed on the base 1050 as shown in FIG. 24B. The transparent electrode film 1052 is, for example, an ITO (Indium Tin Oxide) film, which is formed by a vacuum filming method such as sputtering or vapor deposition, followed by annealing. The annealing temperature is generally in a range between 100 and 300° C. Higher temperatures are generally preferable to decrease the resistance, thereby producing a high quality electrode film. The base 50 must withstand high temperature annealing. Baking for forming the alignment layer 1051 and annealing of the transparent electrode film 1052 may be performed at the same time.

It is preferable for the surface of the base 1050 to be flat so that the alignment layer 1051 and the transparent electrode film 1052 have uniform thicknesses and flat surfaces respectively. Specifically, it is preferable that the unevenness of the surface of the base 1050 be within ±0.1 μm. The base 1050 serves as a substrate for supporting the alignment film 1051 and the transparent electrode film 1052 until the alignment film 1051 and the transparent electrode film 1052 are transferred onto the light-transmitting layer 1040 reinforced by the reinforcing plate 1044 (this structure is a micro lens array in the general sense). A radiation-transmitting material is used for the base 1050 as required in the subsequent steps. The base 1050 must withstand the baking temperature for forming the alignment layer 1051 and annealing temperature for forming the transparent electrode film 1052.

Figure 24C:
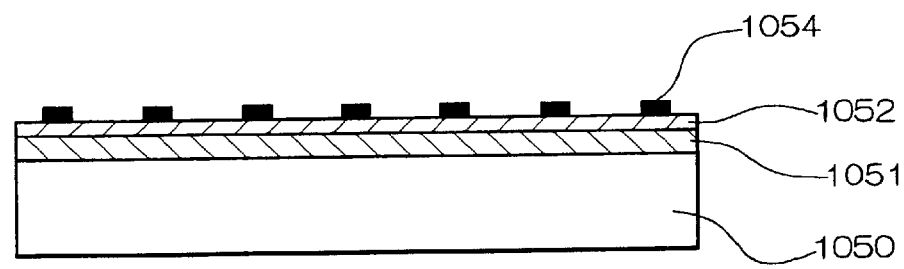

A shading layers 1054 are then formed on the transparent electrode film 1052 as shown in FIG. 24C. The shading layers 1054 function as a black matrix for pixels of a display device and shade a given area of the transparent electrode film 1052 according to the pixel arrangement.

Step of Attaching Alignment Layer

Figure 25A:
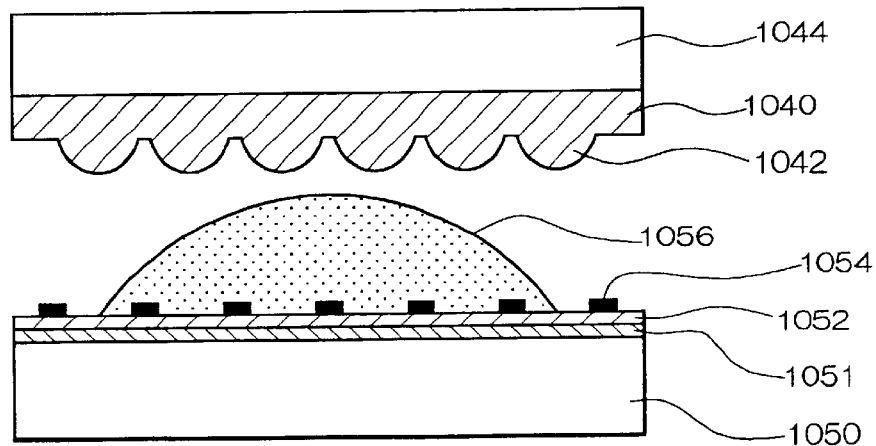
FIGS. 25A to 25C illustrate the steps of forming a micro lens array according to the sixth embodiment.

As shown in FIG. 25A, the surface of the base 1050 on which the shading layers 1054 and the like are formed is attached to the surface of the light-transmitting layer 1040 on which the lenses 1042 are formed through an adhesive layer precursor 1056. In more detail, the adhesive layer precursor 1056 is dripped onto or applied to at least one of the base 1050 and the light-transmitting layer 1040 to attach the two together. The adhesive layer precursor 1056 adheres the two to each other by the weight of the reinforcing plate 1044 and the light-transmitting layer 1040 (or the weight of the base 1050 in the case where the base 1050 is arranged on the upper side), or by applying pressure through the light-transmitting layer 1040 or the base 1050.

There are no specific limitations to the adhesive layer precursor 1056 inasmuch as it has light-transmissibility and adhesion. For example, materials which can be cured by applying energy and plastic materials may also be used for the adhesive layer precursor 1056. For example, the material of the adhesive layer precursor 1056 may be selected from the materials which can be used for the light-transmitting precursor 1038 shown in FIG. 23A.

Figure 25B:
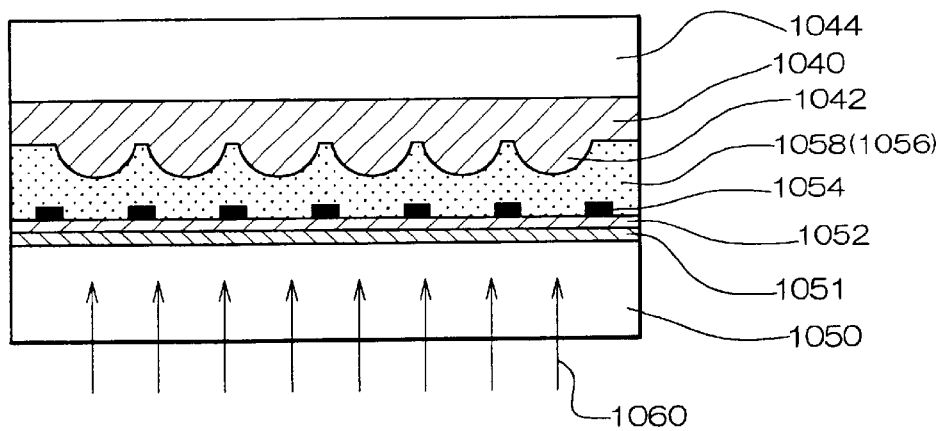

In this manner, the light-transmitting layer 1040 reinforced by the reinforcing plate 1044 is adhered to the base 1050 on which the alignment layer 1051, the transparent electrode film 1052 and the shading layers 1054 are formed by the adhesive layer 1058, as shown in FIG. 25B.

Step of Removing the Base

The base 1050 is then removed. Depending upon the combination of materials forming the base 1050 and the alignment layer 1051, there is the case where the strong adhesion between the two makes it difficult to remove the alignment layer 1051 from the base 1050, giving rise to the problem of an increase in the percentage of defective items such as a lack of the thin film or occurrence of cracks, the problem of reduction in productivity caused by the increased time required for removal, the problem of reduced durability of the base 1050, and so on.

Figure 25C:
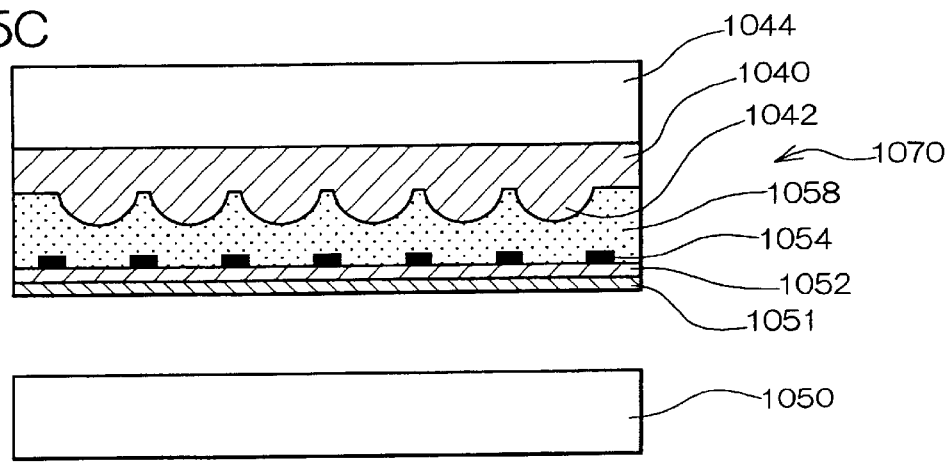

Because of this, as shown in FIG. 25B, radiation 1060 is applied to the interface between the alignment layer 1051 and the base 1050 through the base 1050. This reduces or removes the adhesion between the alignment layer 1051 and the base 1050, which makes it possible to remove the alignment layer 1051 satisfactorily from the base 1050, as shown in FIG. 25C.

In more detail, various bonding forces between atoms or molecules are reduced or eliminated at the interface between the base 1050 and the alignment layer 1051 to cause phenomena such as abrasion, resulting in interface delamination (breakdown). Alternatively, there is the case where a component contained in the alignment layer 1051 is vaporized and released by the radiation 1060, whereby a separating effect is developed which contributes to the interface delamination.

In order to cause the interface delamination by irradiating the radiation 1060, it is necessary that the base 1050 be formed of a material through which the radiation 1060 can be transmitted and the alignment layer 1051 be formed of a material capable of absorbing the energy of the radiation 1060.

The transmittance of the radiation 1060 through the base 1050 is 10% or more, and preferably 50% or more. It is preferable that the transmittance of the radiation 1060 through the base 1050 be higher to reduce the attenuation of the applied radiation 1060, thereby causing phenomena such as abrasion by low energy. Given as an example of the material for the base 1050 is quartz, which has high transmittance for light in a shorter wavelength range and exhibits superior mechanical strength and heat resistance.

As an example of the radiation 1060, deep UV-light is given. An excimer laser has been put to practical use as a light source which outputs high energy in a short wavelength range. The excimer laser causes abrasion only in the vicinity of the interface over an extremely short time period and hence has almost no temperature impact on the base 1050 and the alignment layer 1051.

It is preferable to provide a washing treatment on the surface of the alignment layer 1051 removed from the base 1050 to remove the section which has been deteriorated by the radiation 1060. It is noted that if the base 1050 and the alignment layer 1051 are easily removed from each other, the irradiation of the radiation 1060 may be omitted.

A micro lens array 1070 with an alignment layer (and a transparent electrode film) can be thus obtained. If the micro lens array is applied to a liquid crystal panel, the alignment layer 1051 is rubbed in order to form a groove for aligning liquid crystal molecules in a specific direction (alignment groove).

According to this embodiment, the alignment layer 1051 is formed in advance on the base 1050 and hence the baking heat does not damage the light-transmitting layer 1040 reinforced by the reinforcing plate 1044 (this structure is a micro lens array in a usual sense). Since the light-transmitting layer 1040 is not exposed to a high temperature caused by baking, a range of choice for materials is widened.

Seventh Embodiment

FIGS. 26A to 30 are illustrations for describing a seventh embodiment of the present invention.

Figure 26A:
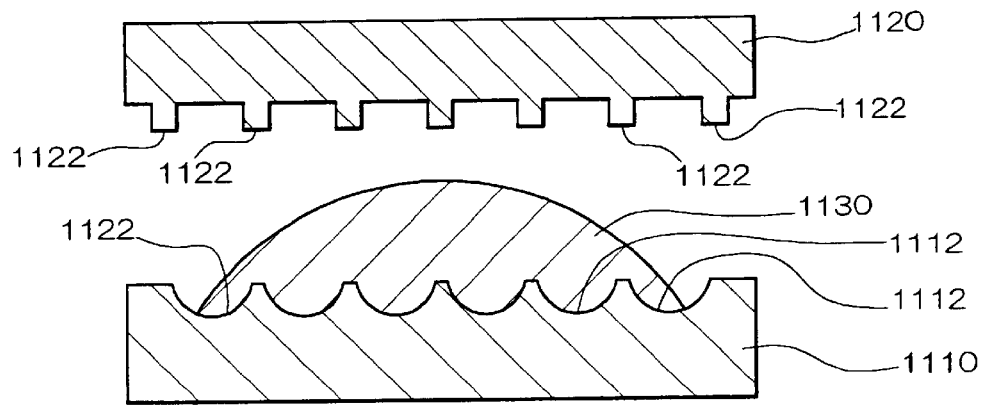
FIGS. 26A to 26C illustrate a method of manufacturing a micro lens array according to a seventh embodiment.

As shown in FIG. 26A, a first master mold 1110 and a second master mold 1120 are prepared. On the first master mold 1110, plural curved surfaces 1112 are formed, each curved surface 1112 having a concave shape that is an inverse of a convexly curved surface. On the other hand, on the second master mold 1120, plural projections 1122 are formed. The plural projections 1122 are in the form of a black matrix when seen from a plan view.

The first and second master molds 1110, 1120 are arranged so that the respective curved surface 1112 and projection 1122 face each other and each projection 1122 is formed not to be positioned above the center of the curved surface 1112.

Then the master mold 1110 is attached to the master mold 1120 through a first light-transmitting layer precursor 1130. The first light-transmitting layer precursor 1130 is a material for a first light-transmitting layer 1132 shown in FIG. 26C. Although the master mold 1110 is disposed on the lower side in FIG. 26A, the master mold 1120 may be disposed on the lower side instead.

A material used for the light-transmitting layer precursor 1130 may be selected from the materials which can be used for the light-transmitting layer precursor 38 in the sixth embodiment.

Figure 26B:
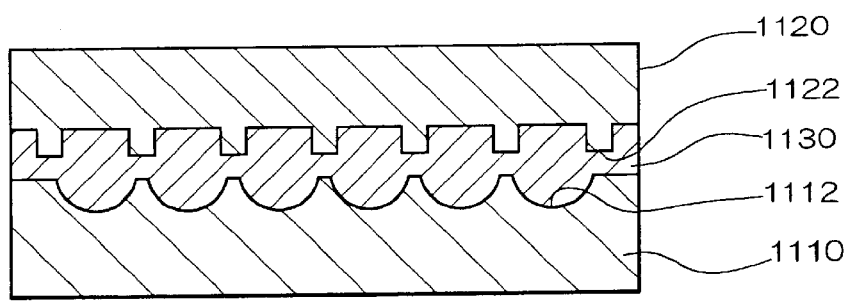
Figure 26C:
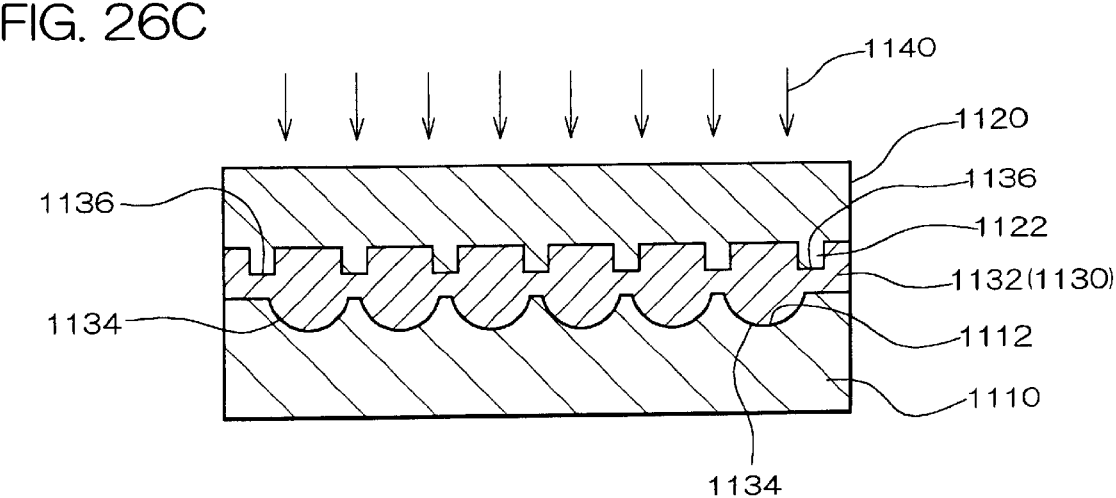

As shown in FIG. 26B, the light-transmitting layer precursor 1130 is spread to a given area A given pressure may be applied to at least one of the master molds 1110, 1120 as required. Although the light-transmitting layer precursor 1130 is dripped onto the master mold 1110, it may be dripped onto the master mold 1120 or on both the master molds 1110, 1120. Alternatively, the light-transmitting layer precursor 1130 may be applied to at least either one of the master molds 1110, 1120 or to both by a method such as a spin coating, dipping, spray coating, roll coating, or bar coating.

Moreover, if the light-transmitting layer precursor 1130 is formed of, for example, a UV-curable resin, UV-light 1140 is applied in a given amount to the light-transmitting layer precursor 1130 through at least one of the master molds 1110 1120 to cure the light-transmitting layer precursor 1130. In this case, the master mold through which the UV-light is applied must have UV-ray transmissibility.

The first light-transmitting layer 1132 is formed between the master molds 1110, 1120 in this manner. Plural lenses 1134 made by transferring the shapes of the plural curved surfaces 1112 are on one surface of the light-transmitting layer 1132. In general, this structure is called a micro lens array. Plural recesses 1136 made by transferring the shapes of the plural projections 1122 are on the other surface of the light-transmitting layer 1132. The plural recesses 1136 have the form of a black matrix when seen from a plan view though not shown. Each recess 1136 is formed not to be positioned above the center of the lens 1134.

Figure 27A:
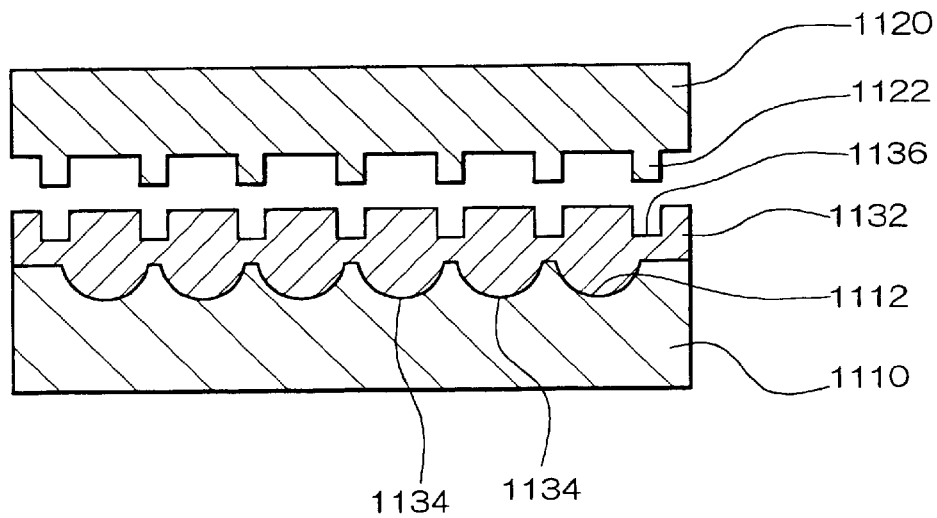
FIGS. 27A and 27B illustrate a method of manufacturing a micro lens array according to the seventh embodiment.

As shown in FIG. 27A, the master mold 1120 is removed from the light-transmitting layer 1132 to open the recesses 1136 made by transferring the shapes of the projections 1122.

Figure 27B:
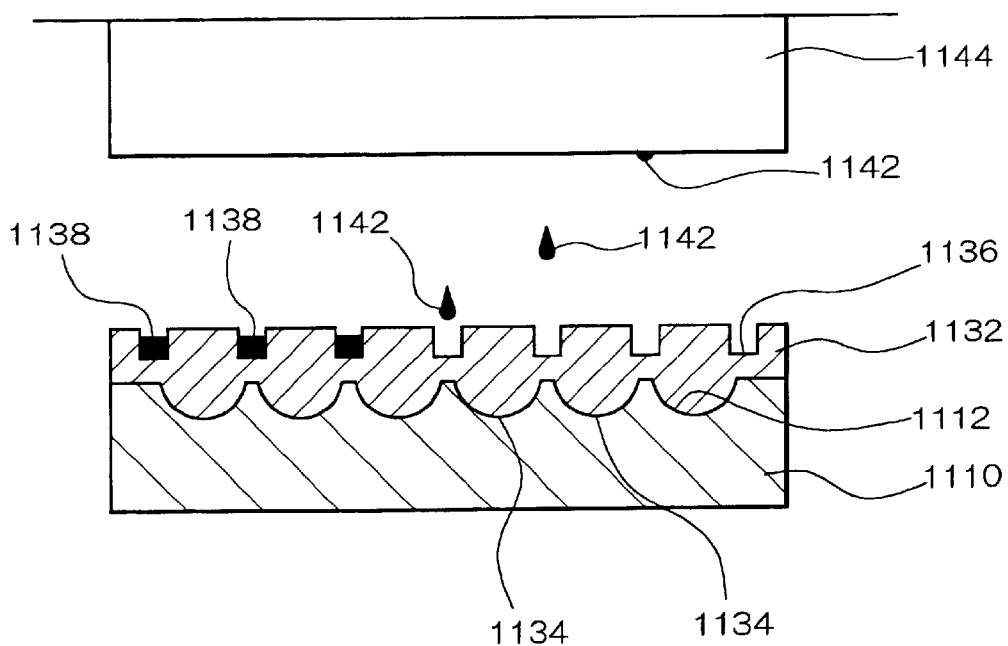

As shown in FIG. 27B, each recess 1136 of the light-transmitting layer 1132 is filled with a shading material 1142 to form a shading layer 1138. The shading layers 1138 form a black matrix.

As the shading material 1142, various materials which have durability but no light-transmissibility can be used. For example, a material obtained by dissolving a black dye or a black pigment together with a binder resin in a solvent can be used as the shading material 1142. Although there are no specific limitations to the type of solvent, water or various organic solvents can be used. As the organic solvent, one of the following organic solvents and a mixed solution of plural solvents selected from these solvents may be used. Examples of these organic solvents include propylene glycol monomethyl ether acetate, propylene glycol monopropyl ether, methoxymethyl propionate, ethoxyethyl propionate, ethyl cellosolve, ethyl cellosolve acetate, ethyl lactate, ethyl pyruvinate, methyl amyl ketone, cyclohexanone, xylene, toluene and butyl acetate.

Although there are no specific limitations to a method for filling the recesses 1136 with the shading material 1142, the ink jet method is preferable. The ink jet method makes it possible to use ink economically at high speed without any waste by making use of the techniques which have been put to practical use for ink jet printers.

FIG. 27B shows the process of filling the recesses 1136 with the shading material 1142 by an ink jet head 1144. Specifically, the ink jet head 1144 is disposed so as to face the recesses 1136 to jet the shading material 1142 into each recess 1136.

Various types of ink jet heads that have been put to practical use for ink jet printers can be used as the ink jet head 1144, such as a piezo jet type which applies pressure to ink by utilizing volumetric variation of a piezoelectric element to jet ink, or a type which uses an electrothermal energy conversion member as an energy-generating element to expand the volume of ink or to vaporize ink for jetting ink by the pressure. In these types, an injecting area and an injecting pattern can be optionally set.

In this embodiment, the shading material 1142 is jetted from the ink jet head 1144. Consequently, it is necessary to ensure the fluidity of the shading material 1142 to enable jetting from the ink jet head 1144.

In order to fill the recesses 1136 in the light-transmitting layer 1132 equally with the shading material 1142, the filling position is adjusted by some operations such as moving the ink jet head 1144. When the recesses are uniformly filled with the shading material 1142, the filling process is completed. When a solvent component is contained in the shading material 1142, the solvent component is removed from the shading material 1142 by heat treatment. Note that the shading material 1142 shrinks by the removal of the solvent component. It is therefore necessary to provide a sufficient amount of the shading material 1142 to keep the thickness for ensuring a required shading property after the shrinkage.

Figure 28A:
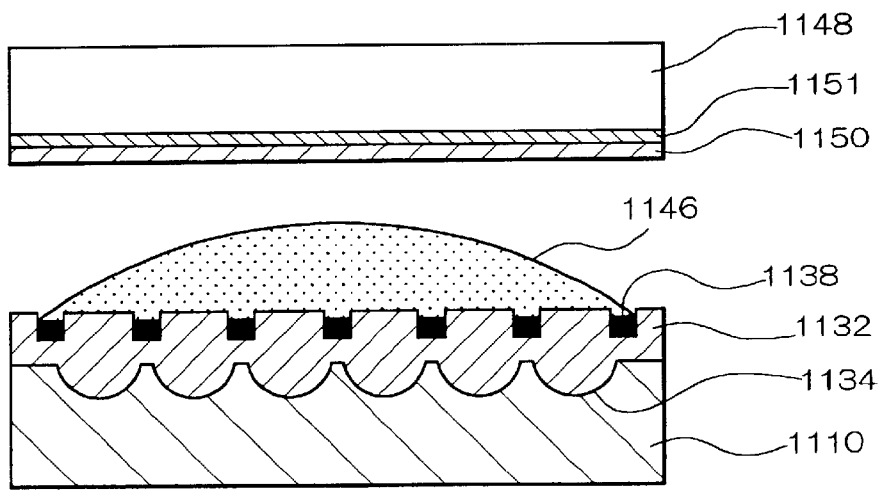
FIGS. 28A to 28B illustrate a method of manufacturing a micro lens array according to the seventh embodiment.
Figure 28B:
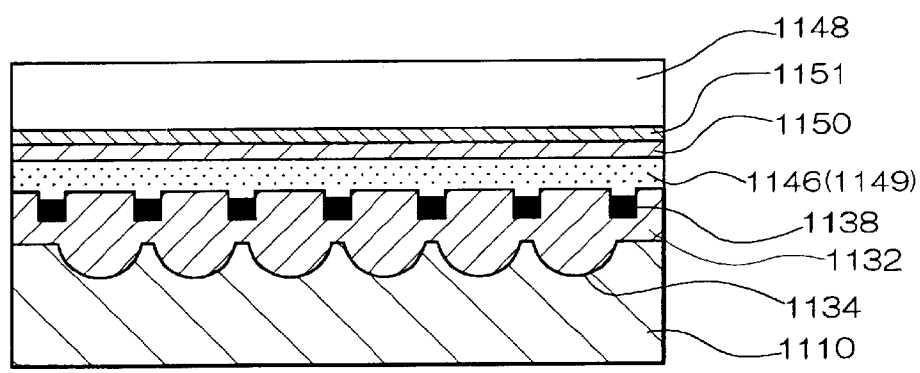

After the above steps, an adhesive layer precursor 1146 is dripped onto the light-transmitting layer 1132, as shown in FIG. 28A. A material for the adhesive layer precursor 1146 can be selected from the materials which can be used for the adhesive layer precursor 1056 of the sixth embodiment. Then a base 1148 that is provided with a transparent electrode film 1150 and an alignment film 1151 in advance is attached to the adhesive layer precursor 1146 to spread out the adhesive layer precursor 1146. The transparent electrode film 1150 and the alignment film 1151 is formed by the same process as in the formation of the transparent electrode film 1052 and the alignment film 1051 in the sixth embodiment. A material for the base 1148 may be selected from the materials which can be used for the base 1050 in the sixth embodiment.

The adhesive layer precursor 1146 may be spread on the light-transmitting layer 1132 or on the base 1148 by a method such as a spin coating or roll coating prior to the attachment of the base 1148.

The adhesive layer precursor 1146 is made into an adhesive layer 1149 which bonds the transparent electrode film 1150 on the alignment layer 1151 formed on the base 1148 to the surface of the light-transmitting layer 1132 on which the shading layers 1138 are formed.

Figure 28C:
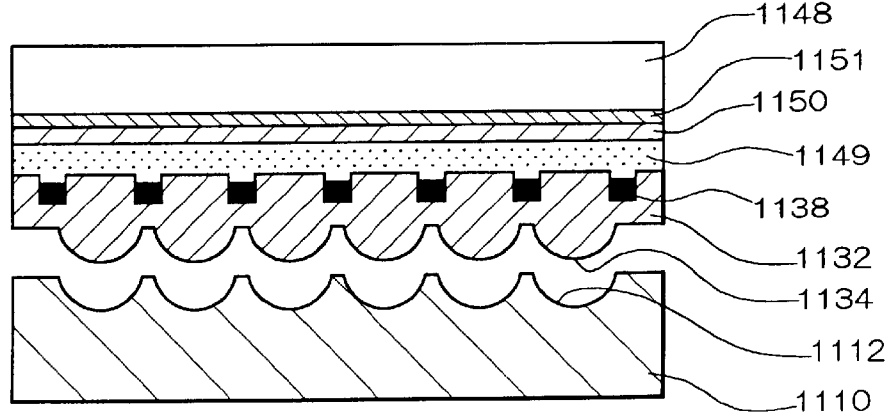

After that, the master mold 1110 is removed from the light-transmitting layer 1132, as shown in FIG. 28C. Since the light-transmitting layer 1132 has the lenses 1134 formed by the curved surfaces 1112 of the master mold 1110, this structure is called a "micro lens array" in general. In the present invention, however, a structure at least including the alignment layer 1151 is defined as a "micro lens array".

Figure 29A:
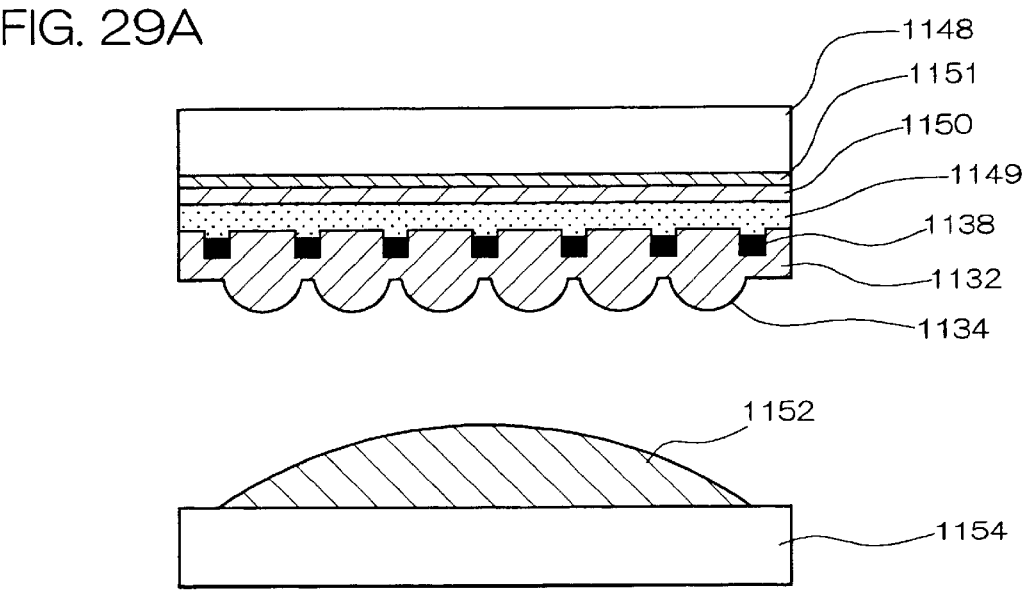
FIGS. 29A and 29B illustrate a method of manufacturing a micro lens array according to the seventh embodiment.

As shown in FIG. 29A, the surface of the light-transmitting layer 1132 on which the lenses 1134 are formed is attached to a reinforcing plate 1154 through a second light-transmitting layer precursor 1152. The attaching process is the same as the step shown in FIG. 28A. A material for the second light-transmitting layer precursor 1152 may be selected from the materials which can be used for the first light-transmitting layer precursor 1130.

The reinforcing plate 1154 is used to reinforce a micro lens array. If the micro lens array itself has the processing durability required in the manufacturing steps and the characteristics such as mechanical strength required for a micro lens array, the reinforcing plate 1154 is not necessary.

Figure 29B:
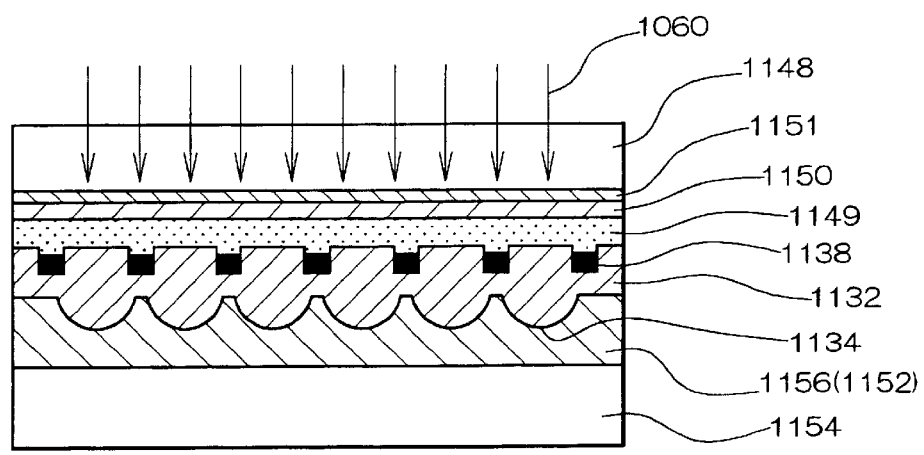
Figure 30:
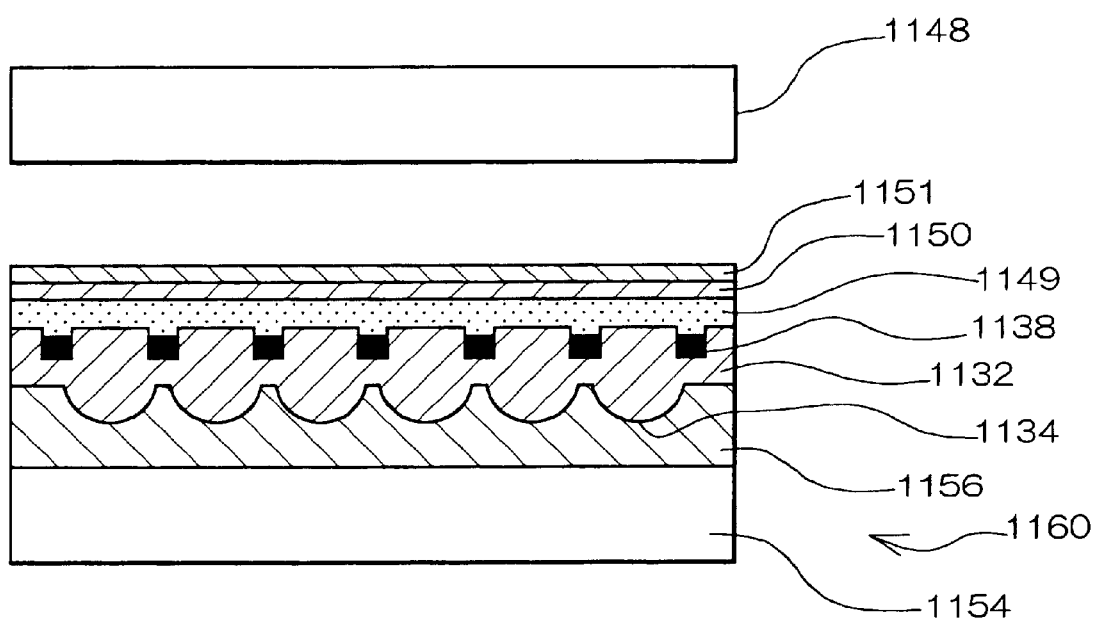
FIGS. 30 illustrates a method of manufacturing a micro lens array according to a seventh embodiment.

The interface between the alignment layer 1151 and the base 1148 is exposed to the radiation 1060 through the base 1148 as shown in FIG. 29B to remove the base 1148 as shown in FIG. 30. If the base 1148 and the alignment layer 1151 can be easily separated from each other, the irradiation of the radiation 1060 can be omitted.

A micro lens array 1160 having the alignment layer 1151 (and the transparent electrode film 1150) as shown in FIG. 30 is thus obtained. If the micro lens array is applied to a liquid crystal panel, the alignment layer 1151 is rubbed in order to form a groove for aligning liquid crystal molecules in a specific direction (alignment groove).

In this embodiment, the first master mold 1110 is attached to the second master mold 1120 through the first light-transmitting layer precursor 1130, and the lenses 1134 are made by transferring the shapes of the curved surfaces 1112 of the first master mold 1110. Thus, the first light-transmitting layer 1132 having the plural lenses 1134 can be simply formed. In this method, materials are used with high efficiency and the number of steps can be reduced, leading to cost reduction. The first and second master molds 1110, 1120 can be used repeatedly as long as the durability permits. So the step of forming these master molds can be omitted in the steps of forming the second and subsequent micro lens arrays, resulting in reduction in the number of steps and in cost.

Moreover, on the light-transmitting layer 1132, the recesses 1136 are formed by transferring the shapes of the projections 1122 of the second master mold 1120. The recesses 1136 are filled with the shading material 1142. The shading layers 1138 formed of the shading material 1142 function as the black matrix, improving the contrast between pixels.

According to this embodiment, a micro lens array that has no damage to the first and second light-transmitting layers 1132 and 1156 due to the baking heat in the formation of the alignment layer and has an improved contrast can be simply manufactured by transferring.

Eighth Embodiment

FIGS. 31A to 32C are views for describing an eight embodiment of the present invention.

In the aforementioned sixth embodiment, a micro lens array having convex lenses is formed. In the case where a micro lens array has concave lenses, each curved surface 1019 of the master mold 1010 must have a concave shape.

In the sixth embodiment, the duplicate mold 1030 is formed by the intermediate mold 1024 that is formed based on the master mold 1010. However, the duplicate mold may be formed directly from the master mold. In this case, in order to manufacture a micro lens array having convex lenses as in the sixth embodiment, a master mold having convex y curved surfaces must be prepared to form a duplicate mold with concavely curved surfaces from this master mold.

So this embodiment relates to a method of forming a master mold having convexly curved surfaces.

Figure 31A:
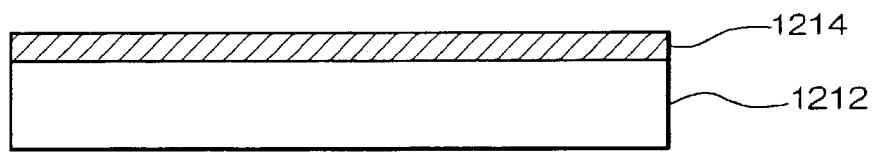
FIGS. 31A to 31E illustrate a method of manufacturing a master mold according to an eighth embodiment.

At first, a resist layer 1214 is formed on a substrate 1212 as shown in FIG. 31A. The process and the materials for the substrate 1212 and the resist layer 1214 are the same as those in the sixth embodiment (see FIG. 20A).

Figure 31B:
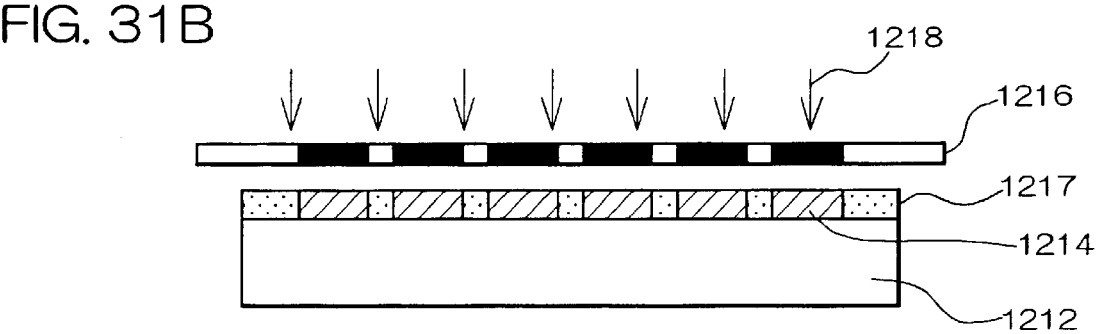

As shown in FIG. 31B, a mask 1216 is disposed above the resist 1214 and only predetermined areas of the resist layer 1214 are exposed to radiation 1218 through the mask 1216. The mask 1216 has a pattern not to allow the areas required for the formation of curved surfaces 1219 shown in FIG. 32C to be exposed to the radiation 1218.

Figure 31C:
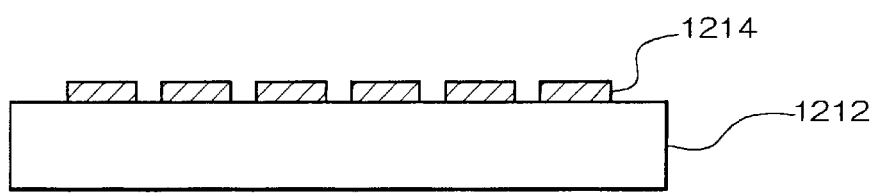

When a developing treatment is carried out under given conditions after the resist layer 1214 is exposed to the radiation 1218, only areas 1217 exposed to the radiation 1218 in the resist layer 1214 are selectively removed, and part of the surface of the substrate 1212 is exposed, as shown in FIG. 31C. The other part of the substrate is kept to be covered by the residual resist layer 1214.

Figure 31D:
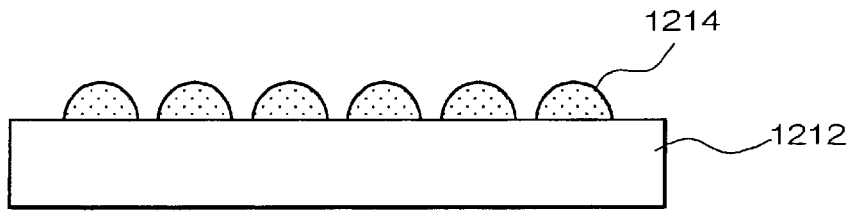

After the patterning of the resist layer 1214 is completed in this manner, the remaining portions of the resist layer 1214 are heated in a reflow step. Each portion of the resist layer 1214 is fused to have a curved surface due to surface tension, as shown in FIG. 31D.

Figure 31E:
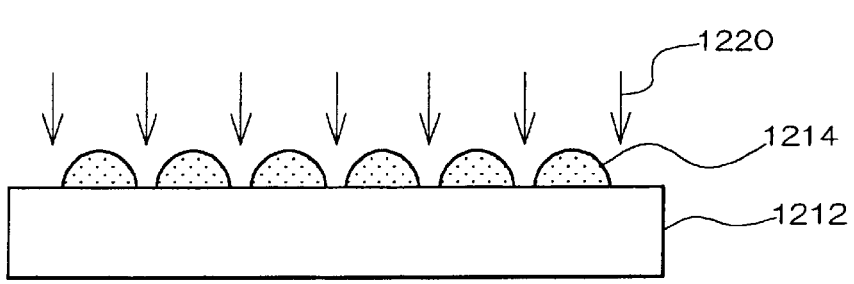

As shown in FIG. 31E, using the remaining resist layer 1214 as a mask, the substrate 1212 is etched to a given depth by an etchant 1220. In more detail, dry etching such as anisotropic etching, e.g., reactive ion etching (RIE) is performed.

Figure 32A:
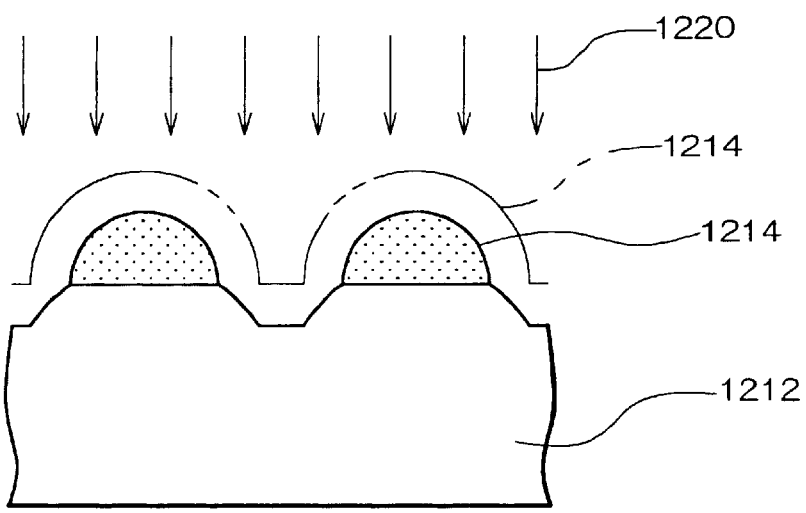
FIGS. 32A to 32C illustrate a process of etching according to the eighth embodiment.
Figure 32B:
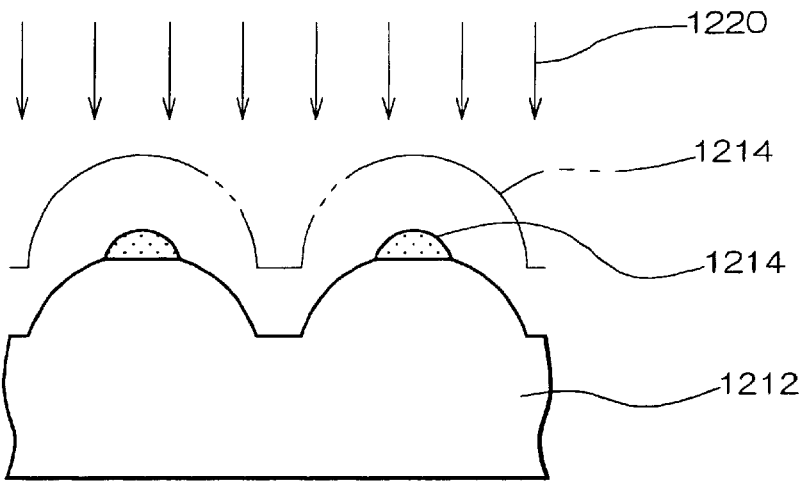
Figure 32C:
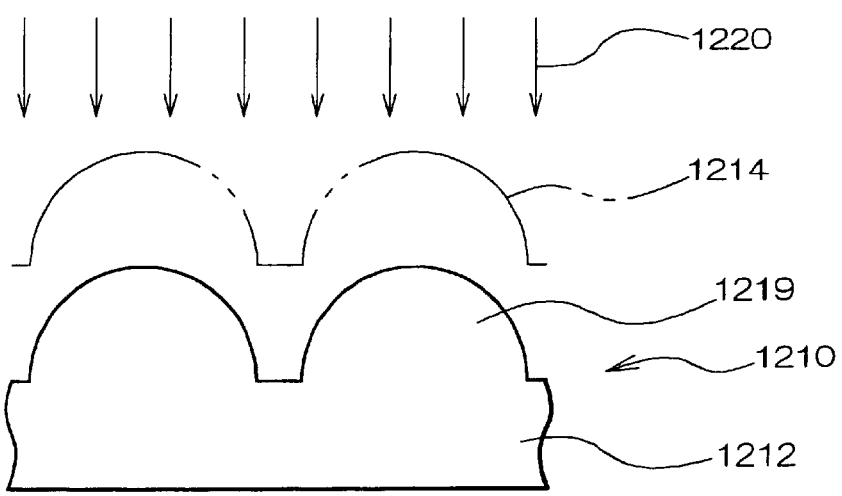

FIGS. 32A to 32C illustrate a process in which the substrate is etched. The substrate 1212 is partially covered by the remaining portions of the resist layer 1214 each having a curved surface. The substrate 1212 is first etched in the area which is not covered by the resist layer 1214. Then each of the remaining portions of the resist layer 1214 is etched by the etchant 1220 and is gradually reduced in size from the area shown by the dot-dot-dash line to the area shown by the solid line as shown in FIGS. 32A and 32B. As each portion of the resist layer 1214 is reduced in size, the substrate 1212 is gradually exposed and the exposed area is continuously and gradually etched since each portion of the resist layer 1214 has a curved surface. Because the substrate 1212 is continuously and gradually etched, the surface of the substrate 1212 after being etched is curved. The convexly curved surfaces 1219 are thus formed on the substrate 1212 and a master mold 1210 is obtained, as shown in FIG. 32C.

This master mold 1210, once it is formed, can also be used repeatedly as long as its durability permits, that is economical. Moreover, the step of forming the master mold 1210 can be omitted in the steps of forming the second and subsequent micro lens arrays, resulting in reduction in the number of steps and in cost.

Ninth Embodiment

Figure 33:
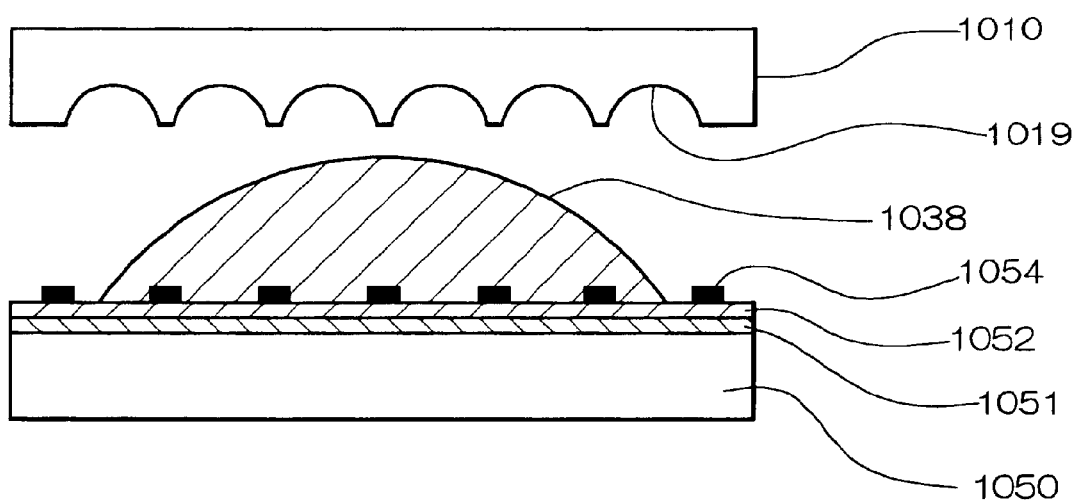
FIGS. 33 illustrates a method of manufacturing a micro lens array according to a ninth embodiment.
Figure 34A:
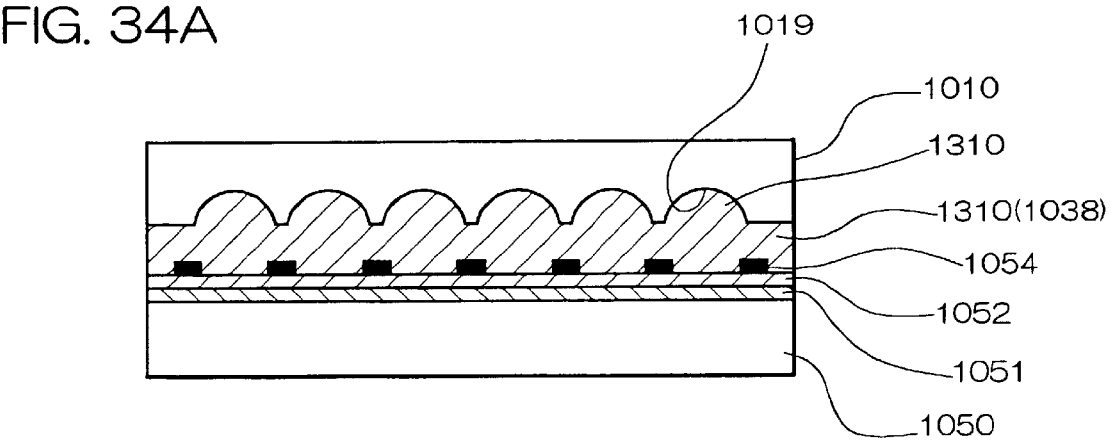
FIGS. 34A and 34B illustrate a method of manufacturing a micro lens array according to the ninth embodiment.
Figure 34B:
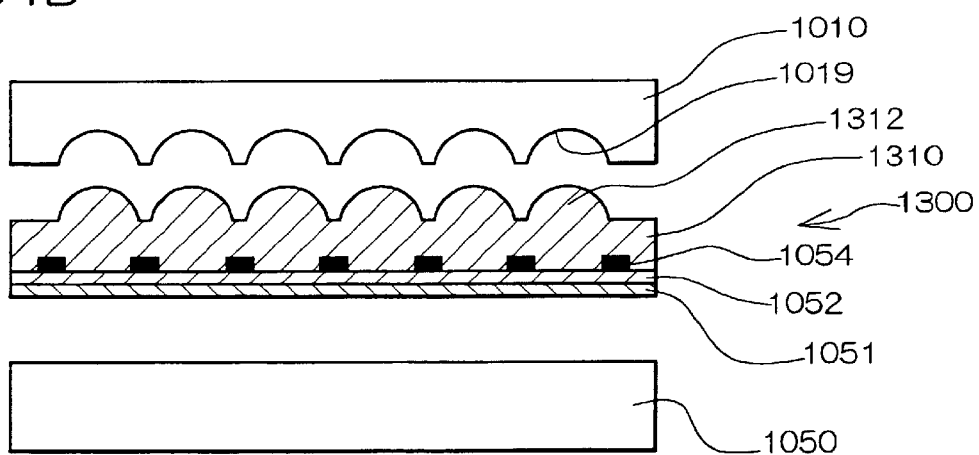

FIGS. 33 to 34B are views for describing a ninth embodiment of the present invention. In this embodiment, as shown in FIG. 33, the master mold 1010, the base 1050 having the shading layers 1054, the transparent electrode film 1052 and the alignment layer 1051 and the light-transmitting layer precursor 1038, which are used in the sixth embodiment are used. The surface of the master mold 1010 on which the curved surfaces 1019 are formed is arranged to face the surface of the base 1050 on which the shading layers 1054 and the like are formed, and the two are attached to each other through the light-transmitting layer precursor 1038.

As shown in FIG. 34A, a light-transmitting layer 1310 is formed between the base 1050 and the master mold 1010 in this manner. In the light-transmitting layer 1310, a plurality of convex lenses 1312 are formed by transferring the shapes of the curved surfaces 1019 of the master mold 1010.

Then, as shown in FIG. 34B, the master mold 10 is removed from the light-transmitting layer 1310 and the base 1050 is removed from the alignment layer 1051 to obtain a micro lens array 1300 having the alignment layer 1051 (and the transparent electrode film 1052). If the micro lens array is applied to a liquid crystal panel, the alignment layer 1051 is rubbed in order to form a groove for aligning liquid crystal molecules in a specific direction (alignment groove). The removal step is the same as in the sixth embodiment.

In this embodiment, the light-transmitting layer 1310 is attached to the alignment layer 1051 on the base 1050 during the step of forming the light-transmitting layer 1310 from the light-transmitting layer precursor 1038. Therefore, the total number of steps can be reduced. A second light-transmitting layer, a reinforcing plate, and the like may be formed on the light-transmitting layer 1310 after removing the light-transmitting layer 1310 from the master mold 1010, as required. Any damage to the light-transmitting layer 1310 due to the baking heat can be prevented as in the sixth embodiment.

Tenth Embodiment

Figure 35:
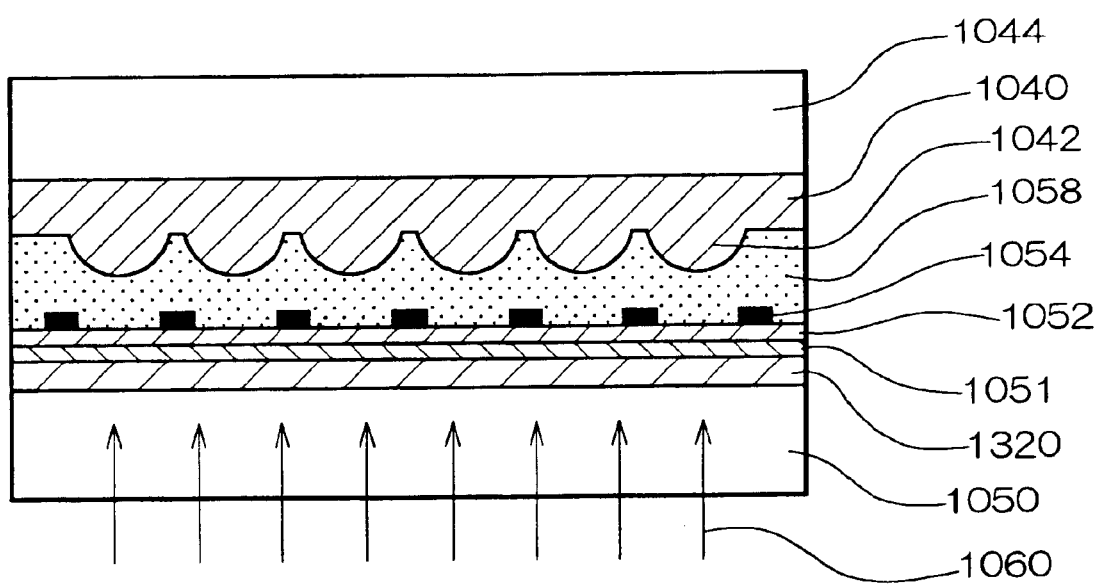
FIG. 35 illustrates a method of manufacturing a micro lens array according to a tenth embodiment.
Figure 36A:
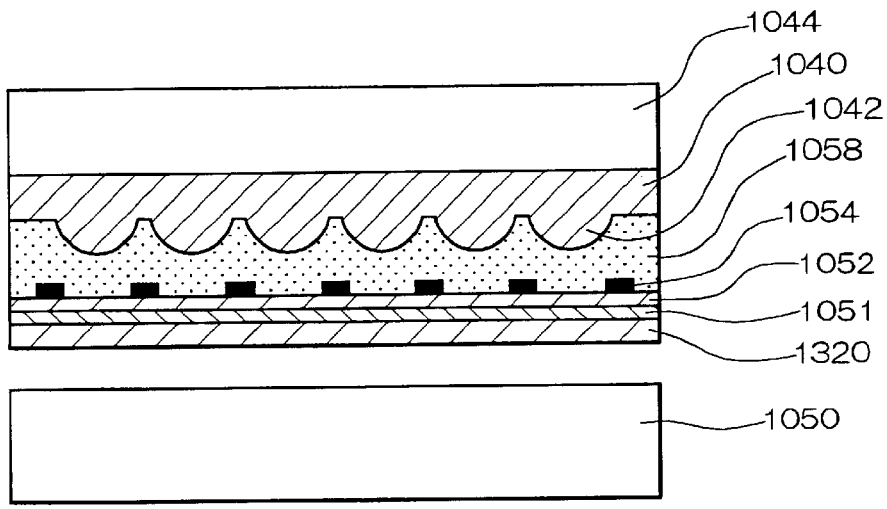
FIGS. 36A to 36C illustrate a method of manufacturing a micro lens array according to the tenth embodiment.
Figure 36B:
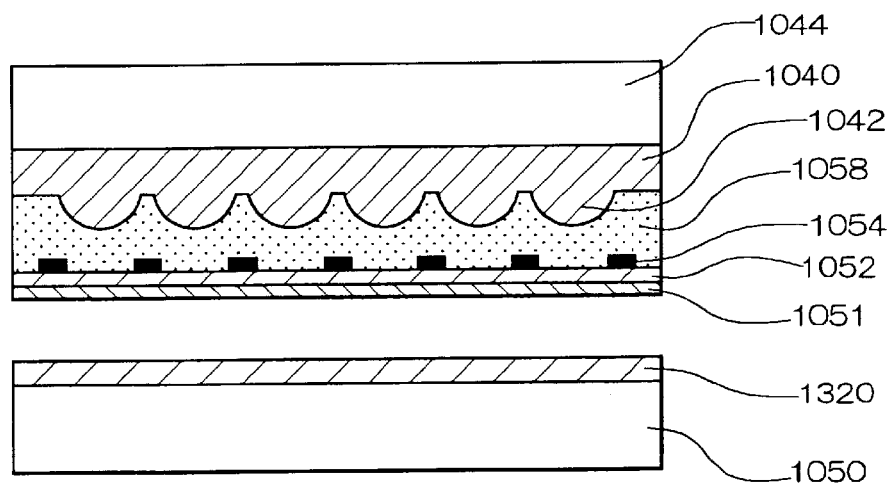
Figure 36C:
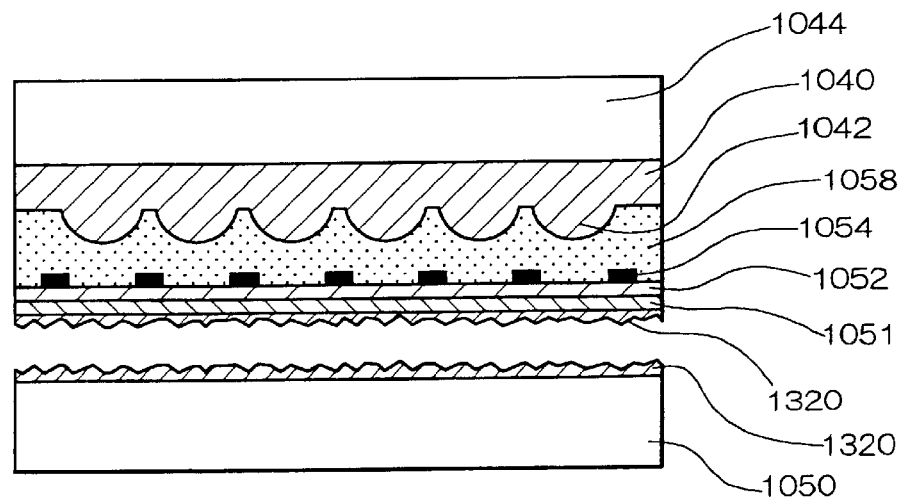

FIGS. 35 to 36C are views for describing a tenth embodiment of the present invention. This embodiment is a modification of the sixth embodiment. A separation layer 1320 is formed between the base 1050 and the alignment layer 1051 as shown in FIG. 35. Specifically, the separation layer 1320 is first formed on the base 1050, then the alignment layer 1051 is formed on the separation layer 1320, and the transparent electrode film 1052 is then formed on the alignment layer 1051. Other structures are the same as in the sixth embodiment.

The base 1050 is easily removed from the transparent electrode 1052 by exposing the separation layer 1320 to the radiation 1060 through the base 1050.

Examples of the materials for the separation layer 1320 include various oxides ceramics such as, amorphous silicon, silicon oxide, silicic acid compounds, titanium oxide, titanic acid compounds, zirconium oxide, zirconic oxides, lanthanum oxides, and lanthanic acid compounds; dielectrics (or ferroelectrics) or semiconductor; nitride ceramics such as silicon nitride, aluminum nitride and titanium nitride; organic polymer materials such as acrylic resins, epoxy resins, polyamides and polyimides; and one substance or alloys of two or more substances selected from the group consisting of Al, Li, Ti, Mn, In, Sn, Y, La, Ce, Nd, Pr, Gd and Sm. Suitable material is selected from these according to the process conditions and the materials used for the base 1050, alignment layer 1051, and transparent electrode film 1052.

There are no specific limitations to the method of forming the separation layer 1320, and the method is selected according to the composition and the film thickness to be formed. For example, vapor deposition methods such as CVD, vapor deposition, sputtering or ion plating, electroplating, electroless plating, a Langmuir-Blodgett (LB) method, spin coating method, dipping method, spray coating method, roll coating method, and bar coating method can be used.

When the thickness of the separation layer 1320 is too thin, damage to the alignment layer 1051 is increased. On the other hand, when the thickness is too great, the amount of the radiation 1046 for ensuring high releasability of the separation layer 1320 must be increased. Therefore, the thickness of the separation layer 1320 is preferably about 1 nm to 20 $\mu$m, more preferably about 10 nm to 10 $\mu$m, and most preferably about 40 nm to 1 $\mu$m, depending upon the objective of removal and the composition. It is preferable that the film thickness of the separation layer 1320 is as uniform as possible.

The separation layer 1320 can be removed from the base 1050 upon exposure to the radiation 1060 as shown in FIG. 35. Three types of separation are shown in FIGS. 36A to 36C.

FIG. 36A illustrates an example in which the bonding force between the base 1050 and the separation layer 1320 is reduced, causing the two to separate. In this case, it is preferable to perform a releasing (washing) treatment to remove the separation layer 1320 from the alignment layer 1051.

FIG. 36B illustrates an example in which the bonding force between the alignment layer 1051 and the separation layer 1320 is reduced, causing the two to separate. In this case, it is preferable to perform a washing treatment on the surface of the alignment layer 1051, since there is a case where a part of the separation layer 1320 adheres to the alignment layer 1051.

FIG. 36C illustrates an example in which the bonding force between molecules or atoms in the separation layer 1320 is reduced, causing separation. In this case, performing a washing treatment to remove the residual separation layer 1320 from the alignment layer 1051 is also preferable.

Eleventh Embodiment

Figure 37A:
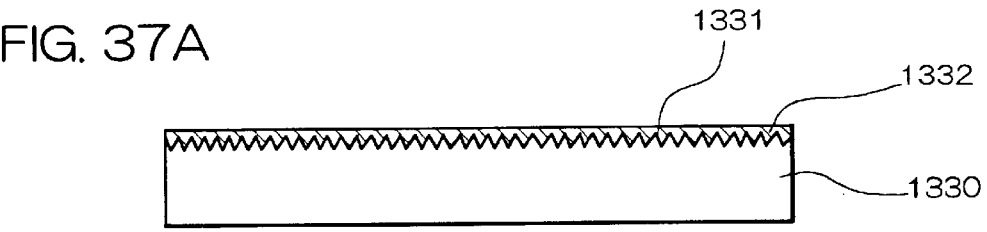
FIGS. 37A to 37C illustrate a method of manufacturing a micro lens array according to an eleventh embodiment.
Figure 37B:
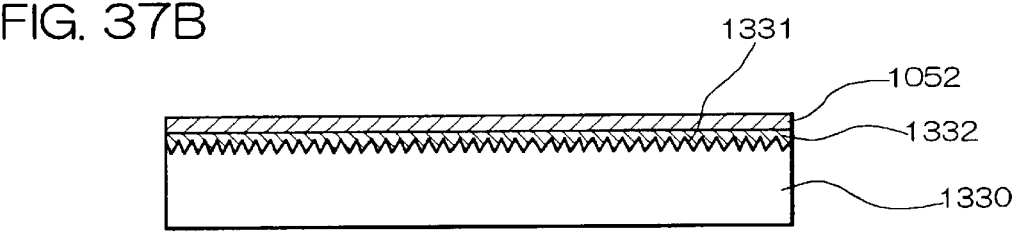
Figure 37C:
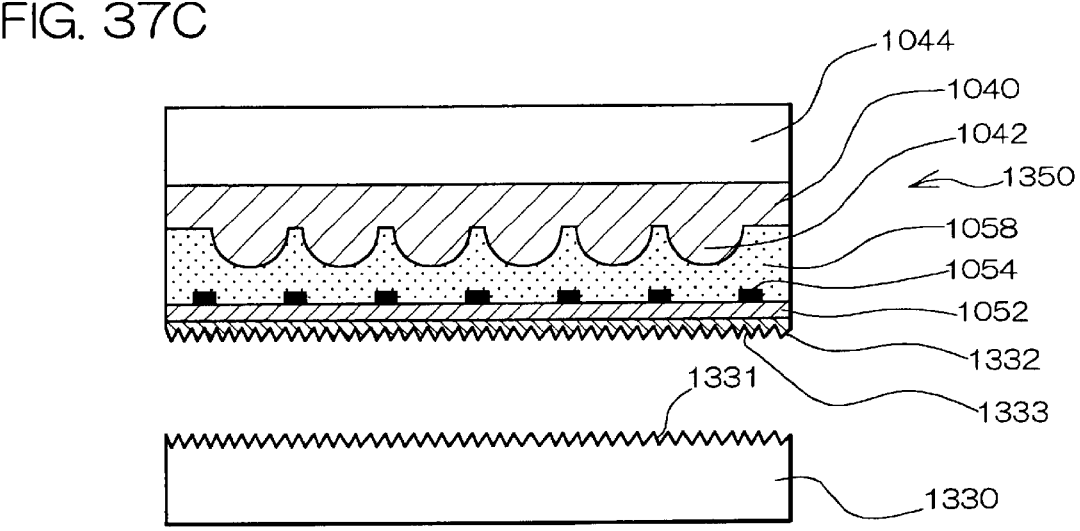

FIGS. 37A to 37C are views for describing an eleventh embodiment of the present invention. In this embodiment, which is a modification of the sixth embodiment, a rubbing treatment can be omitted.

In this embodiment, a base 1330 provided with protrusions 1331 formed in lines as shown in FIG. 37A is used. The pattern of the protrusions 1331 is the inverse of a pattern of grooves formed on an alignment layer (alignment grooves) by a conventional rubbing treatment. A polyimide resin and the like is applied on the base 1330 and baked to form an alignment layer 1332. A transparent electrode film 1052 is then formed on the alignment layer 1332 as shown in FIG. 37B.

After passing through the steps same as the steps shown in FIGS. 24C to 25C, a micro lens array 1350 shown in FIG. 37C is obtained. The micro lens array 1350 comprises the alignment layer 1332 which is provided with alignment grooves 1333 having shapes corresponding to that of the protrusions 1331 of the base 1330.

According to this embodiment, since the alignment grooves 1333 for aligning liquid crystal molecules in a given direction can be formed at the same time in the step of forming the alignment layer 1332, a rubbing treatment can be omitted.

Twelfth Embodiment

Figure 38A:
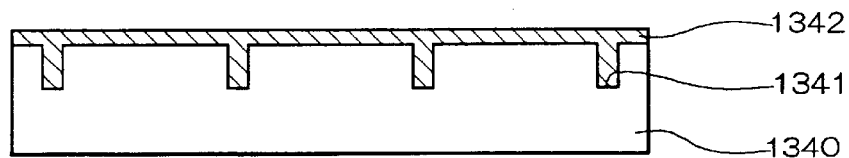
FIGS. 38A to 38C illustrate a method of manufacturing a micro lens array according to a twelfth embodiment.
Figure 38B:
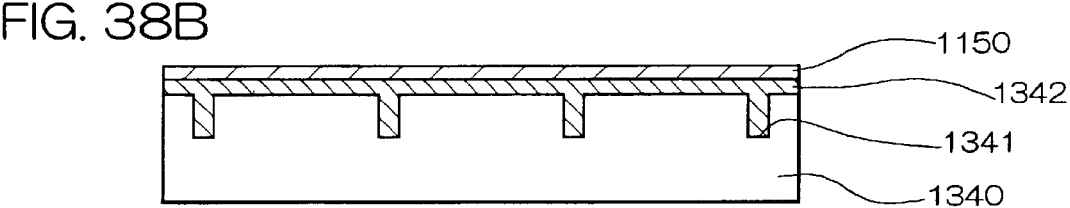
Figure 38C:
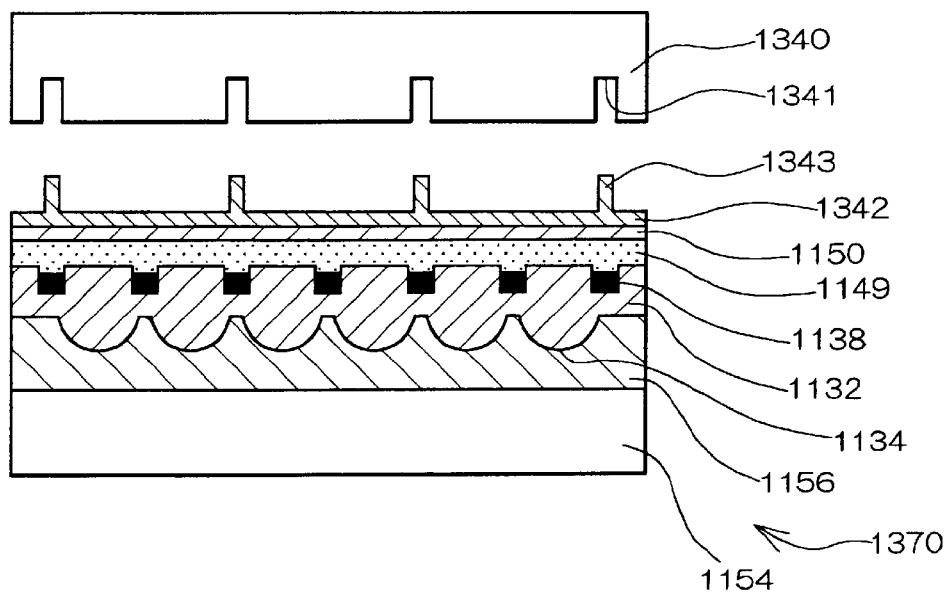

FIGS. 38A to 38C are views for describing a twelfth embodiment of the present invention. This embodiment, which is a modification of the seventh embodiment, is a method of forming a spacer (supporting material) integrally with an alignment layer when a micro lens array is applied to a liquid crystal panel.

In this embodiment, a base 1340 provided with recesses 1341 as shown in FIG. 38A is used. The recesses 1341 are formed by etching and the like. A polyimide resin and the like is applied on the base 1340 so that the recesses 1341 are filled with the resin and then the applied resin is baked to form an alignment layer 1342. A transparent electrode film 1150 is formed on the alignment layer 1342 as shown in FIG. 38B. After passing through the steps same as the steps shown in FIGS. 26C to 30, a micro lens array 1370 shown in FIG. 38C is obtained. The micro lens array 1370 comprises spacers 1343 formed integrally with the alignment layer 1342.

The depth of each of the recesses 1341 is equivalent to the height of each of the spacers 1343, which is determined according to a liquid crystal panel to be produced. For example, in the case of a VGA liquid crystal panel using a TFT as a driving element, the depth is 2 $\mu$m to 6 $\mu$m.

The depth of each of the recesses 1341 of the base 1340 can be controlled with high precision by etching. For example, each of the recesses 1341 with a depth of 3 $\mu$m can be etched with a margin of error within ±0.05 $\mu$m. Therefore, since the height of each of the spacer 1343, specifically, a cell gap can be maintained uniformly, displaying characteristics of a liquid crystal panel such as light transmittance, contrast ratio, and response rate can be easily kept to suitable values.

In this embodiment, it is preferable to place each of the recesses between every adjacent lenses 1134. Because of this constitution, each of the spacers 1343 can be formed between every adjacent lenses 1134. Accordingly, the spacers 1343 are not placed on the lenses 1134 which gather light, so that yields in the manufacture of a micro lens array or a liquid crystal panel can be improved.

Moreover, it is preferable to place the recesses 1341 on the shading layers 1138 (black matrix). Because of this constitution, the spacers 1343 can be provided on the shading layers 1138. Accordingly, the spacers 1343 are not placed on the pixels. Moreover, uneven alignment of liquid crystals due to the spacers 1343, effect on polarization characteristics of a liquid crystal panel, and the like can be reduced by providing the spacers 1343 on the shading layers 1138, and image quality of the liquid crystal panel can be maintained in an optimal state.

The each shape of the recesses 1341 may be a column, prism, and the like, with a column being preferable. Disorder of the alignment of liquid crystals can be controlled by forming the spacers 1343 in columnar shape.

It is not necessary to place the spacers 1343 in all the areas between the adjacent lenses 1134 or on the shading layers 1138 between pixels, and the spacers 1343 may be placed in certain areas. However, the spacers 1343 have to be placed so that the strength required for maintaining a uniform cell gap can be obtained. For example, it is preferable to place the spacers 1343 with intervals within the range of 100 µm to 200 µm.

This embodiment can be combined with the eleventh embodiment. In other words, projections similar to the protrusions 1331 of the base 1330 shown in FIG. 37A may be formed on the surface of the base 1340 on which the recesses 1341 are formed, and alignment grooves may be formed in given areas of the alignment layer 1342.

Figure 39:
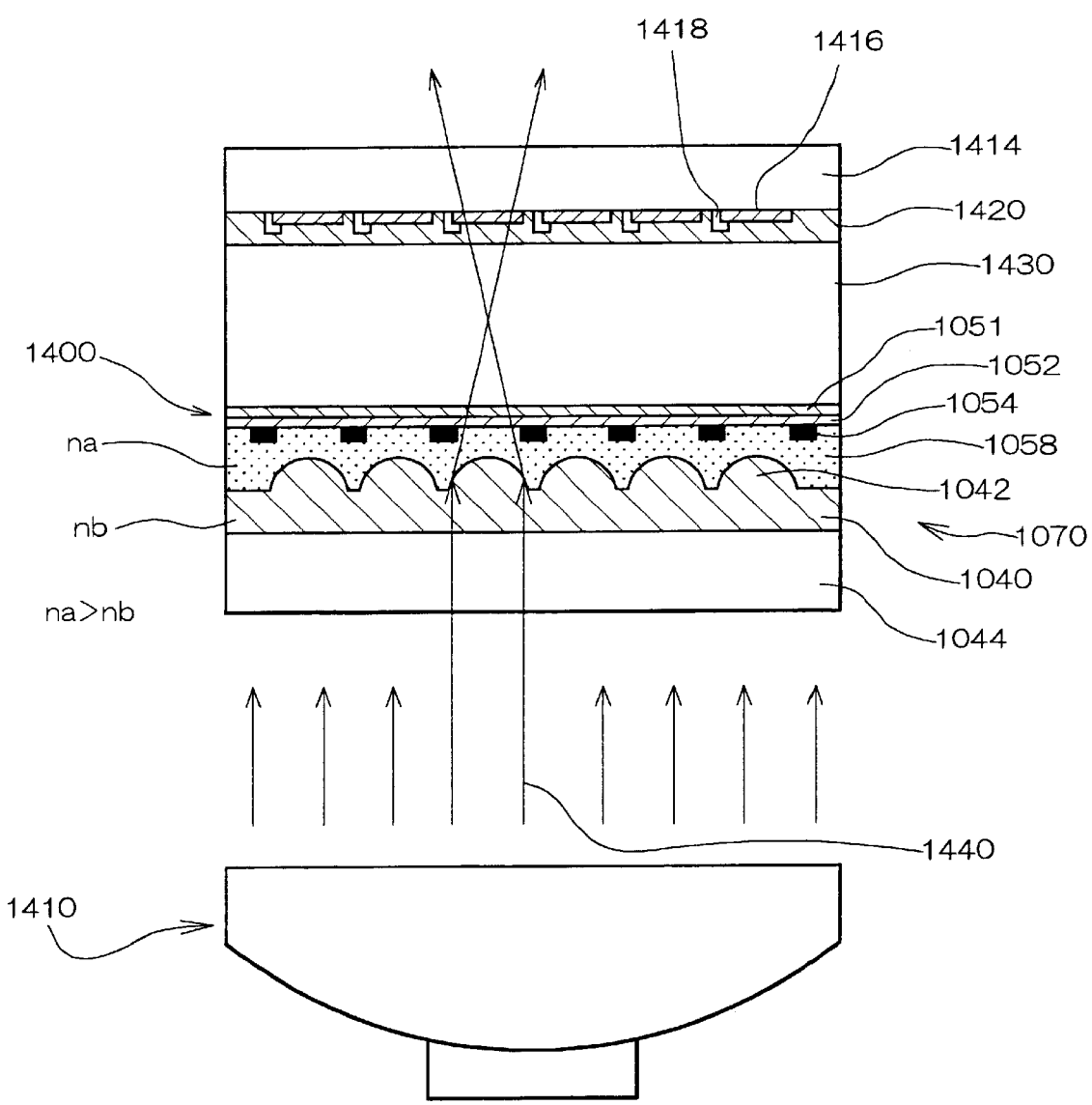
FIG. 39 illustrates an electronic device provided with a micro lens array according to the present invention.

FIG. 39 illustrates part of a liquid crystal projector to which the micro lens array according to the present invention is applied. This liquid crystal projector comprises a light valve 1400 into which the micro lens array 1070 manufactured by the method according to the aforementioned sixth embodiment is incorporated and a lamp 1410 as a light source.

The micro lens array 1070 is disposed in a manner so that the concave surfaces of the lenses 1042 face in the direction opposite to the lamp 1410. A TFT substrate 1414 is disposed such that there is a gap between the TFT substrate 1414 and the alignment layer 1051. On the TFT substrate 1414, transparent individual electrodes 1416 and thin film transistors 1418 are formed, and an alignment layer 1420 is formed on these materials. The TFT substrate 1414 is disposed in a manner so that the alignment layer 1420 faces the alignment layer 1051.

A liquid crystal 1430 is sealed between these alignment layers 1051, 1420 and is driven by applying voltage controlled by the thin film transistor 1418.

This liquid crystal projector can display a clear image since light 1440 emitted from the lamp 1410 is converged on each pixel by each lens 1042.

This is based on the premise that the following relation must be established between light refractive index na of the adhesive layer 1058 and light refractive index nb of the light-transmitting layer 1040:

$$na < nb$$

Satisfying this condition makes it possible to pass the light from a medium having a higher refractive index to a medium having a lower refractive index. Specifically, the light 1440 is refracted and converged to a direction away from the normal line of the interface between the two media to obtain a clear image.

Figure 40:
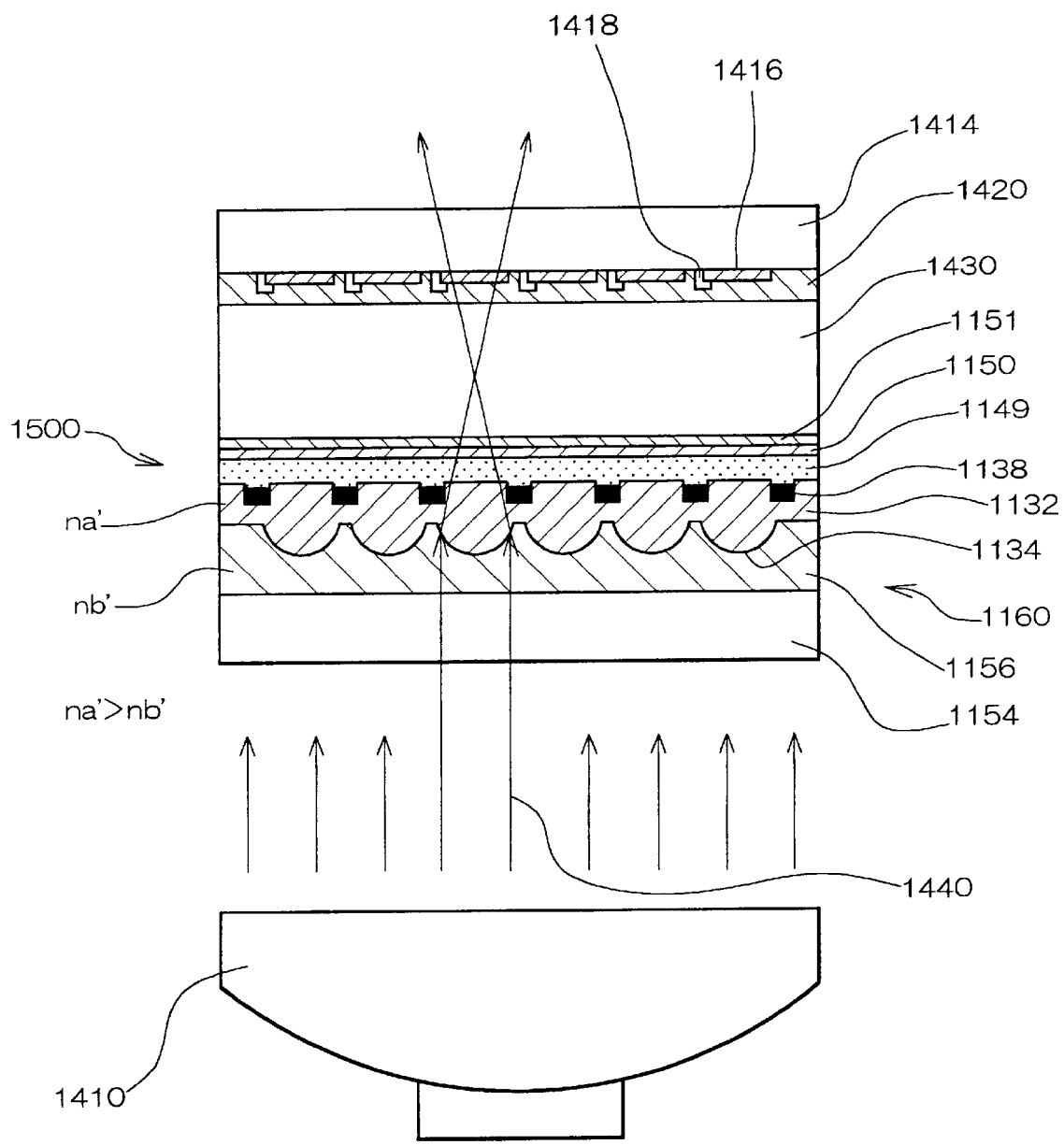
FIG. 40 illustrates an electronic device provided with a micro lens array according to the present invention.

FIG. 40 is a view showing a part of a liquid crystal projector to which a micro lens array according to the present invention is applied. This liquid crystal projector comprises a light valve 1500 into which the micro lens array 1160 manufactured by the method according to the aforementioned seventh embodiment is incorporated, and a lamp 1410 as a light source.

The micro lens array 1160 is disposed in a manner so that the convex surfaces of the lenses 1134 face in a direction of the lamp 1410. A TFT substrate 1414 is disposed such that there is a gap between the TFT substrate 1414 and the alignment layer 1151. On the TFT substrate 1414, transparent individual electrodes 1416 and thin film transistors 1418 are formed, and an alignment layer 1420 is formed on these materials. The TFT substrate 1414 is disposed in a manner so that the alignment layer 1420 faces the alignment layer 1151.

A liquid crystal 1430 is sealed between these alignment layers 1151, 1420 and is driven by applying voltage controlled by the thin film transistor 1418.

This liquid crystal projector car, display a clear image since light 1440 emitted from the lamp 1410 is converged on each pixel by each lens 1134.

This is based on the premise that the following relation must be established between light refractive index na' of the first light-transmitting layer 1132 and light refractive index nb' of the second light-transmitting layer 1156:

$$na' > nb'$$

Satisfying this condition makes it possible to pass the light from a medium having a lower refractive index to a medium having a higher refractive index. Specifically, the light 1440 is refracted and converged to a direction approaching the normal line of the interface between the two media to obtain a clear image.

What is claimed is:

1. A method of manufacturing a micro lens array comprising:
   a first step of forming a thin film on a base;
   a second step of forming a light-transmitting layer having a plurality of lenses on the thin film; and
   a third step of removing the thin film together with the light transmitting layer from the base.

2. The method of manufacturing a micro lens array as defined in claim 1, wherein the thin film is a transparent electrode film.

3. The method of manufacturing a micro lens array as defined in claim 1, further comprising a step of forming the light-transmitting layer separately from the thin film before the second step,
   wherein the light-transmitting layer is adhered to the thin film in the second step.

4. The method of manufacturing a micro lens array as defined in claim 1,
   wherein the light-transmitting layer is adhered to the thin film while forming the light-transmitting layer from a light-transmitting layer precursor on the base in the second step.

5. The method of manufacturing a micro lens array as defined in claim 1,
   wherein the base has radiation transmissivity; and
   wherein the thin film is exposed to radiation through the base to reduce the bonding force at the interface between the thin film and the base in the third step.

6. A method of manufacturing a micro lens array comprising:
   a first step of forming a thin film on a base;
   a second step of forming a light-transmitting layer having a plurality of lenses on the thin film;
   a third step of removing the thin film together with the light-transmitting layer from the base;
   wherein a separation layer is previously formed on the base and the thin film is formed on the separation layer in the first step;
   wherein the base has radiation transmissivity; and
   wherein the separation layer is exposed to radiation through the base to reduce the bonding force at the interface between the base and the separation layer in the third step.

7. A method of manufacturing a micro lens array comprising:
   a first step of forming a thin film on a base;
   a second step of forming a light-transmitting layer having a plurality of lenses on the thin film;
   a third step of removing the thin film together with the light-transmitting layer from the base;
   wherein a separation layer is previously formed on the base and the thin film is formed on the separation layer in the first step;

wherein the base has radiation transmissivity; and wherein the separation layer is exposed to radiation through the base to reduce the bonding force at the interface between the thin film and the separation layer in the third step.

8. A method of manufacturing a micro lens array comprising:

a first step of forming a thin film on a base;

a second step of forming a light-transmitting layer having a plurality of lenses on the thin film;

a third step of removing the thin film together with the light-transmitting layer from the base;

wherein a separation layer is previously formed on the base and the thin film is formed on the separation layer in the first step;

wherein the base has radiation transmissivity; and wherein the separation layer is exposed to radiation through the base to reduce the bonding force in the separation layer in the third step.

9. The method of manufacturing a micro lens array as defined in claim 5, further comprising a step of washing the surface of the thin film after the third step.

10. The method of manufacturing a micro lens array as defined in claim 6, further comprising a step of removing the separation layer adhering to the surface of the thin film after the third step.

11. The method of manufacturing a micro lens array as defined in claim 1, further comprising a step of forming shading layers which partition the thin film into areas before the second step, wherein the light-transmitting layer is formed on the thin film and the shading layers in the second step.

12. The method of manufacturing a micro lens array as defined in claim 1, wherein recesses which partition the light-transmitting layer into areas is formed on a surface of the light-transmitting layer opposite to the surface on which the lenses are formed, the recesses being filled with a shading material.

13. The method of manufacturing a micro lens array as defined in claim 1, wherein the thin film is an alignment layer.

14. A method of manufacturing a micro lens array comprising:

a first step of forming a thin film on a base;

a second step of forming a light-transmitting layer having a plurality of lenses on the thin film;

a third step of removing the thin film together with the light-transmitting layer from the base;

wherein the thin film is an alignment layer;

wherein at least one recess is formed in the surface of the base;

wherein the recess in the base is filled with material for the alignment layer to form a projection integrally with the alignment layer in the first step; and wherein the projection functions as a supporting material for maintaining a fixed space for sealing a liquid crystal of a liquid crystal panel.

15. The method of manufacturing a micro lens array as defined in claim 14, wherein the recess is formed in an area facing an area between the lenses on the base; and wherein the recess in the base is placed in the area between the lenses in the second step.

16. The method of manufacturing a micro lens array as defined in claim 14, wherein protrusions having shapes corresponding to alignment grooves which are to be formed on the alignment layer are formed in area of the surface of the base; and wherein the alignment grooves are formed in a predetermined area of the alignment layer in the first step.

17. The method of manufacturing a micro lens array as defined in claim 13, further comprising a step of forming a transparent electrode film on one of the alignment layer and the light-transmitting layer, wherein the alignment layer is provided with the light-transmitting layer through the transparent electrode film in the second step.

18. The method of manufacturing a micro lens array as defined in claim 17, wherein the transparent electrode film is formed on the alignment layer.

19. A micro lens array manufactured by the method as defined in claim 1.

20. A display device comprising the micro lens array as defined in claim 19 and a light source which emits light toward the micro lens array.

21. A method of manufacturing a display device comprising:

a first step of forming a thin film on a base;

a second step of forming a light-transmitting layer having a plurality of lenses on the thin film;

a third step of removing the thin film together with the light transmitting layer from the base to obtain a micro lens array;

a fourth step of making a liquid crystal light valve, the micro lens array incorporated into the liquid crystal light valve; and a fifth step of assembling the liquid crystal light valve and a light source.

22. A method of manufacturing a display device comprising:

a first step of forming a thin film on a base;

a second step of forming a light-transmitting layer having a plurality of lenses on the thin film;

a third step of removing the thin film together with the light-transmitting layer from the base to obtain a micro lens array;

a fourth step of making a liquid crystal light valve, the micro lens array incorporated into the liquid crystal light valve; and a fifth step of assembling the liquid crystal light valve and a light source;

wherein a separation layer is previously formed on the base and the thin film is formed on the separation layer in the first step;

wherein the abse has radiation transmissively; and wherein the separation layer is exposed to radiation through the base to reduce the bonding force at the interface between the base and the separation layer in the third step.

23. A method of manufacturing a display device comprising:

a first step of forming a thin film on a base;

a second step of forming a light-transmitting layer having a plurality of lenses on the thin film;

a third step of removing the thin film together with the light-transmitting layer from the base to obtain a micro lens array;

a fourth step of making a liquid crystal light valve, the micro lens array incorporated into the liquid crystal light valve; and a fifth step of assembling the liquid crystal light valve and a light source;

wherein a separation layer is previously formed on the base and the thin film is formed on the separation layer in the first step;

wherein the base has radiation transmissivity; and wherein the separation layer is exposed to radiation through the base to reduce the bonding force at the interface between the thin film and the separation layer in the third step.

24. A method of manufacturing a display device comprising:

a first step of forming a thin film on a base;

a second step of forming a light-transmitting layer having a plurality of lenses on the thin film;

a third step of removing the thin film together with the light-transmitting layer from the base to obtain a micro lens array;

a fourth step of making a liquid crystal light valve, the micro lens array incorporated into the liquid crystal light valve; and a fifth step of assembling the liquid crystal light valve and a light source;

wherein a separation layer is previously formed on the base and the thin film is formed on the separation layer in the first step;

wherein the base has radiation transmissivity; and wherein the separation layer is exposed to radiation through the base to reduce the bonding force in the separation layer in the third step.

25. A method of manufacturing a display device comprising:

a first step of forming a thin film on a base;

a second step of forming a light-transmitting layer having a plurality of lenses on the thin film;

a third step of removing the thin film together with the light-transmitting layer from the base to obtain a micro lens array;

a fourth step of making a liquid crystal light valve, the micro lens array incorporated into the liquid crystal light valve; and a fifth step of assembling the liquid crystal light valve and a light source;

wherein the thin film is an alignment layer;

wherein at least one recess is formed in the surface of the base;

wherein the reces in the base is filled with material for the alignment layer to form a projection integrally with the alignment layer in the first step; and wherein the projection functions as a supporting material for maintaining a fixed space for sealing a liquid crystal of a liquid crystal panel.

* * * * *

UNITED STATES PATENT AND TRADEMARK OFFICE
CERTIFICATE OF CORRECTION

PATENT NO. : 6,404,555 B1
DATED : June 11, 2002
INVENTOR(S) : Takao Nishikawa

It is certified that error appears in the above-identified patent and that said Letters Patent is hereby corrected as shown below:

<u>Column 2,</u>
Line 27, "Layer" should be -- layer --;

<u>Column 5,</u>
Lines 25 and 31, "FIGS." should be -- FIG. --;
Line 62, after "insofar" insert -- as --;

<u>Column 16,</u>
Line 27, after "thin" insert -- film --;

<u>Column 18,</u>
Line 26, after "insofar" insert -- as --;

<u>Column 21,</u>
Line 16, "filr" should be -- film --;

<u>Column 27,</u>
Line 14, "eight" should be -- eighth --;
Line 26, "convex y" should be -- convexly --;

<u>Column 31,</u>
Line 65, "car," should be -- can --;

<u>Column 34,</u>
Line 55, "abse" should be -- base --;
Line 55, "transmissively" should be -- transmissivity --;

UNITED STATES PATENT AND TRADEMARK OFFICE
CERTIFICATE OF CORRECTION

PATENT NO. : 6,404,555 B1
DATED : June 11, 2002
INVENTOR(S) : Takao Nishikawa

It is certified that error appears in the above-identified patent and that said Letters Patent is hereby corrected as shown below:

<u>Column 36,</u>
Line 24, "reces" should be -- recess --.

Signed and Sealed this

Twenty-first Day of October, 2003

JAMES E. ROGAN
*Director of the United States Patent and Trademark Office*